United States Patent [19]
Farmer

[11] Patent Number: 6,106,561
[45] Date of Patent: Aug. 22, 2000

[54] SIMULATION GRIDDING METHOD AND APPARATUS INCLUDING A STRUCTURED AREAL GRIDDER ADAPTED FOR USE BY A RESERVOIR SIMULATOR

[75] Inventor: Christopher L. Farmer, Abingdon, United Kingdom

[73] Assignee: Schlumberger Technology Corporation, Houston, Tex.

[21] Appl. No.: 09/034,701

[22] Filed: Mar. 4, 1998

[30] Foreign Application Priority Data

Jun. 23, 1997 [GB] United Kingdom .................. 9713244
Oct. 20, 1997 [GB] United Kingdom .................. 9722115
Dec. 24, 1997 [GB] United Kingdom .................. 9727288

[51] Int. Cl.$^7$ ........................... G06G 7/48; G06F 101/00
[52] U.S. Cl. ................................... 703/10; 703/2; 703/5; 345/423; 367/72; 367/73; 702/5; 702/6; 702/11; 702/12; 702/13; 702/16
[58] Field of Search .................. 395/500.23, 500.26, 395/500.31; 345/423; 367/73, 72; 702/5, 6, 13, 11, 12, 16; 703/2, 5, 10

[56] References Cited

U.S. PATENT DOCUMENTS

| | | | |
|---|---|---|---|
| 4,821,164 | 4/1989 | Swanson | 702/5 |
| 5,056,066 | 10/1991 | Howard | 367/72 |
| 5,229,976 | 7/1993 | Boyd | 367/73 |
| 5,465,323 | 11/1995 | Mallet | 345/423 |
| 5,905,657 | 5/1999 | Celniker | 395/500.26 |
| 6,018,497 | 1/2000 | Gunasekera | 367/72 |

FOREIGN PATENT DOCUMENTS

PCT WO97/38330 10/1997 WIPO .

OTHER PUBLICATIONS

SPE 9369 Modeling Reservoir Geometry with Non–rectangular coordinate grids copyright 1980.
SPE 15857 "The construction of curvilinear co–ordinate grid systems for reservoir simulation", copyright 1986.
SPE 25262 "Validation of an Adaptive Orthogonal Curvilinear Gridding Procedure for Reservoir Simulation", 1993.
SPE 21235 "Orthogonal Curvilinear Grid Generation with Preset Internal Boundaries for Reservoir Simulation", 1991.
SPE 25233 "Reservoir Simulation Grinds: Opportunities and Problems", 1993.
Distinguished Author Series: "Reservoir Simulation: State of the Art" SPE 10020 Aug. 1982.
The Simulation of Petroleum Reservoirs, by J. W. Watts and D.W. Peaceman, Perspectives in Computing, 1985.
"Numerical solution of the Quasilinear Poisson Equation in a non–uniform triangle mesh" by Alan M. Winslow, Journal of Computational Physics, 149–172, 1967.
"A control–volume finite element method for local mesh refinement in Thermal Reservoir simulation" by Peter A. Forsyth, Copyright 1990, Society of Petroleum Engineers.
"Delaunay's mesh of a convex polyhedron in Dimension d Application to Arbitrary Polyhedra" by P. L. George et al, International Journal for Numerical methods in Engineering, vol. 33, p 975–995, 1992.

(List continued on next page.)

*Primary Examiner*—Kevin J. Teska
*Assistant Examiner*—Samuel Broda
*Attorney, Agent, or Firm*—John H Bouchard

[57] ABSTRACT

A Flogrid Simulation Gridding Program includes a Flogrid structured gridder. The structured gridder includes a structured areal gridder and a block gridder. The structured areal gridder will build an areal grid on an uppermost horizon of an earth formation by performing the following steps: (1) building a boundary enclosing one or more fault intersection lines on the horizon, and building a triangulation that absorbs the boundary and the faults; (2) building a vector field on the triangulation; (3) building a web of control lines and additional lines inside the boundary which have a direction that corresponds to the direction of the vector field on the triangulation, thereby producing an areal grid; and (4) post-processing the areal grid so that the control lines and additional lines are equi-spaced or smoothly distributed. The block gridder of the structured gridder will drop coordinate lines down from the nodes of the areal grid to complete the construction of a three dimensional structured grid. A reservoir simulator will receive the structured grid and generate a set of simulation results which are displayed on a 3D Viewer for observation by a workstation operator.

34 Claims, 34 Drawing Sheets

OTHER PUBLICATIONS

"Discretization on unstructured grids for inhomogeneous anisotopic media, Part I: Derivation of the methods", by Aavatsmark et al, SIAM J. Sci. Comput.

"Discretization on unstructured grids for inhomogeneous anisotopic media, Part II: Discussion and numerical results", by Aavatsmark et al, SIAM J. Sci. Comput.

SPE 27577, 1994, "Interactive Modeling of Multiphase Inflow Performance of Horizontal and Highly Deviated Wells".

"Two dimensional static and transient simulation of mobile carrier transport in a semiconductor" by P. E. Cottrell et al, NASECODE, Boole Press, Dublin, 1979.

SPE 25563, 1993, "Flexible gridding techniques for coning studies in vertical and horizontal wells", by Consonni et al.

SPE 12264, 1983, "Nested Factorization".

"Two and Three dimensional flexible grids for reservoir simulation" by Verma and Aziz, 5$^{th}$ European conference on the mathematics of oil recovery, Austria, Sep. 3–6, 1996.

"Interpretation of well block pressures in numerical reservoir simulation with nonsquare grid blocks and anisotropic permeability", 1983, by Donald W. Peaceman, Society of Petroleum Enginneers of AIME.

"Corner Point Geometry in Reservoir Simulation" by D.K. Ponting, Exploration Consultants, Henley, Oxon, UK.

SPE 18854, "Predicting Horizontal/Slant Well Production by mathematical modeling", Mar. 1989.

SPE 37998 "The generation of K–Orthogonal Grid System" by Gunasekera, Jun. 8–11, 1997.

SPE 15622 "Generalized transmissibilites for distorted grids in reservoir simulation" by T.M. Hegre, Oct. 1986.

"A triangle based mixed finite element—finite volume technique for modeling two phase flow through porous media", copyright 1983 by Academic Press.

SPE 21224 "Reservoir simulation with a control volume finite element method" 1991.

"Use of Voronoi Grid in reservoir simulation" by Cesar L. Palagi et al, SPE 22889, Advanced Technology Series.

"Computing Dirichlet tessellations" by A. Bowyer, The Computer Journal, vol. 24, No. 2, 1981.

FIG. 10
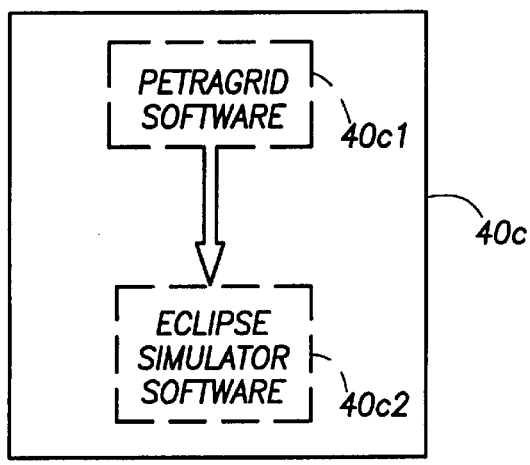
FIG. 13c1
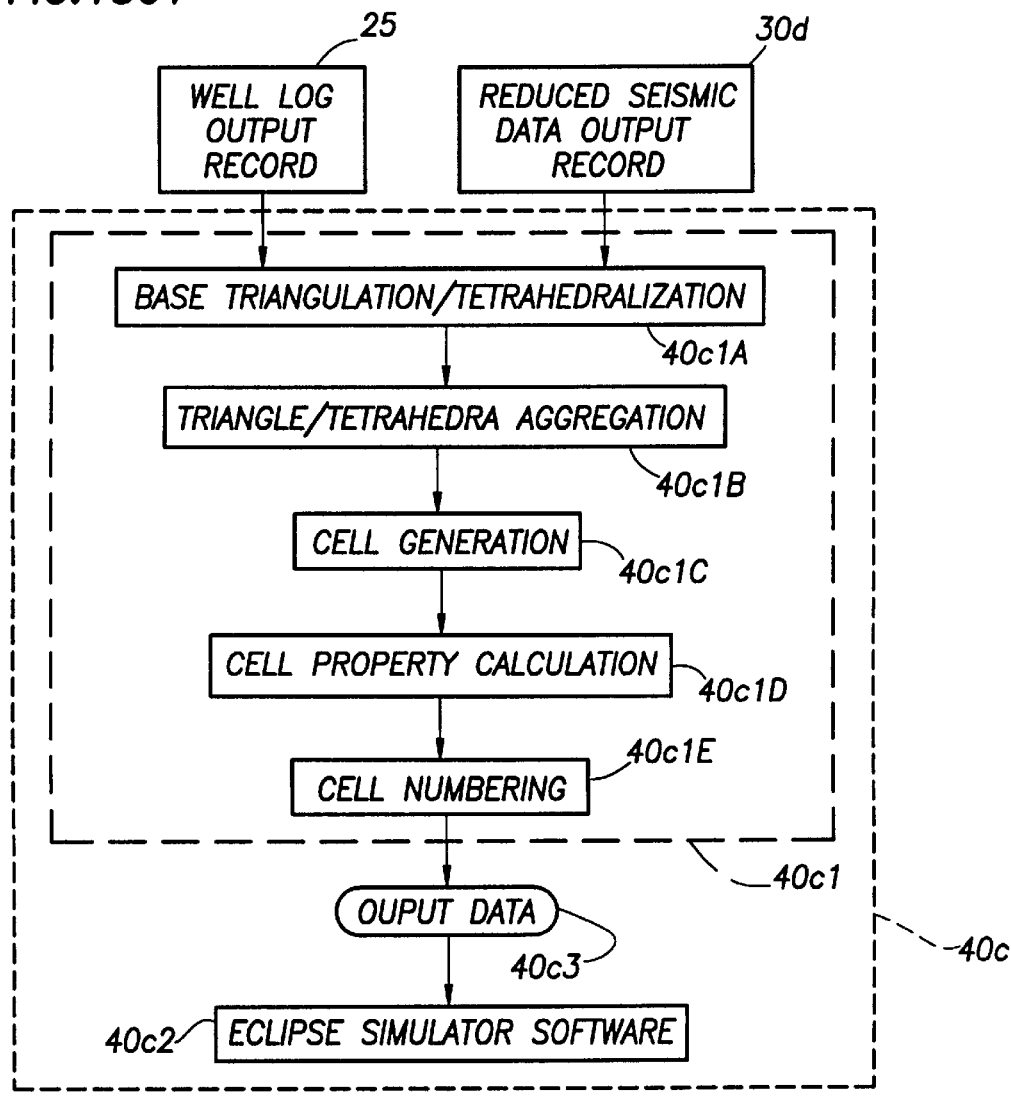

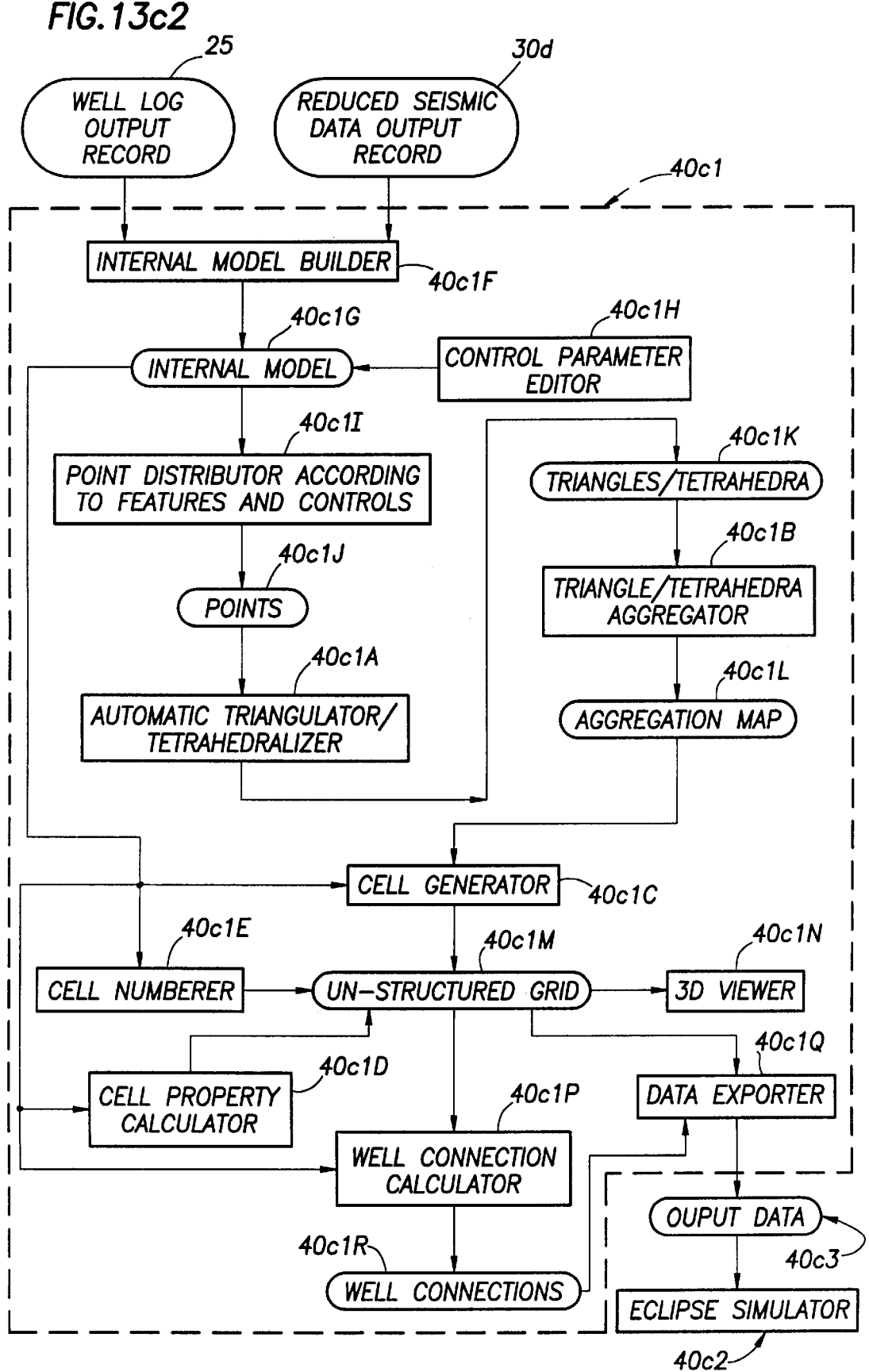
FIG.13c2

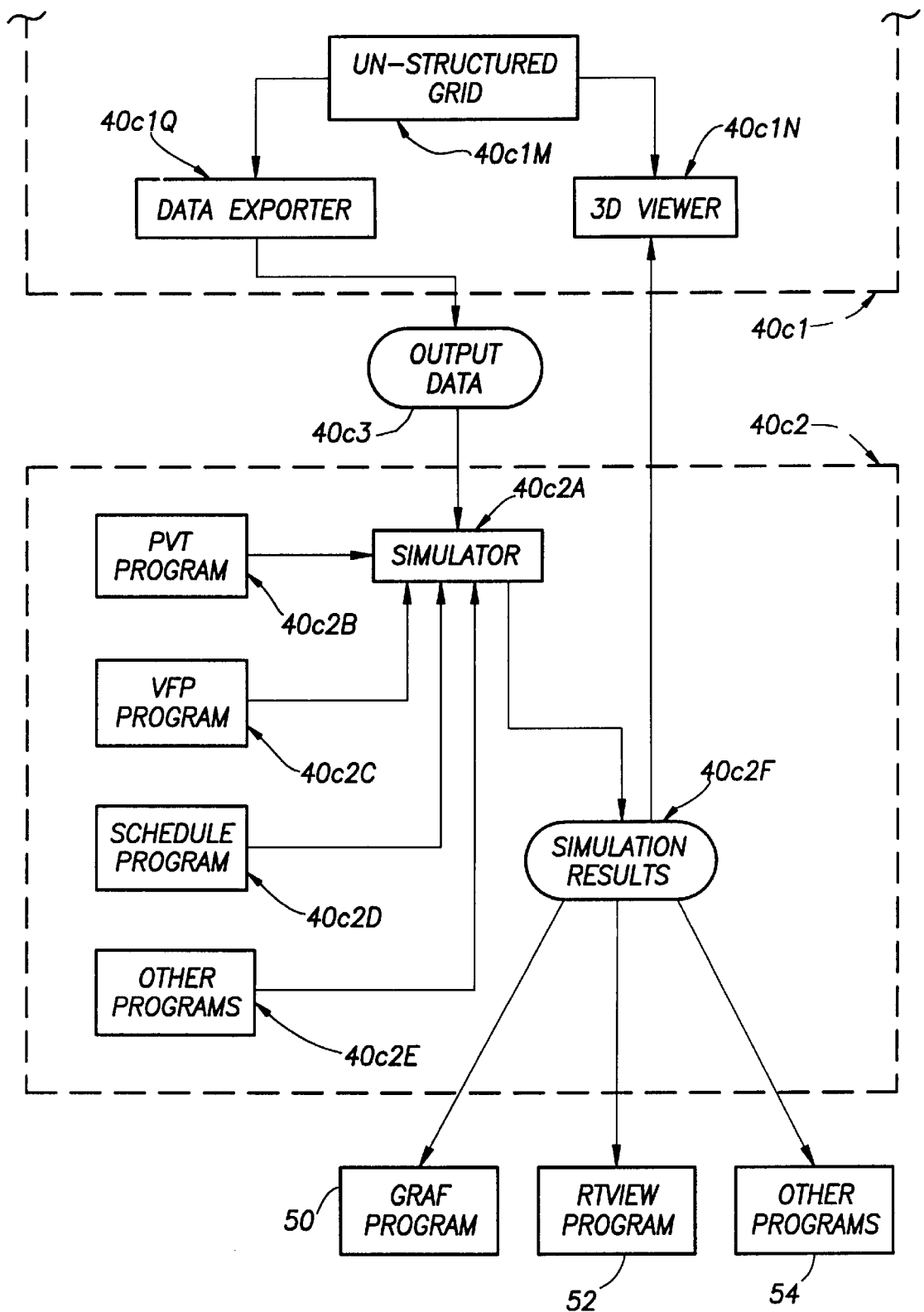
FIG.13d1

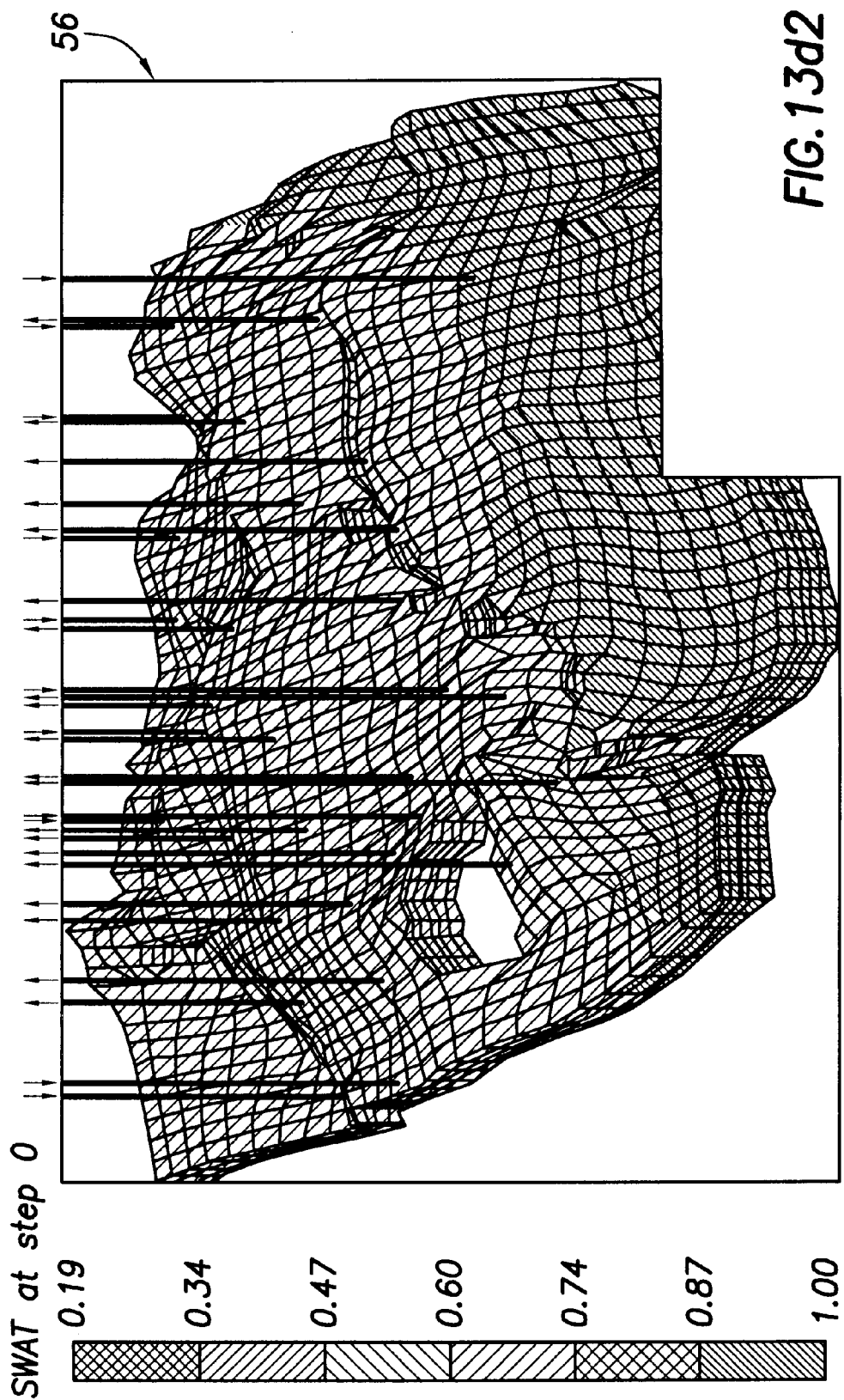
FIG. 13d2

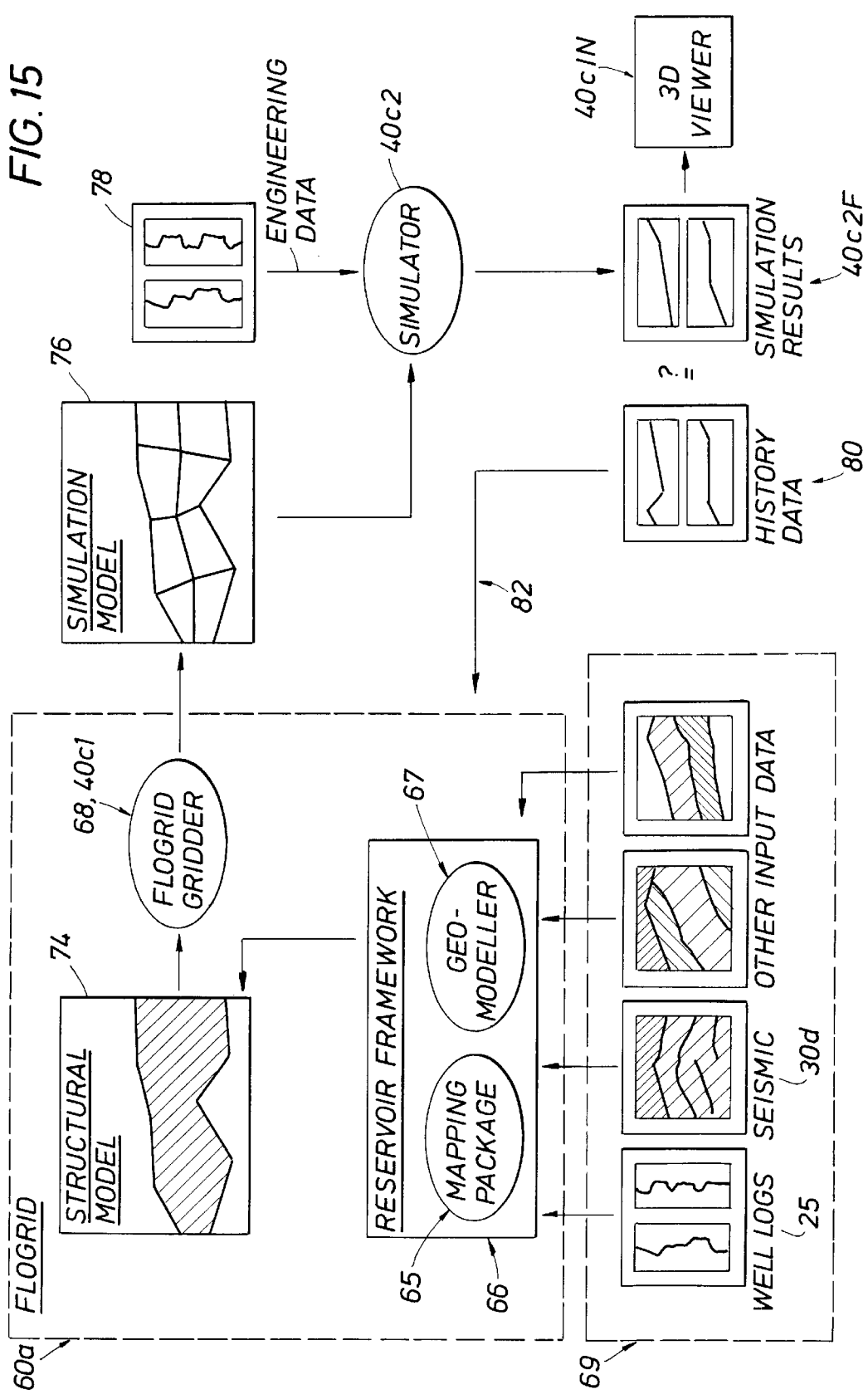

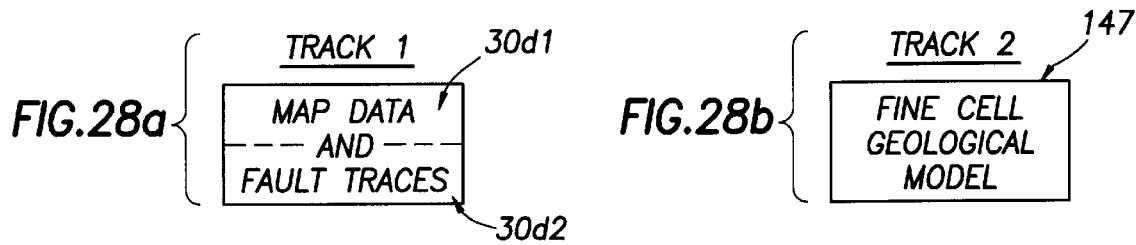
FIG.28a / FIG.28b
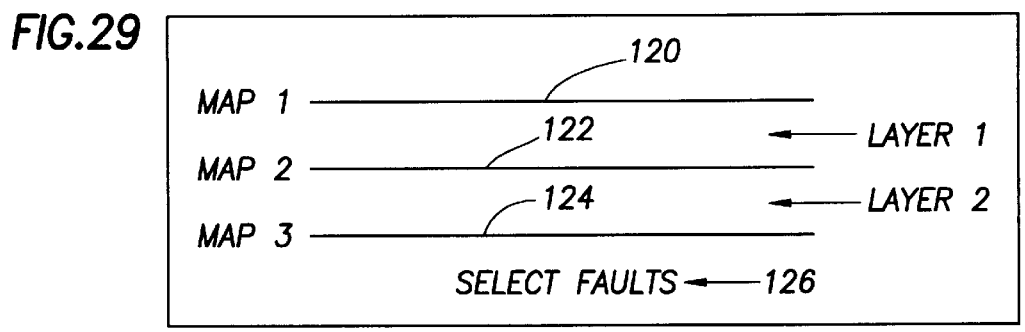
FIG.29
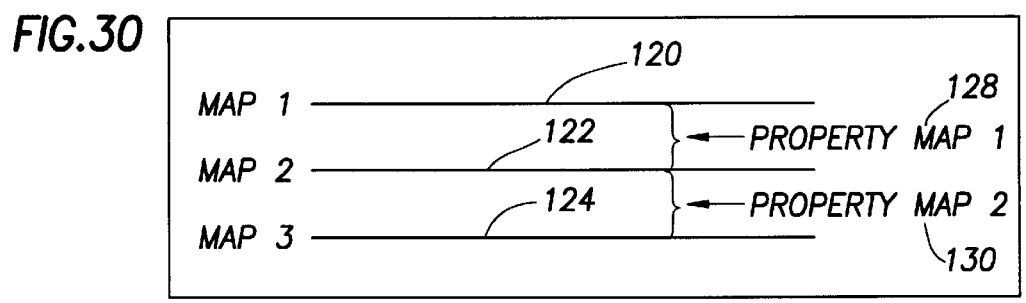
FIG.30
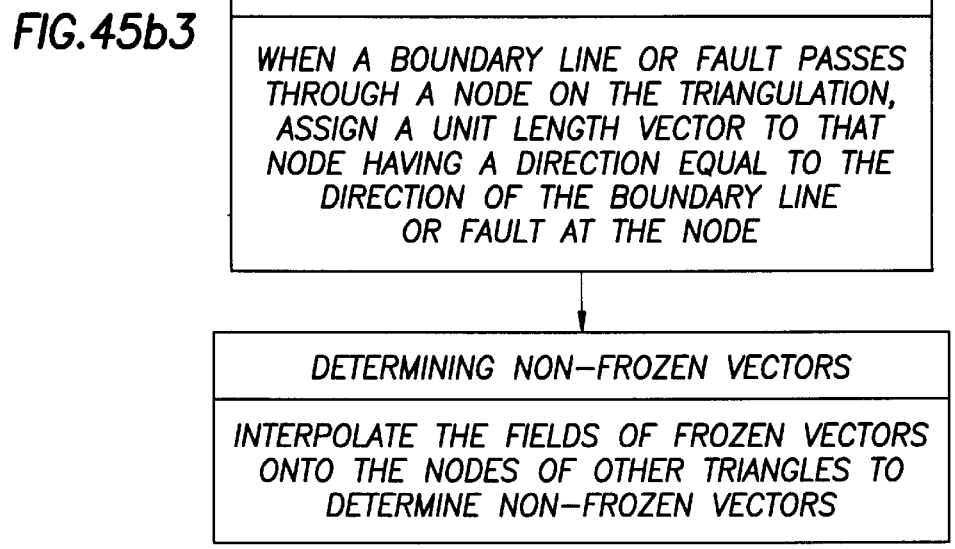
FIG.45b3

FIG. 39
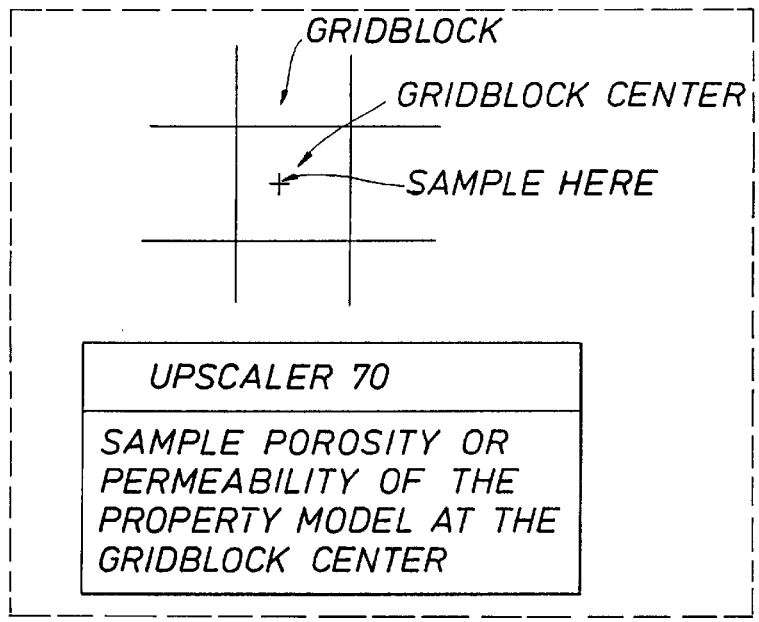
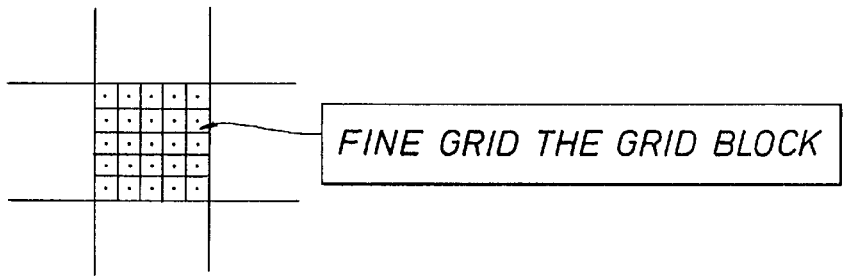
FIG. 40
FIG. 41
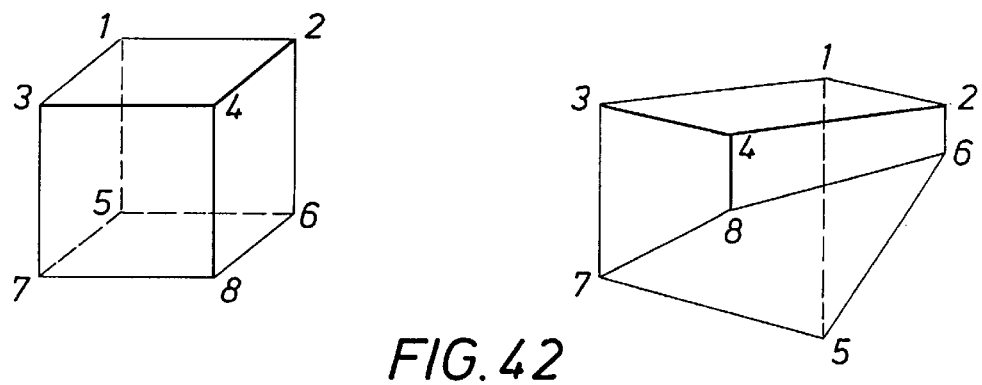
FIG. 42
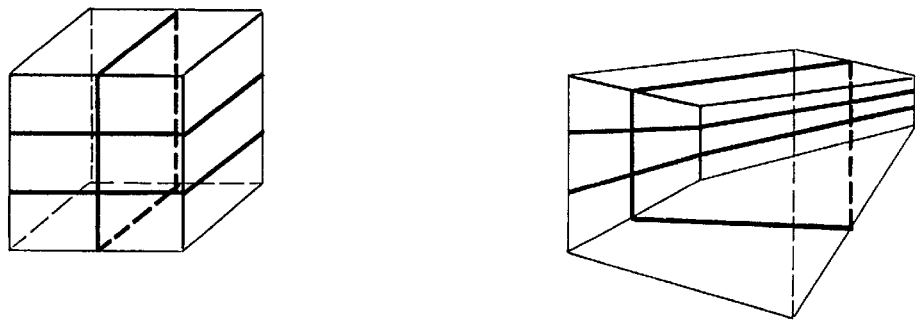

USER SPECIFIES A BOUNDARY

USER SELECTS "i" AND "j" FAULTS

CONSTRUCT A REGULAR TRIANGULAR GRID WHOSE BOUNDARY IS WELL OUTSIDE THE USER BOUNDARY

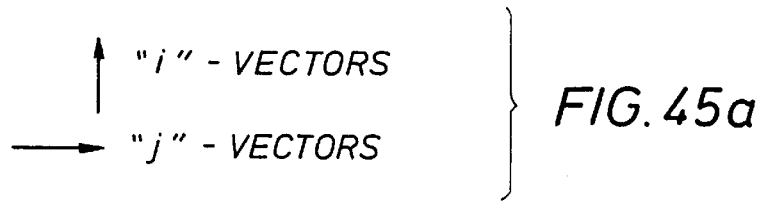
FIG. 45a
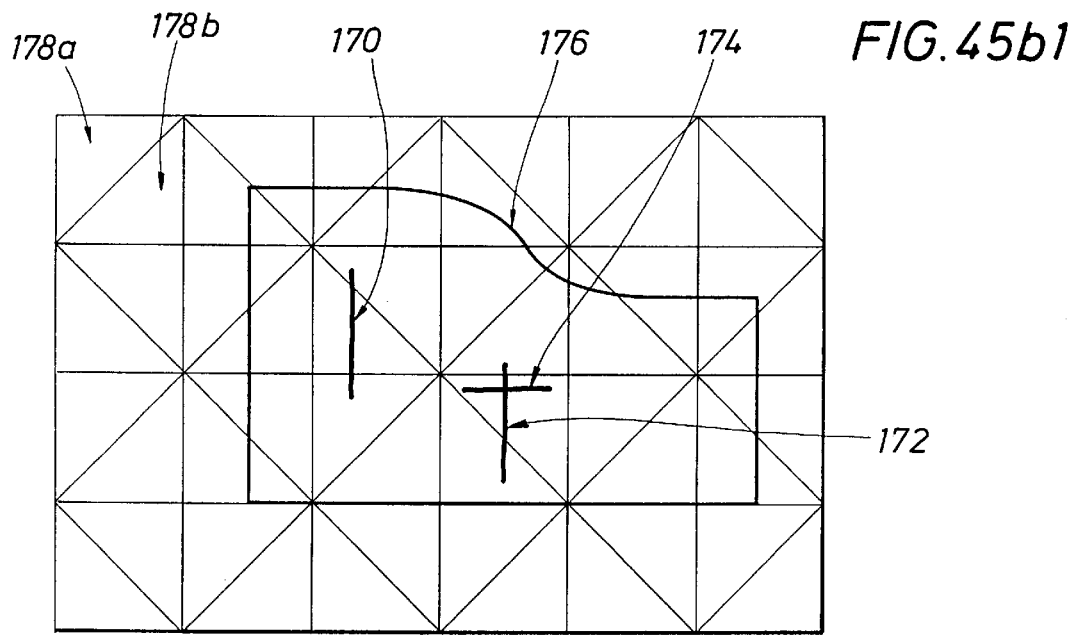
FIG. 45b1
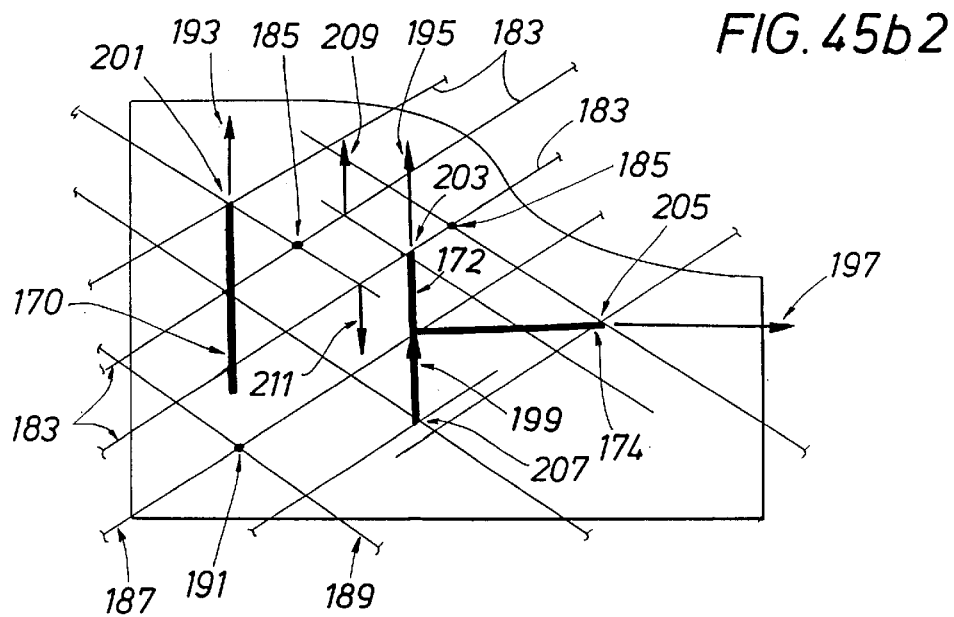
FIG. 45b2

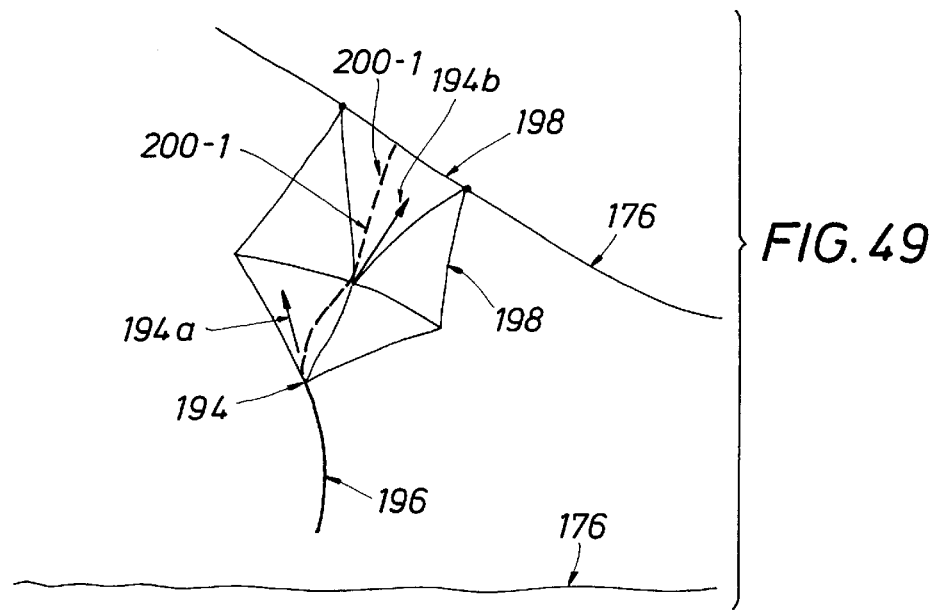
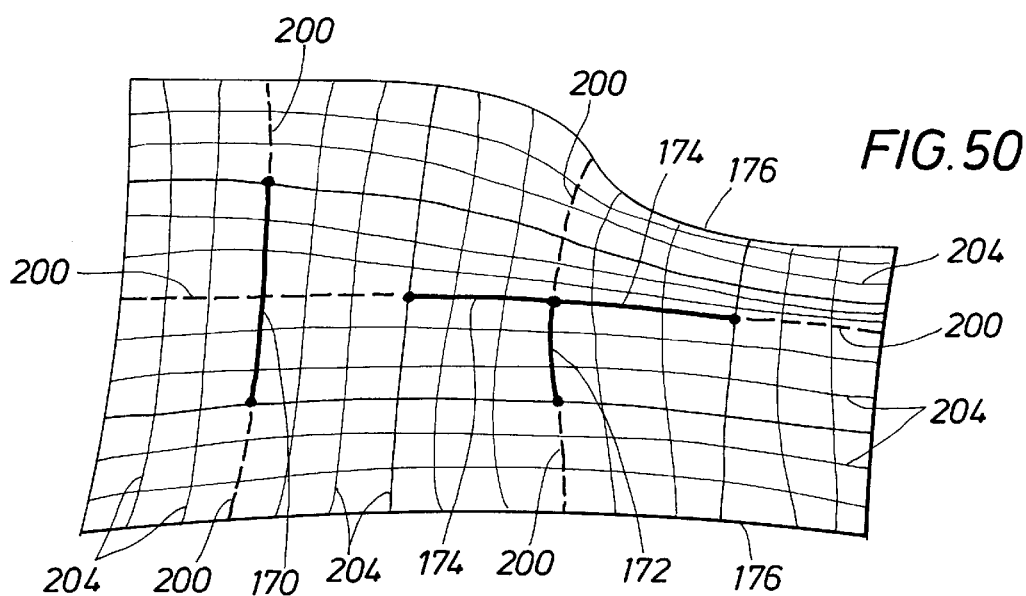
FIG. 51
AVERAGE DISTANCE FROM BOUNDARY
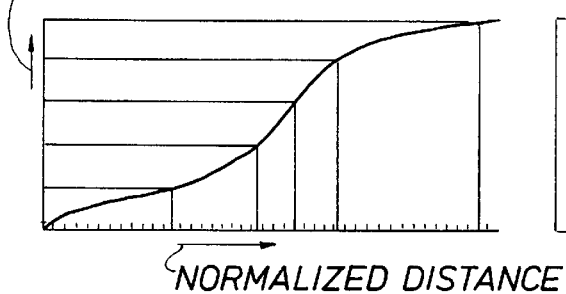
NORMALIZED DISTANCE
FIG. 52
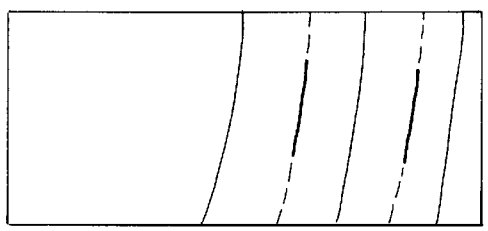

SIMULATION GRIDDING METHOD AND APPARATUS INCLUDING A STRUCTURED AREAL GRIDDER ADAPTED FOR USE BY A RESERVOIR SIMULATOR

BACKGROUND OF THE INVENTION

The subject matter of the present invention relates to a workstation based software method and apparatus, which is responsive to seismic data and well log data received from an earth formation in response to a seismic operation, for gridding the earth formation by generating a "structured" grid and imposing that "structured grid" on the earth formation. Since the structured grid is comprised of a plurality of grid blocks, when the structured grid is imposed on the earth formation, the workstation based software method and apparatus further generates a plurality of more accurate information corresponding, respectively, to the plurality of grid blocks of the structured grid. The plurality of more accurate information relates, for example, to the transmissibility properties of the plurality of grid blocks of the structured grid. The plurality of more accurate information is provided as an input to a conventional workstation based software "reservoir simulator". In response to the plurality of more accurate information, the "reservoir simulator" generates a corresponding plurality of simulation results (such as pressures and saturations) pertaining, respectively, to the plurality of grid blocks of the structured grid, the plurality of simulation results being overlayed, respectively, upon the plurality of grid blocks of the structured grid so that a new simulation result is associated with each grid block of the structured grid. The grid blocks of the structured grid and the new simulation results associated with each grid block are displayed on the workstation display monitor for viewing by an operator of the workstation.

More particularly, the subject matter of the present invention relates to an improved "structured" gridder software for use within a simulation gridding program, the simulation gridding program being hereinafter called "Flogrid". The "structured" gridder software, disposed within the "Flogrid" simulation gridding program, is adapted to be executed by the workstation processor; When executed by the workstation processor, the "structured" gridder software will ultimately generate the above referenced "more accurate earth formation grid block property information". This "more accurate grid block property information" is used by a reservoir simulator software for generating the "more accurate simulation results", such as pressures and saturations, that are displayed on the workstation display monitor.

Seismic operations are performed near one or more wellbores in an earth formation, and a plurality of seismic data are obtained from such seismic operation. In addition, well logging operations are also performed in the one or more wellbores and well log data is also obtained from the well logging operations. The seismic data and the well log data are input to a computer workstation where an interpretation program is executing. The interpretation program of the prior art was comprised of a first program sometimes called "grid" which generated data, and a second simulation program, responsive to the first program, which received the data from the first "grid" program and generated a set of simulation results and displayed the simulation results on the workstation display, the displayed simulation results enabling an operator to determine the flow properties of the earth formation situated near the one or more wellbores drilled into the formation. In particular, the first "grid" program establishes a grid for each horizon in the earth formation near the wellbores, the grid for each horizon comprising a multitude of individual cells. In addition, the first "grid" program generates data and other information for each of the individual cells for each horizon, the data and other information for each cell being transmitted to the second simulation program which uses the data and information for each grid cell, received from the first grid program, to generate a set of simulation results for each cell of the grid. A simulation result is displayed on the workstation display for each cell of the grid thereby enabling an operator of the workstation to determine the flow producing properties of each of the cells in the gridded earth formation located near the wellbores.

However, continuous developmental efforts are focused on improving the quality and accuracy of the data and other information generated by the first "grid" program. When a set of improved and more accurate data is received by the second simulation program, the simulation function practiced by the second simulation program will be more accurate and complete; and, as a result, the simulation results generated by the second simulation program will be more accurate and complete. Consequently, in view of the more accurate and complete set of simulation results (e.g., pressures and saturations) generated by the second simulation program, the flow properties associated with each cell or grid block of the grid imposed on the earth formation located near the wellbores can be more accurately determined. Consequently, a need exists to improve the first "grid" program so that more accurate data is generated by the first grid program.

Computer simulation of physical processes using partial differential equations requires a tessellation of a specified volume of space into a set of small blocks. Such tessellations can be of various types:

1. "Structured" grids which are either rectangular or "tartan grids" or distorted versions of these;
2. "Semi-structured" grids, in which the domain is first split into an unconstrained set of sub-domains and a structured grid is placed in each one;
3. "Unstructured" grids which consist of arrangements of triangles in 2D space or tetrahedra in 3D space; and
4. "Structured-unstructured" grids in which the domain is first split into an unconstrained set of sub-domains and structured grids are placed in some sub-domains and unstructured grids placed in others.

Most of the grid generation methods in use today have been developed in the area of computer aided design, in particular the aerospace industry.

However, in connection with the "Unstructured" grids, flow simulations on grids based on triangles (that is, for "Un-structured" grids) have been used by various authors inside and outside the petroleum industry. Control volumes have been formed around each node of a triangular grid by joining the edge midpoints to the triangle centroids for solving a 2D) magnetostatic problem. This technique is commonly known as the control volume finite element (CVFE) method. In addition, control volumes have been formed by joining the perpendicular bisectors of triangle edges of a Delaunay triangulation for solving semiconductor device equations. This technique has been applied to reservoir simulation, which is known as the PEBI or the Voronoi method. Heterogeneous problems have been handled by defining permeability to be constant over a triangle. An alternative difference scheme has been used based on the CVFE method in which permeabilities are defined to be constant within control volumes. This approach handles boundaries of layers with large permeability differences better than the traditional CVFE method and as with the traditional method it leads to a multi-point flow stencil, hence referred to as an MPFA scheme. By contrast, the PEBI method reduces to a two point flow stencil. The PEBI method has been extended to handle anisotropic heterogeneous systems by defining permeability to be constant within a triangle and by adjusting the angle between triangle edges and cell boundaries. This approach has two problems; firstly handling layers of contrasting permeabilities is poor, secondly in highly anisotropic systems the angle condition between triangle edges and cell boundaries may become so severe that cells begin to overlap. As an alternative to using control volumes formed around nodes of triangulations, it is possible to use the triangles themselves as control volumes. A drawback of triangular control volumes compared to Voronoi volumes is the much higher number of cells in the former; for random point distributions an average factor of two and five exist in two and three dimensions respectively. An advantage of triangular grids is the flexibility in honoring complex geological and production features.

An improved "Unstructured" gridder software is disclosed in a prior pending U.S. patent application Ser. No. 08/873,234 filed Jun. 11, 1997 and entitled "Method and Apparatus for generating more accurate earth formation grid cell property information for use by a simulator to display more accurate simulation results of the formation near a wellbore" to Dayal Gunasekera (hereinafter called, the "Gunasekera specification"), the disclosure of which is incorporated by reference into this specification.

The "Flogrid" simulation gridding program of the present invention disclosed in this specification includes: (1) the "Unstructured" gridder software disclosed in the Gunasekera specification, and (2) an improved "Structured" gridder software in accordance with the present invention which further includes a novel "structured areal gridder" software in accordance with the present invention.

Traditionally, geological models have consisted of maps, and, given a geological model, a simulation model was constructed from the geological model. However, in the prior art, reservoir engineers would directly modify the simulation model rather than update the underlying geological model. Today, there is a growing demand for a better and more integrated approach to reservoir modeling. The improved "structured" gridder software in accordance with the present invention supports the iterative process of modifying the underlying geological models and then propagating the modifications to the simulation model more quickly than is currently possible.

Many different algorithms have been proposed to perform the gridding task automatically. In practical use, there are two main classes of prior art gridding algorithms: (1) Algebraic methods in which an interpolation formula is used to interpolate the boundary curves; these can work well if the region is not too distorted; and (2) Methods based on the solution of partial differential equations. The best methods of this class solve a diffusion type equation based on transforming Laplace's equation on the physical space to a nonlinear problem in the logical space. Some variants of this approach produce good quality grids, but can suffer from inside-out cells near sharp bends in the boundary. All of these methods require the user to fix the distribution of the grid points on the boundary of the region.

SUMMARY OF THE INVENTION

Accordingly, it is a primary object of the present invention to improve upon the first "grid" program of the prior art and to overcome the deficiencies of the prior art workstation and software based simulation gridding programs by providing an improved simulation gridding program called "Flogrid".

It is a primary aspect of the present invention to provide the improved "Flogrid" simulation gridding program, the improved Flogrid simulation gridding program including an Upscaler and a novel "structured gridder" in accordance the present invention, the novel "structured gridder" further including a block gridder and a novel "structured areal gridder" otherwise known as a "corner point gridder" in accordance with the present invention, the improved "structured areal gridder" coupled with the block gridder gridding an earth formation by imposing a multitude of grid blocks of a structured grid within the earth formation and further generating a multitude of more accurate structured grid block property information which corresponds, respectively, to the multitude of grid blocks, that structured grid block property information being used by a workstation and software based reservoir simulator for generating a multitude of more accurate "simulation results" which correspond, respectively, to the multitude of grid blocks of the structured grid, the simulation results being adapted for viewing on a 3D Viewer.

It is a further aspect of the present invention to provide the improved "Flogrid" simulation gridding program, wherein the Flogrid "structured gridder" includes the "structured areal gridder" and the "structured areal gridder" functions to grid a faulted horizon in the earth formation which includes one or more fault intersection lines by: (a) enclosing the fault intersection lines on the horizon with a boundary, (b) building a triangulation and overlaying the triangulation on the top of said horizon so as to enclose the boundary and the fault intersection lines on the horizon, the triangulation having nodes, (c) building a pair of vector fields having a plurality of directional vectors on the nodes of the triangulation, thereby producing a "vectored triangulation", by assigning one of the directional vectors of the vector fields to each node of the triangulation, each of the directional vectors having a direction, (d) in response to the directions of the plurality of directional vectors on the nodes of the triangulation, building a web of "control lines" which interconnect opposite sides of the boundary by interconnecting the ends of each of the fault intersection lines within the boundary to the opposite sides of the boundary, thereby producing an "areal grid" which overlays the boundary, (e) optionally, adding "additional lines" to the areal grid by interconnecting the additional lines to the opposite sides of the boundary thereby producing a "structured areal grid" having a plurality of nodes which overlays the boundary of the faulted horizon in the earth formation, and (f) either equi-spacing the "control lines" and "additional lines" of the "structured areal grid", or smoothly distributing the "control lines" and the "additional lines" of the structured areal grid.

It is a further aspect of the present invention to provide the improved Flogrid simulation gridding program wherein the Flogrid "structured gridder" further includes the "block gridder", the "block gridder" functioning to build a "structured grid" in the earth formation by: (g) connecting a plurality of coordinate lines to the plurality of nodes of the "structured areal grid" of the aforesaid step (e), and (h) dropping the plurality of coordinate lines down from the nodes of the "structured areal grid" and allowing the dropped coordinate lines to intersect one or more other lower-oriented "horizons" in the earth formation thereby producing a "structured grid", the "structured grid" including a multitude of "grid blocks", each of the grid blocks being disposed between adjacent horizons of the earth formation.

It is a further aspect of the present invention to provide the improved Flogrid simulation gridding program wherein the Flogrid "Upscaler" receives the "structured grid" from the "structured gridder" and assigns the "more accurate structured grid block property information" to each grid block of the multitude of grid blocks of the "structured grid", a workstation and software based reservoir simulator receiving the aforesaid "structured grid block property information" associated with the multitude of grid blocks of the structured grid and generating a "multitude of more accurate simulation results" also associated with the multitude of grid blocks, the multitude of "simulation results" and the corresponding multitude of grid blocks being adapted for viewing on a 3D Viewer of the workstation.

The above object and other objects of the present invention are accomplished and achieved by providing a new simulation gridding software method and apparatus, hereinafter called "Flogrid", which includes an improved "structured gridder" in accordance with the present invention. The improved "structured gridder" further includes a "block gridder" and a "structured areal gridder" also known as a "corner point gridder" in accordance with the present invention.

The "Flogrid" simulation gridding software method and apparatus, which includes the "Petragrid un-structured" gridder and the "structured gridder" software of the present invention (which further includes the "structured areal gridder" of the present invention), is initially stored on a storage medium, such as a CD-Rom. The storage medium is inserted into a computer workstation, and the "Flogrid" simulation gridding software method and apparatus of the present invention is subsequently loaded into and stored in the memory of the workstation. When the "Flogrid" simulation gridding software is executed by a processor of that workstation, input data is loaded into a reservoir data store in Flogrid. The results generated by the reservoir data store are provided to the Flogrid reservoir framework. The reservoir framework is comprised of a structural model and a property model. The structural model will construct 3D structural models and the property model will create and edit properties. A Flogrid upgridder enables the user to group layers within a fine scale model into coarse layers. The results generated by the property model are input to the Flogrid "Petragrid unstructured" gridder, which is disclosed in detail in the "Gunasekera specification". The results generated by the property model are also input to the Flogrid "structured" gridder of the present invention.

The "structured gridder" of the present invention will grid a section of an earth formation by building a "structured" grid and imposing that "structured" grid on the earth formation. A simulator will receive that "structured" grid and, responsive thereto, it will generate a set of more accurate "simulation results" which are viewed by an operator on a 3D viewer. Recalling that the earth formation includes a plurality of faulted horizons having fault intersection lines passing therethrough, and assuming that a boundary on one of the faulted horizons will enclose the fault intersection lines on that horizon, the "structured areal gridder" (also known as a "corner point gridder") disposed within the Flogrid "structured gridder" will build a triangulation over that horizon, the triangulation enclosing the boundary and the fault intersection lines within the boundary. The triangulation includes a plurality of nodes. The "structured areal gridder" will build a vector field comprised of a plurality of directional vectors on the nodes of the triangulation, a directional vector being assigned to each node of the triangulation. The "structured areal gridder" will then use the vector field of the triangulation to build a plurality of "control lines" which will cross the boundary, from top-to-bottom of the boundary, and from left-to-right of the boundary. A "control line" is built and will cross the boundary when a pair of "extension lines" within the boundary (which encloses the fault intersection lines) interconnect the two ends of a fault intersection line on that horizon to the opposite sides of the boundary itself. The "structured areal gridder" will also add some "additional lines" which will also cross the boundary from top-to-bottom of the boundary, and from left-to-right of the boundary. The "structured areal gridder" will then either: (1) equi-space the control lines and the additional lines within the boundary, or (2) smoothly distribute the control lines and the additional lines within the boundary. At this point, a "structured areal grid" overlays the boundary on that horizon, interconnecting the opposite sides of the boundary. The "structured areal grid" includes a plurality of "nodes". The "block gridder" of the "structured gridder" will now function to connect "coordinate lines" to the "nodes" of the "structured areal grid" and the "block gridder" will drop those coordinate lines down from the nodes of the "structured areal grid", into the earth formation, allowing the coordinate lines to intersect with the lowermost horizons situated in the earth formation, thereby producing a multitude of "grid blocks" of a "structured grid". The grid blocks of the "structured grid" are each located between adjacent horizons of the earth formation, a "single grid block" being defined by four adjacent coordinate lines and a pair of adjacent horizons of the earth formation bounded on opposite sides of the grid block. Recalling that the Flogrid simulation gridding program includes an upscaler, the upscaler will now assign an appropriate grid block property to each grid block of the "structured grid". When the plurality of grid block properties are assigned to the respective plurality of grid blocks of the "structured grid" by the Flogrid upscaler, a "structured grid and properties associated therewith" is produced. The "structured grid and properties associated therewith", which represents a "set of more accurate grid block property information", is passed to a reservoir simulator.

As a result, recalling that the "Flogrid" software of the present invention includes the "Petragrid un-structured" gridder and the "structured" gridder of the present invention, the "Petragrid unstructured" gridder or the "structured" gridder of the present invention will, when executed, produce the "set of more accurate grid block property information". Such more accurate grid block property information is received by the reservoir simulator which is also stored in the workstation memory. The Eclipse simulator software will respond to the more accurate grid block property information from "Flogrid" by producing a set of more accurate simulation results (e.g., pressure and saturation values). Each of the more accurate "simulation results" are associated with one of the grid blocks of the structured grid that is imposed on the earth formation, and those "simulation results" are displayed on a 3D Viewer of the workstation for observation and analysis by an operator of the workstation.

Further scope of applicability of the present invention will become apparent from the detailed description presented hereinafter. It should be understood, however, that the detailed description and the specific examples, while representing a preferred embodiment of the present invention, are given by way of illustration only, since various changes and modifications within the spirit and scope of the invention will become obvious to one skilled in the art from a reading of the following detailed description.

BRIEF DESCRIPTION OF THE DRAWINGS

A full understanding of the present invention will be obtained from the detailed description of the preferred embodiment presented hereinbelow, and the accompanying drawings, which are given by way of illustration only and are not intended to be limitative of the present invention, and wherein:

FIGS. 1 through 23 are used in connection with the "Description of the Preferred Embodiment", wherein:

FIGS. 1 through 13d2 are drawings from the "Gunasekera specification" which discloses the "Petragrid" unstructured gridder software (disclosed in prior pending U.S. patent application Ser. No. 08/873,234 filed Jun. 11, 1997 and entitled "Method and Apparatus for generating more accurate earth formation grid cell property information for use by a simulator to display more accurate simulation results of the formation near a wellbore" to Dayal Gunasekera, already incorporated herein by reference), which drawings are provided here to set the background for the "structured" gridder software of the present invention;

FIG. 15 illustrates the functional operation performed by the "Flogrid" simulation gridding method and apparatus and the "Eclipse" simulator software when the "Flogrid" simulation gridding method and apparatus of the present invention and the "Eclipse" simulator software are executed by the workstation processor in response to a well log output record and a reduced seismic data output record;

FIG. 16 illustrates a more detailed construction of the "Flogrid" simulation gridding method and apparatus of FIG. 14c, which includes both the Petragrid "unstructured" gridder of the "Gunasekera specification" and the "structured" gridder method and apparatus of the present invention that is adapted for generating the more accurate earth formation grid block property information for use by the "Eclipse" reservoir simulator;

FIGS. 17 through 23 are used in connection with a functional description of the operation of the "structured" gridder software of the present invention adapted for use within the Flogrid simulation gridding method and apparatus, wherein:

FIG. 17 illustrates seven (7) steps which are performed by the Flogrid "structured" gridder software 68 of the present invention during the construction of a "structured grid", starting with the construction of a "structured areal grid";

FIG. 18 illustrates a boundary, including two i-faults and a single j-fault;

FIG. 19 illustrates smooth extensions of faults to the boundary to build control lines;

FIG. 20 illustrates control lines with some additional lines—zero smoothness;

FIG. 21 illustrates control lines with some additional lines—with smoothness;

FIG. 22 illustrating an example of isotropic gridding between two faults;

FIG. 23 illustrating an example of anisotropic gridding between two faults;

FIGS. 24 through 52 are used in connection with the "Detailed Description of the Preferred Embodiment", wherein:

FIG. 24 illustrates another detailed construction of the "Flogrid" simulation gridding method and apparatus 60a of the present invention including the "structured gridder" 68 of the present invention;

FIG. 25 illustrates a construction of the structural framework 149 of FIG. 24;

FIG. 26 illustrates a construction of the structured gridder 68 of FIG. 24;

FIG. 27 illustrates the functional steps performed by the "structured areal gridder" 68b of FIG. 26; and FIGS. 28a through 52 are drawings which are used in connection with a detailed description of the Flogrid simulation gridding method and apparatus 60a including a detailed description of the "structured areal gridder" 68b of FIG. 26 of the present invention discussed in the "Detailed Description of the Preferred Embodiment"; wherein:

FIGS. 28a and 28b represent the "input data" which are input to Flogrid 60a;

FIGS. 29 and 30 illustrate horizons in a faulted earth formation and the definition of "property maps";

FIG. 31 illustrates a faulted horizon 155 having fault intersection lines 134 passing therethrough, and a "boundary" 136 which encloses the fault intersection lines 134;

FIG. 32 illustrates the boundary 136 of FIG. 31 before distortion;

FIGS. 33 and 34 illustrates the boundary 136 of FIG. 31 after distortion and having a set of fault intersection lines enclosed by the boundary;

FIG. 35 illustrates the boundary 136 of FIG. 34 after distortion and having a plurality of "control lines" also called "streamlines" and "additional lines" 150 imposed over the boundary 136, thereby creating a "structured areal grid";

FIGS. 35a and 36 illustrate how the "coordinate lines" of FIGS. 16a–16c drop down from the nodes of the "structured areal grid" to create a multitude of "grid blocks" of the "structured grid";

FIGS. 37 and 38 illustrate how the structured gridder 68 deals with zig zag faults 144;

FIGS. 39 and 40 illustrate the function of the Flogrid "Upscaler";

FIGS. 41 and 42 illustrate point labels on the reference cube and the grid block (FIG. 41) and interpolating a 2×1×3 fine grid in a grid block (FIG. 42);

FIG. 43 illustrates how a user specifies a boundary and selects i and j faults to which to grid;

FIG. 44 illustrates the contruction of a regular triangular grid (a triangulation) over the boundary of FIG. 43, the boundary of the triangulation being well outside the user specified boundary;

FIG. 45a illustrates "i" and "j" vectors, called "directional vectors";

FIG. 45b1 illustrates a triangulation 178a, 178b overlaying a user specified boundary 176 which contains and encloses a plurality of fault intersection lines 170, 172, 174;

FIGS. 45b2 and 45b3 illustrates how the "frozen" type of "directional vectors" are assigned to nodes of the triangulation of FIG. 4b1;

FIGS. 46 and 47 illustrate isotropic and anisotropic interpolation techniques which are techniques for assigning the "non-frozen" type of "directional vectors" to the nodes of the triangulation of FIG. 45b1;

FIG. 48 illustrates a user specified boundary 176 enclosing fault intersection lines 170, 172, 174 and having "control lines" also called "streamlines" crossing from top to bottom and from left to right of the boundary 176, one such "control line" being identified by the following element numerals [200, 170, 200] and another such "control line" being identified by the following element numerals [200, 172, 200], and still another "control line"being identified by the following element numerals: [200, 174, 200];

FIG. 49 illustrates how a "control line" is built by using the directional vectors of a vector field which are assigned to a nodes of the triangulation of FIG. 45b1;

FIG. 50 illustrates a user specified boundary 176, the fault intersection lines 170, 172, 174, the control lines of FIG. 48, and a set of "additional lines" 204 which supplement the control lines, thereby creating a "structured areal grid" which overlays the boundary 176 on a faulted horizon in an earth formation;

FIG. 51 illustrates how the user determines how many "additional lines" the user wants between the "control lines"; and FIG. 52 illustrates how the widths between the "control lines" and the "additional lines" of the "structured areal grid" of FIG. 50 can vary gradually, that is, the widths can vary "smoothly"; in FIG. 52, the widths are not "equispaced" as illustrated in FIG. 50.

DESCRIPTION OF THE PREFERRED EMBODIMENT

The "Description of the Preferred Embodiment" will be divided into two sections, a First Section and a Second Section.

Figure 1:
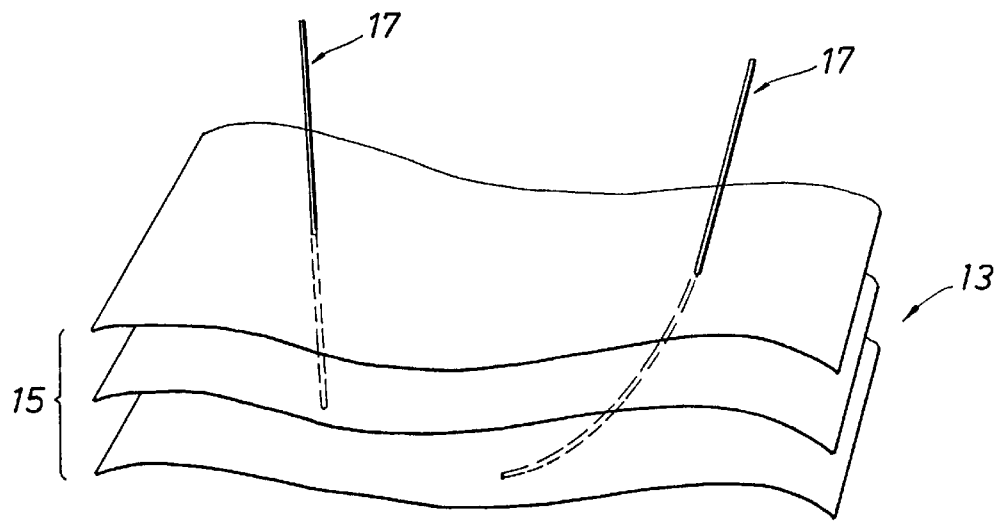
Figure 2:
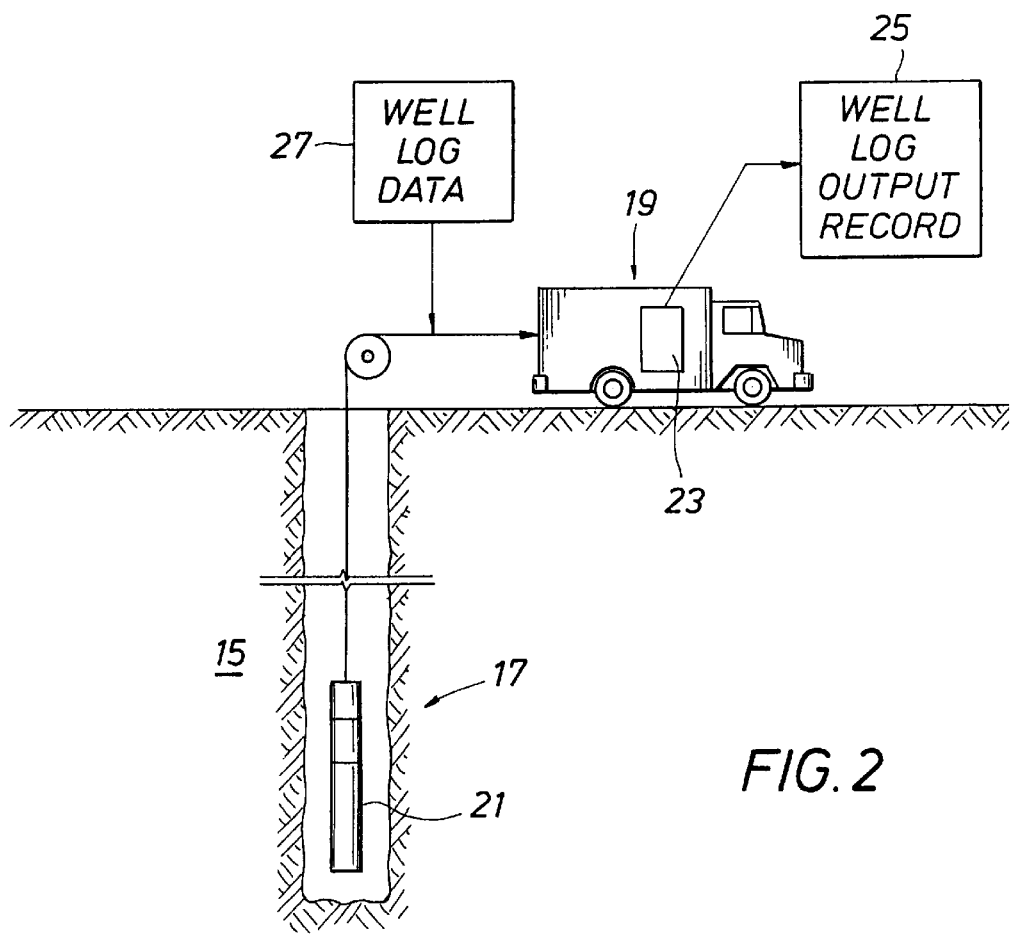

The "First Section" of the "Description of the Preferred Embodiment" of this specification, with reference to FIGS. 1 through 13d2, will provide a review of the above identified Gunasekera specification, which is the prior pending application that discloses the Petragrid "unstructured" gridder software that is disposed within the Flogrid simulation gridding program.

The "Second Section" of the "Description of the Preferred Embodiment" of this specification, with reference to FIGS. 14a through 23, will discuss the "Flogrid" simulation gridding program including the "structured" gridder software, which further includes the "structured areal gridder" of the present invention, that is disposed within the Flogrid simulation gridding program.

The Detailed Description of the Preferred Embodiment, with reference to FIGS. 24 through 52, will provide a detailed discussion of the "Flogrid" simulation gridding program including a detailed discussion of the "structured areal gridder" of the present invention.

First Section—the Petragrid "Un-Structured" Gridder software Used in Flogrid (1) Background Information Referring to FIGS. 1 through 13d2 with initial reference to FIGS. 1 through 7, 11, and 12, the well logging operations for producing well log data and the seismic operations for producing seismic data is illustrated.

In FIG. 1, a plurality of earth formation horizons 13 comprise an earth formation 15 and a pair of wellbores 17 have been drilled into the formation 15 for the ultimate purpose of withdrawing wellbore fluid from the formation. The earth formation 15 will be modeled and simulated on an interpretation workstation computer by the "Petragrid" software.

In FIG. 2, one of the wellbores 17 of FIG. 1 is illustrated as penetrating the earth formation 15 of FIG. 1. A well logging truck 19 lowers a logging tool 21 into the wellbore 17 and the logging tool 21 stimulates and energizes the formation 15. In response, sensors in the logging tool 21 receive signals from the formation 15, and, in response thereto, other signals representative of well log data 27 propagate uphole from the logging tool 21 to a well logging truck computer 23. A well log output record 25 is generated by the well logging truck computer 23 which displays the well log data 27.

Figure 3:
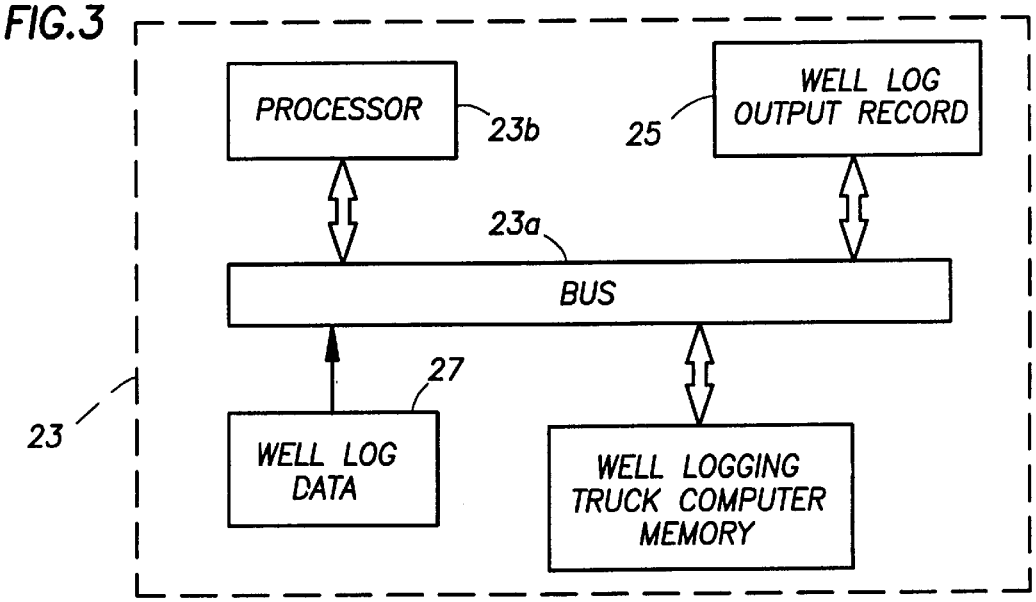

In FIG. 3, a more detailed construction of the well logging truck computer 23 is illustrated. A bus 23a receives the well log data 27 and, responsive thereto, the well log output record 25 is generated by the processor 23b, the well log output record 25 displaying and/or storing the well log data 27. The well log output record 25 is input to the interpretation workstation of FIGS. 8 and 9.

Figure 4:
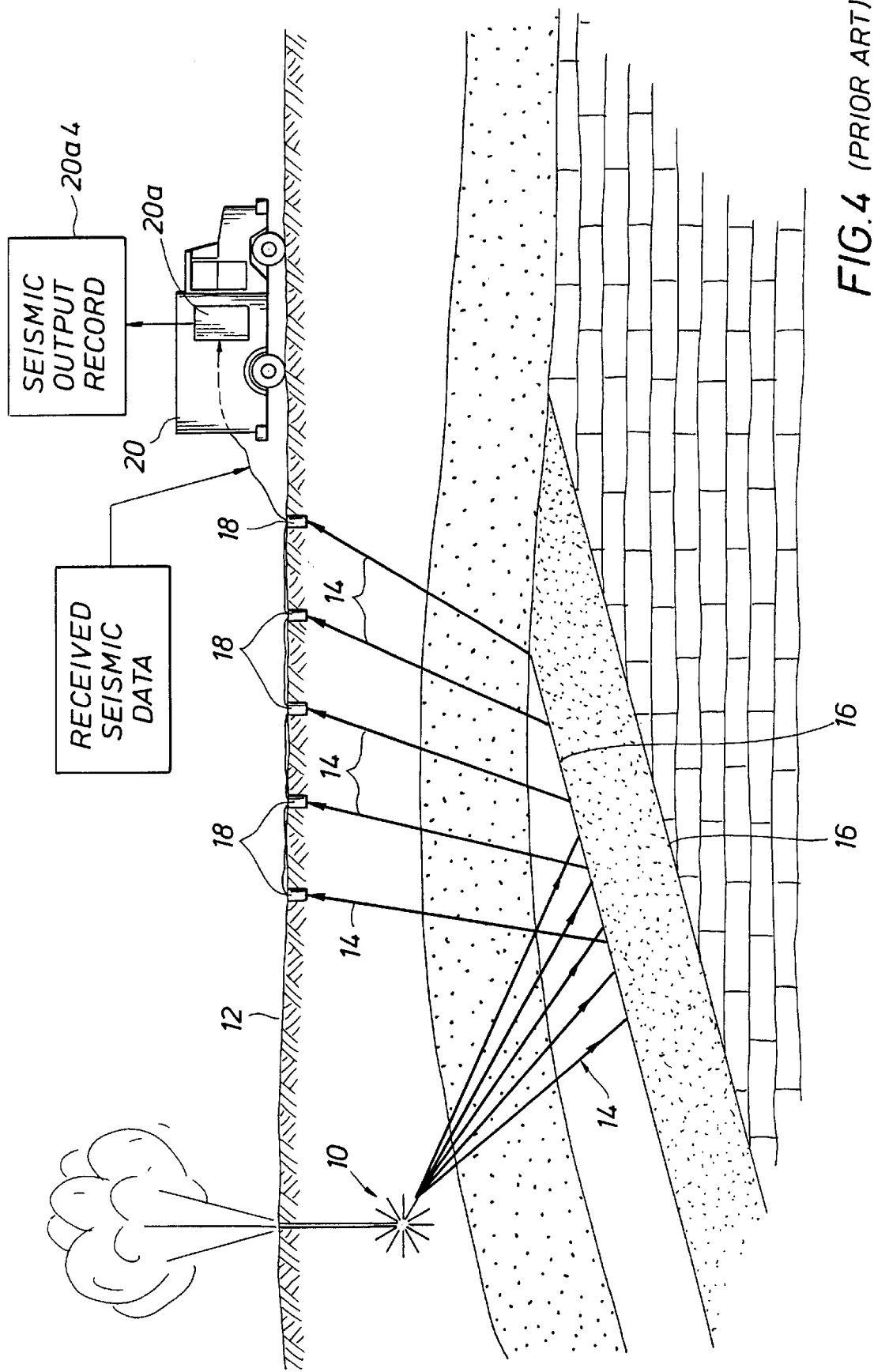
Figure 5:
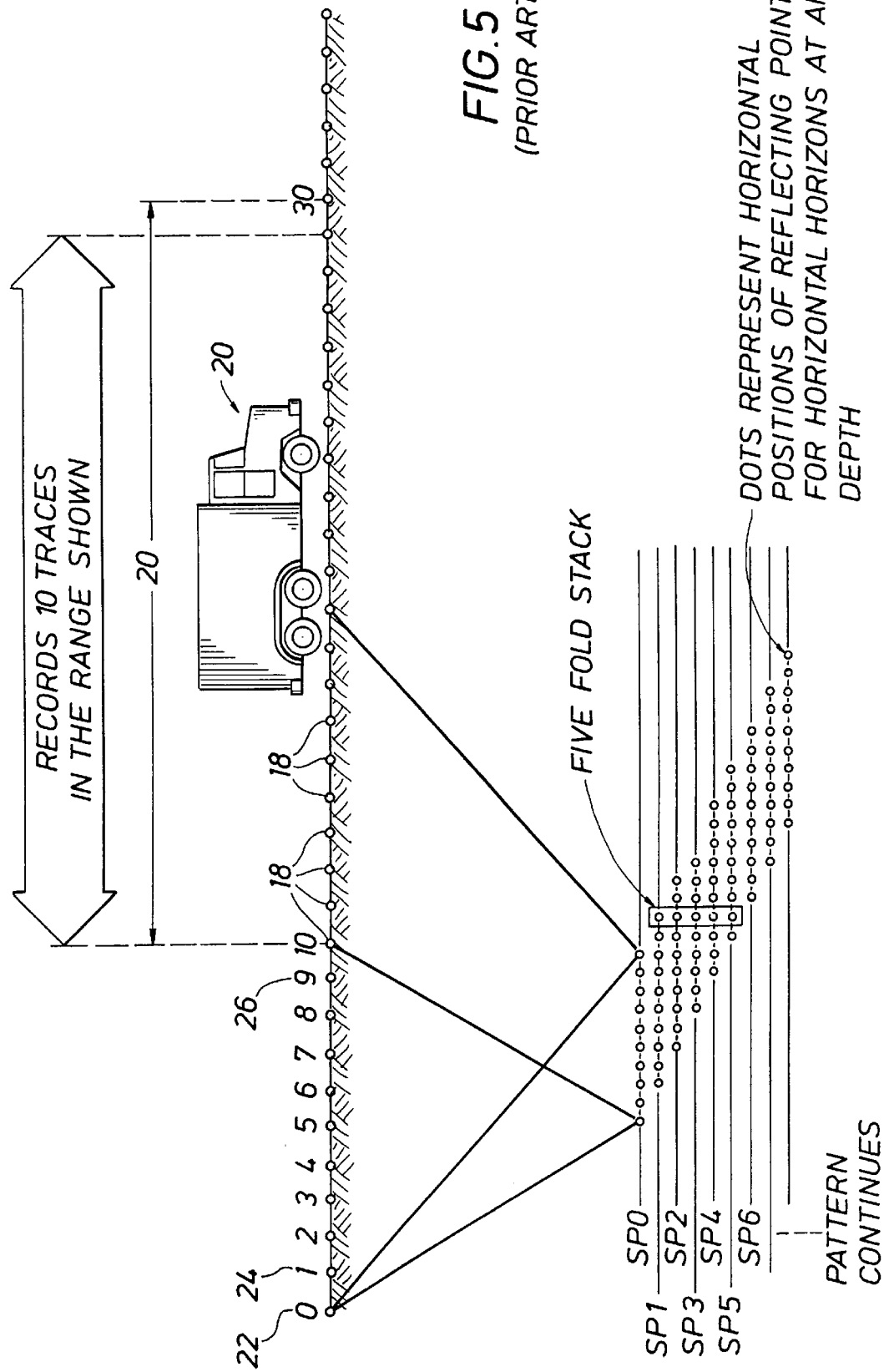

In FIGS. 4 and 5, an apparatus and associated method for performing a three dimensional (3D) seismic operation at a location on the earth's surface near the wellbores 17 of FIG. 1 is illustrated.

In FIG. 4, an explosive or acoustic energy source 10 situated below the surface of the earth 12 detonates and generates a plurality of sound or acoustic vibrations 14 which propagate downwardly and reflect off a horizon layer 16 within the earth formation. The horizon layer 16 could be a top layer of rock or sand or shale. When the sound vibrations reflect off the horizon layer 16, the sound vibrations 14 will propagate upwardly and will be received in a plurality of receivers 18 called geophones 18 situated at the surface of the earth. The plurality of geophones 18 will each generate an electrical signal in response to the receipt of a sound vibration therein and a plurality of electrical signals will be generated from the geophones 18, the plurality of signals being received in a recording truck 20. The plurality of electrical signals from the geophones 18 represent a set of characteristics of the earth formation including the horizons 16 located within the earth below the geophones 18. The recording truck 20 contains a computer 20a which will receive and store the plurality of signals received from the geophones 18. A seismic output record 20a4 will be generated from the computer 20a in the recording truck 20 which will include and/or display and/or store the plurality of electrical signals that are representative of the characteristics of the earth formation including the horizons 16 located within the earth below the geophones 18.

In FIG. 5, another method and apparatus for performing a 3D seismic operation is illustrated. FIG. 5 was taken from a book entitled "Seismic Velocity Analysis and the Convolutional Model", by Enders A. Robinson, the disclosure of which is incorporated by reference into this specification. The 3D seismic operation of FIG. 4 is performed 10 different times. For example, when the explosive energy source 10 is located at position 22 (the first position or position "0" along the surface of the earth) in FIG. 4, a first plurality of electrical signals from the geophones 18 are stored in the computer 20a in the recording truck 20. The explosive energy source is moved to position 24. When the explosive energy source 10 is located in position 24 (the second position or position "1" along the surface of the earth), a second plurality of electrical signals are stored in the computer 20a in the recording truck 20. The explosive energy source 10 is repeatedly and sequentially moved from positions "2" to "9" in FIG. 5 until it is located at position 26 (i.e.—position "9" which is the tenth position) on the surface of the earth. When the explosive energy source 10 is located in position 26 (the tenth position along the surface of the earth), a tenth plurality of electrical signals are stored in the computer 20a in the recording truck 20. As a result, in FIG. 5, the recording truck 20 records 10 traces (ten sets of electrical signals, where each set is a plurality of electrical signals) between position 22 and position 26 along the surface of the earth. A seismic output record 20a4 will be generated by the computer 20a in the recording truck 20 which includes the 10 traces or ten set of electrical signals received from the geophones 18.

Figure 6:
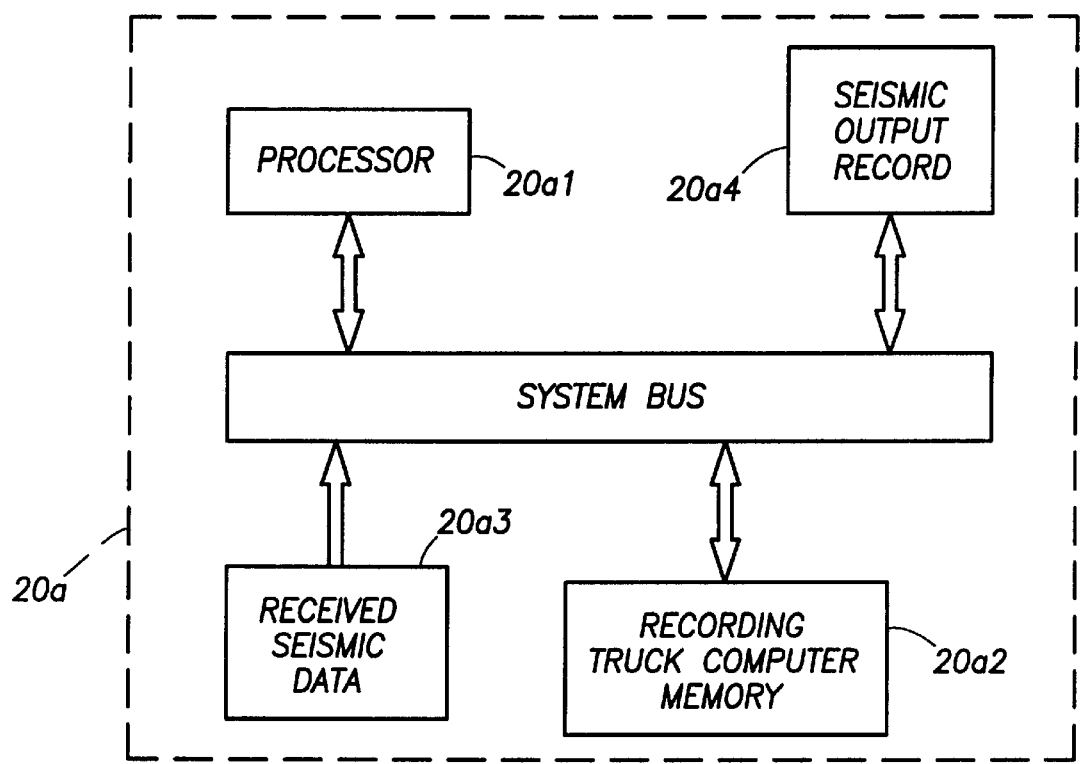

In FIG. 6, a more detailed construction of the recording truck computer 20a is illustrated. The recording truck computer 20a of FIG. 4 includes a processor 20a1 and a memory 20a2 connected to a system bus. The ten traces or ten sets of electrical signals (received from the geophones 18 during the 3D seismic operation) would be received into the recording truck computer 20a via the "Received Seismic Data" block 20a3 in FIG. 3 and would be stored in the memory 20a2 of the recording truck computer 20a. When desired, a seismic output record 20a4 is generated by the recording truck computer 20a, the seismic output record 20a4 being adapted for storing and displaying "a plurality of seismic data" representing the ten traces or ten sets of electrical signals received by the recording truck computer 20a from the geophones 18.

Figure 7:
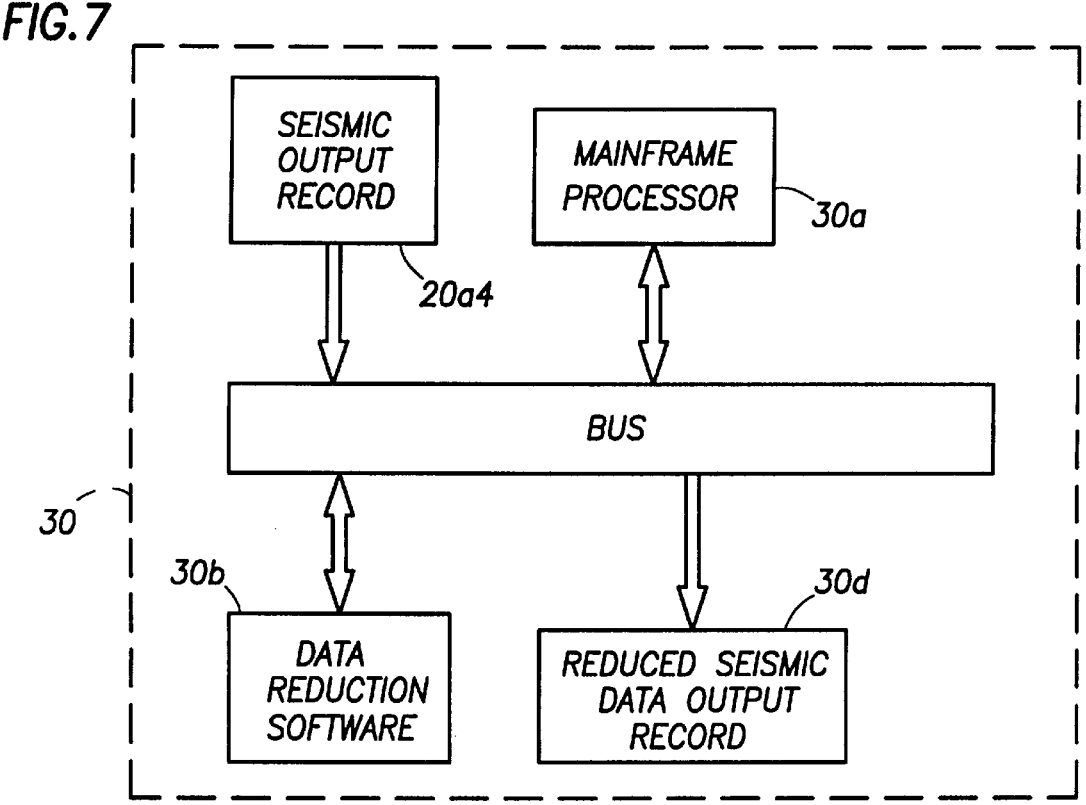

In FIG. 7, a simplified diagram of a mainframe computer 30 is illustrated which uses a stored "data reduction software" to perform a "data reduction" operation on the "plurality of seismic data" included in the seismic output record 20a4 of FIG. 6. The mainframe computer 30 produces a "reduced seismic data output record" 30d in FIG. 7 which is adapted for storing and displaying information that represents "reduced" versions of the "plurality of seismic data" included in the output record medium 20a4 of FIG. 3. The mainframe computer 30 of FIG. 4 includes a mainframe processor 30a connected to a system bus and a memory 30b also connected to the system bus which stores a "data reduction software" therein. The seismic output record 20a4 of FIG. 6, which includes the "plurality of seismic data", is connected to the system bus of the mainframe computer 30 of FIG. 7. As a result, the "plurality of seismic data", included in the output record medium 20a4 of FIG. 6, is now being input to the mainframe processor 30a of FIG. 7. The processor 30a of the mainframe computer 30 in FIG. 7 executes the "data reduction software" stored in the memory 30b of the mainframe computer. The "data reduction software", which is stored in the memory 30b of the mainframe computer 30 of FIG. 4, can be found in a book entitled "Seismic Velocity Analysis and the Convolutional Model", by Enders A. Robinson, the disclosure of which is incorporated by reference into this specification. When the "data reduction software" in memory 30b is executed, the mainframe processor 30a will perform a "data reduction" operation on the "plurality of seismic data" that is included in the seismic output record 20a4 of FIG. 7. When the "data reduction operation" is complete, the mainframe processor 30a will generate a "reduced seismic data output record" 30d which will store and is adapted for displaying information: representing a "reduced version" of the "plurality of seismic data" included in the seismic output record 20a4 of FIG. 7, and including a set of characteristics pertaining to the earth formation located near the wellbore 17 of FIG. 1, the characteristics including the location and structure of the horizons 16 of FIG. 4.

Figure 11:
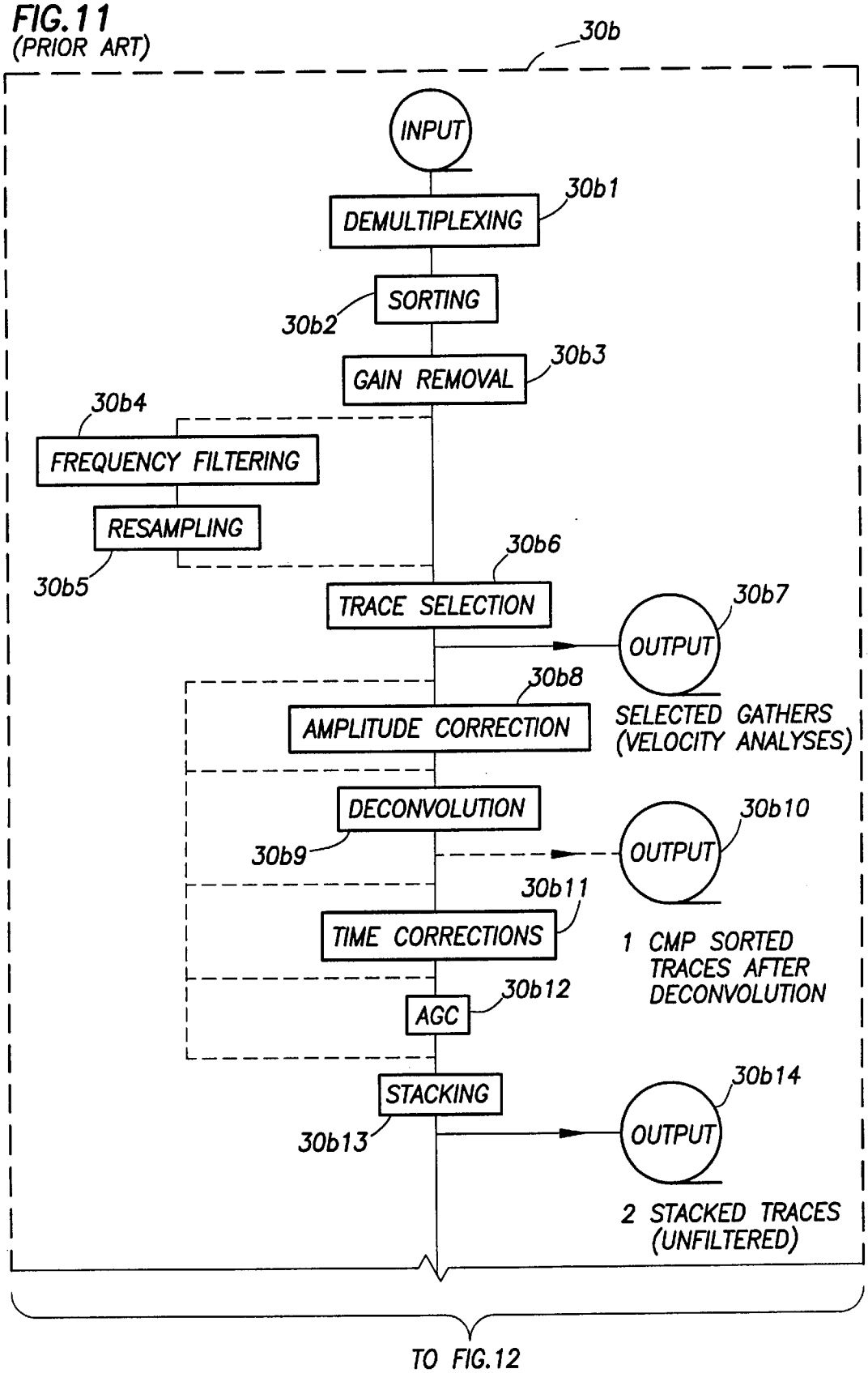
Figure 12:
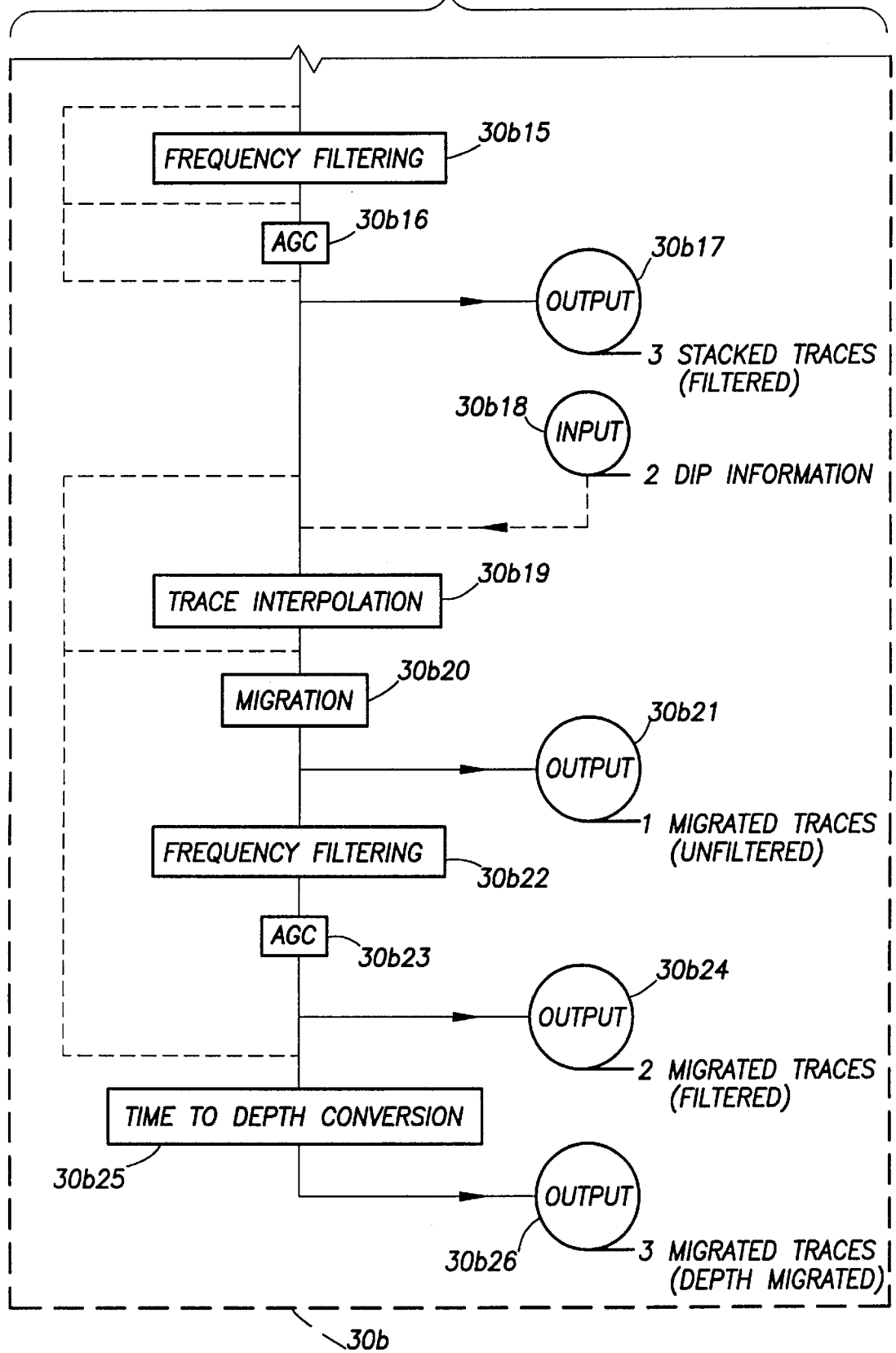

In FIGS. 11 and 12, a flowchart of the data reduction software 30b stored in the memory 30b of the mainframe computer 30 of FIG. 7 is illustrated. The data reduction software flowchart of FIGS. 11 and 12 is taken from a book entitled "Seismic Velocity Analysis and the Convolutional Model" by Enders A. Robinson, the disclosure of which has already been incorporated by reference into this specification. The flowchart of the data reduction software 30b includes the following blocks: a demultiplexing block 30b1 connected to the input, a sorting block 30b2, a gain removal block 30b3, a frequency filtering block 30b4, a resampling block 30b5, a trace selection block 30b6, an output 30b7 labelled "selected gathers (velocity analyses), amplitude correction 30b8, deconvolution 30b9, a second output 30b10 labelled "CMP sorted traces after deconvolution", a time corrections block 30b11, an AGC block 30b12, a stacking block 30b13, a third output 30b14 labelled "stacked traces (unfiltered)", a frequency filtering block 30b15, another AGC block 30b16, a fourth output 30b17 labelled "stacked traces (filtered)", a second input labelled "dip information" 30b18, a trace interpolation block 30b19, a migration block 30b20, a fifth output 30b21 labelled "migrated traces (unfiltered)", a frequency filtering block 30b22, an AGC block 30b23, a sixth output 30b24 labelled "migrated traces (filtered)", a time to depth correction block 30b25, and a seventh output 30b26 labelled "migrated traces (depth migrated)". In the flowchart of FIGS. 11 and 12, any of the outputs 30b7, 30b10, 30b14, 30b17, 30b21, 30b24, and 30b26 can be used as inputs to the main frame computer 30 or the interpretation workstation discussed below with reference to FIG. 8 and 9 of the drawings.

(2) Summary of the Petragrid Un-Structured Gridder Method and Apparatus

Referring to FIGS. 8, 9, 10, 13a, 13b, 13c1 and 13c2, a summary of the Petragrid Method and Apparatus, which is responsive to the well log output record 25 and the reduced seismic data output record 30d, produced by the well logging operations and the seismic operations of FIGS. 1 through 7, is illustrated.

Figure 8:
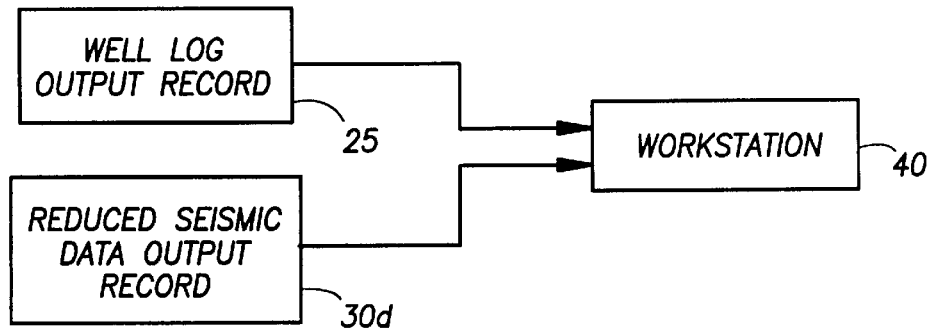

In FIG. 8, the well log output record 25 of FIG. 3 and the reduced seismic data output record 30d of FIG. 7 are both input to an interpretation workstation 40. This workstation 40 stores the Petragrid software of the present invention which, when executed, generates more accurate horizon grid cell property information which is adapted for use by a simulation program, the simulation program, when executed, modeling and simulating the well fluid producing properties of the earth formation 15 adjacent the one or more wellbores 17 of FIG. 1.

Figure 9:
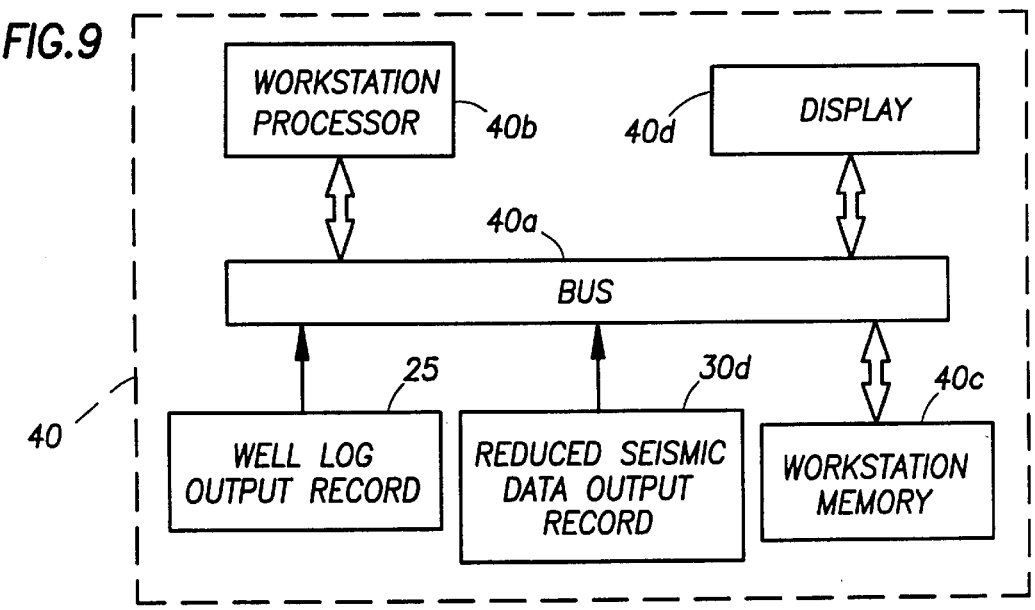

In FIG. 9, the interpretation workstation 40 of FIG. 8 is illustrated in greater detail. The workstation 40 includes a bus 40a, a workstation processor 40b connected to the bus 40a, a workstation memory 40c connected to the bus 40a, and a display 40d connected to the bus 40a. The well log output record 25 and the reduced seismic data output record 30d are both connected to the bus 40a of the workstation 40; as a result, the well log data and the reduced seismic data stored in the well log output record 25 and the reduced seismic data output record, respectively, will be input to the workstation 40 and made available to the workstation processor 40b. The contents of the workstation memory 40c is illustrated in FIG. 10.

In FIG. 10, the workstation memory 40c of FIG. 9 stores at least two blocks of software:

(1) a first block of software hereinafter called the "Petragrid software" 40c1 which generates more accurate horizon grid cell property information needed by the Eclipse Simulator software 40c2 discussed below; and (2) a second block of software hereinafter called the "Eclipse Simulator software" 40c2 which receives the more accurate horizon grid cell property information which is generated by the Petragrid software 40c1; the Eclipse Simulator software 40c2 is discussed in a manual entitled "ECLIPSE 100 User Manual", which is available from "GeoQuest, a division of Schlumberger Technology Corporation" located in Abingdon, the United Kingdom (U.K.). The "ECLIPSE 100 User Manual" is incorporated by reference into the specification of this application. The Eclipse Simulator software 40c2 will more accurately model and simulate the well fluid producing properties of the earth formation 15 that is located near the wellbores 17 of FIG. 1 as a result of the more accurate horizon grid cell property information which is received from the Petragrid software 40c1.

Referring to to FIGS. 13a and 13b, 13c1 and 13c2, the following paragraphs will provide a summary of the Petragrid software 40c1 of FIG. 10 of the present invention.

Figure 13A:
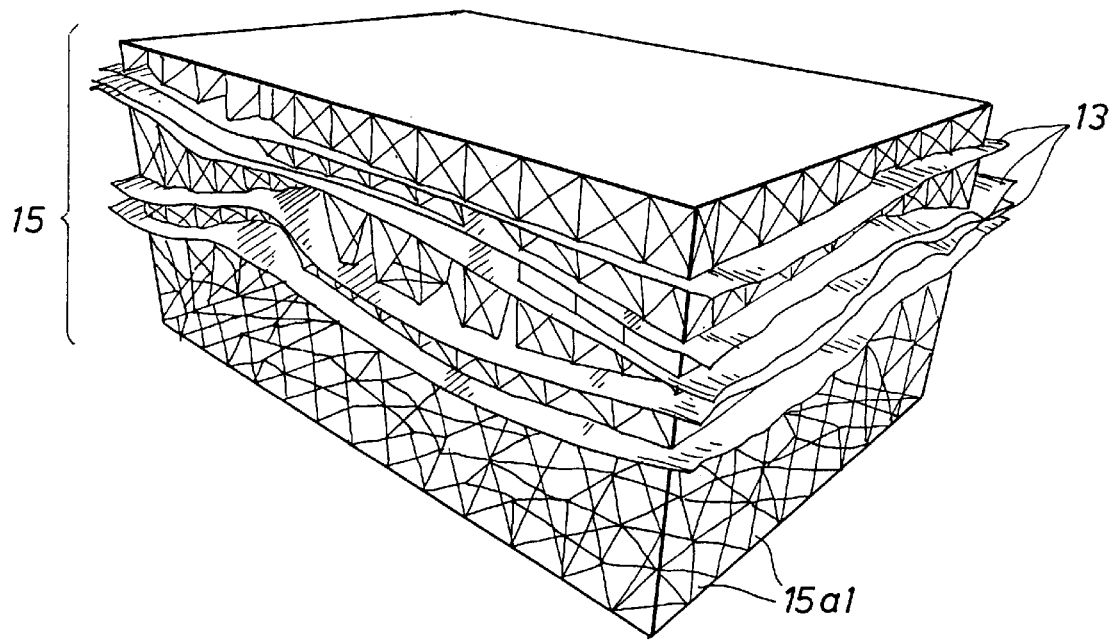

In FIG. 13a, the earth formation 15 of FIG. 1 is again illustrated, the formation 15 including four (4) horizons 13 which traverse the longitudinal extent of the formation 15 in FIG. 13a. Recall that a "horizon" 13 is defined to be the top surface of an earth formation layer, the earth formation layer comprising, for example, sand or shale or limestone, etc.

However, the Petragrid software 40c1 will "grid" the formation 15 which is located intermediate the horizon layers 13. That is, in between the horizons 13 and on top of the uppermost horizon 13 and below the lowermost horizon 13, the Petragrid software 40c1 will "grid" the formation 15. When gridding the formation 15, the formation 15 will be divided up into a multitude of individual cells which, when connected together, comprise the grid.

Figure 13B:
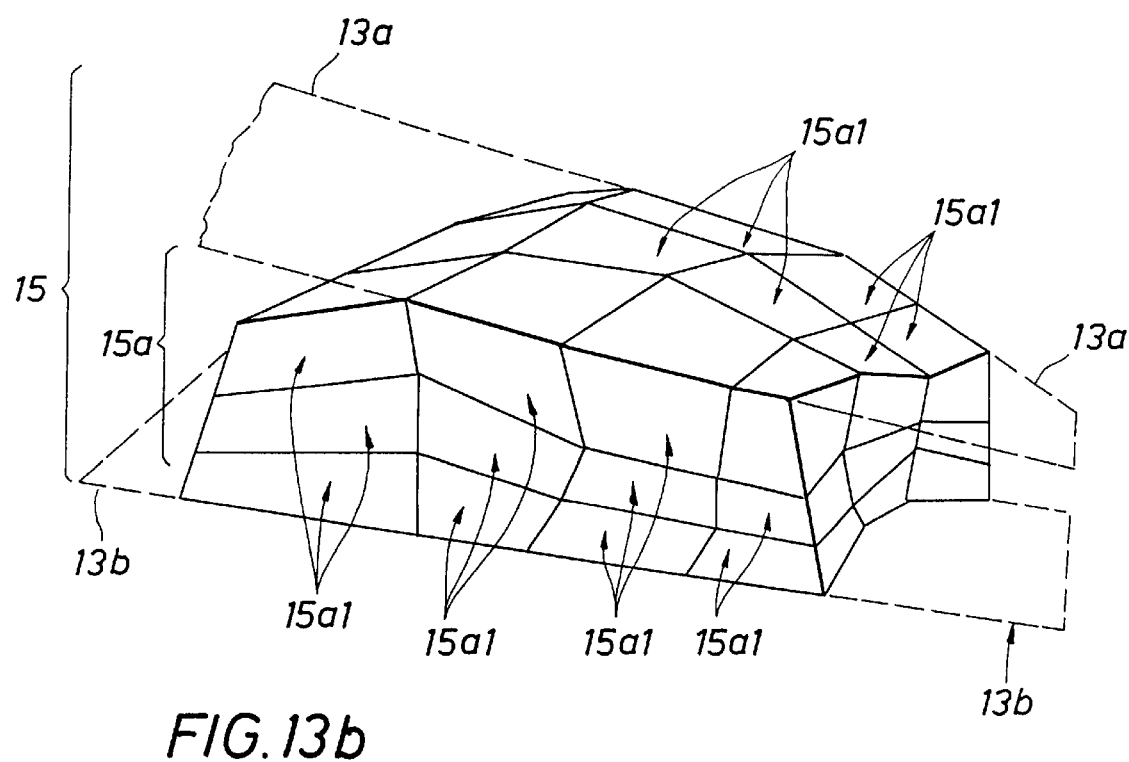

In FIG. 13b, for example, the formation 15 includes an uppermost horizon 13a and a lowermost horizon 13b which is separated from the uppermost horizon 13a by an intermediate earth formation layer 15a. The intermediate earth formation layer 15a includes, for example, a sand layer or a shale layer or a limestone layer, etc. The Flogrid simulation gridding program, including the Petragrid software 40c1 and the structured areal gridder of the present invention, will "grid" the earth formation layer 15a. That is, the formation layer 15a will be divided up, by the Flogrid simulation gridding program (including the Petragrid software 40c1) into a multitude of individual cells 15a1.

In the prior art, a software product known as "Grid" was marketed by GeoQuest, a division of Schlumberger Technology Corporation, Abingdon, the United Kingdom (UK). The "Grid" software would divide the formation layers 15a into a multitude of cells. However, each of the multitude of cells were approximately "rectangular" in cross sectional shape.

In FIG. 13b, the cells 15a1 are shown to be approximately "rectangular" in cross sectional shape.

In FIG. 13a, however, the Petragrid software 40c1 will also create the multitude of cells 15a1 in the earth formation 15 intermediate the horizons 13; however, each cell 15a1 can have a cross sectional shape that, in addition to being approximately "rectangular" in cross section (hereinafter called a "structured" grid), is either approximately "polygonal" or "tetrahedral" in cross section (hereinafter called an "un-structured" grid). FIG. 13a clearly shows a multitude of cells 15a1 where each cell 15a1 has a cross sectional shape which is either approximately "polygonal" or "tetrahedral" (i.e., "unstructured") in addition to "rectangular" (i.e., "structured").

In FIG. 13c1, having described, with reference to FIGS. 13a and 13b, one function of the Petragrid software 40c1 (i.e.—"gridding" the formation with a multitude of cells) and having described a first potentially novel function of the Petragrid software 40c1 (i.e.—creating individual cells of the grid which are either approximately "polygonal" or "tetrahedral" in cross sectional shape in addition to approximately "rectangular" in cross sectional shape), FIG. 13c1 illustrates "additional potentially novel features" of the Petragrid software 40c1 of FIG. 10.

In FIG. 13c1, the Petragrid software 40c1 receives the well log output record 25 of FIG. 3 and the reduced seismic data output record 30d of FIG. 7, and, responsive thereto, the Petragrid software 40c1 generates a set of "more accurate" output data 40c3, the "more accurate" output data 40c3 being input to the Eclipse simulator software 40c2. The Eclipse simulator software 40c2 will, in turn, generate a "more accurate" set of simulation results which will be displayed on the workstation display 40d of FIG. 9. As a result, the Eclipse simulator software 40c2 will "more accurately" model and simulate the earth formation 15 located near the wellbores 17 of FIG. 1 for the purpose of determining the well fluid producing properties of the earth formation 15.

In FIG. 13c1, the Petragrid software 40c1 includes the following novel blocks of code (blocks 40c1A, 40c1B, 40c1C, 40c1D, and 40c1E) which represent novel features relative to the prior art "Grid" software and other software of the prior art. A more complete flow diagram of the Petragrid software 40c1 will be discussed below with reference to FIG. 13c2:

1. Base Triangulation/Tetrahedralization—Block 40c1A

In FIG. 13c1, before beginning, a definition of the term "K-orthogonal" is provided. A grid is locally "K-orthogonal" if "Ka" is parallel to "r", where "K" is the local permeability tensor, "a" is the interface area vector between a pair of cells, and "r" is the vector from one cell center to the other. The generation of a base triangulation or a tetrahedralization, including the coordinates of the vertices and of the center for each element, is addressed here. In the prior art, K-orthogonal grids are generated by distributing points in 2D or 3D space based on the geometry of the physical model. The distributed points are then triangulated (in 2D space) or tetrahedralized (in 3D space). The center of each triangle is calculated by intersecting the K-orthogonal lines through the midpoints of the edges. The center of each tetrahedron is calculated by intersecting the K-orthogonal lines through the circumcenters of the faces. This approach has the disadvantage of a center being a long way from the centroid of an element when the permeability has a high level of anisotrophy, leading to overlapping simulation cells. In accordance with a further aspect of the Petragrid software relating to "Base triangulation/Tetrahedralization" (block 40c1A), a "new algorithm" will generate an approximately "K-orthogonal" triangular base grid for two dimensional (2D) unstructured grids, and the new algorithm will also generate an approximately "K-orthogonal" tetrahedral base grid for three dimensional (3D) unstructured grids. However, that new algorithm, which generates the approximately "K-orthogonal" triangular base grid for two dimensional "2D" unstructured grids and the approximately "K-orthogonal" tetrahedral base grid for three dimensional "3D" unstructured grids, will do so by "scaling" the physical geometry. More particularly, the aforementioned "new algorithm" associated with "Base Triangulation Tetrahedralization" (block 40c1A of FIG. 13c1), which: (1) generates the aforementioned approximately "K-orthogonal" triangular base grid for two dimensional (2D) unstructured grids by "scaling" the physical geometry, and (2) generates the approximately "K-orthogonal" tetrahedral base grid for three dimensional (3D) unstructured grids by "scaling" the physical geometry, will generate the aforementioned two types of grids by performing the following functional steps: (1) the physical geometry is mapped into a computational space by using a transformation based on the components of the permeability tensor in each layer of the model; (2) points are distributed in the computational space based on the mapped geometry; (3) a Delaunay triangulation or a tetrahedralization of the points is created, where: (3a) the center of each element (i.e., each "cell") of the triangulation is the center of a circle which is drawn through the vertices of each cell, and (3b) the center of each cell of the tetrahedralization is the center (or circumcenter) of a sphere which is drawn through the vertices of each element or cell; and (4) the vertices of the elements or cells and the centers of the cells are then transformed back into physical space. This approach produces a better quality grid.

2. Triangle/Tetrahedra Aggregation—Block 40c1B

In FIG. 13c1, prior to generating a simulation grid, such as the grids of FIGS. 13a and 13b, the elements or cells of a base triangulation (triangular grid in 2D space) or a tetrahedralization (tetrahedral grid in 3D space) can be aggregated into sets in order to reduce the number of cells in a composite triangular/tetrahedral grid and to reduce the number of faces in a PEBI grid, with minimal loss of accuracy of subsequent simulation results. A new algorithm associated with "Triangle—Tetrahedra Aggregation" (block 40c1B of FIG. 13c1) will "aggregate into sets" a pair of "triangle" shaped cells or a pair of "tetrahedra" shaped cells of a grid (such as cells 15a1 of FIG. 13a) when the distance between the circumcenters of the pair of cells is regarded as small as compared to the size of the pair of cells. This operation is performed iteratively so that a plurality of aggregated sets are created, each set of the plurality of aggregated sets including one or more cells. If a set of triangularly shaped cells of a grid, or a set of tetrahedra shaped cells of a grid, are clustered together, the new algorithm associated with "Triangle—Tetrahedra Aggregation" (block 40c1B of FIG. 13c1) will group that set of cells together. That grouping of triangular or tetrahedra shaped cells into groups would reduce the number of cells in the grid without reducing the accuracy of the simulation being performed by the Eclipse Simulator software 40c2 of FIG. 10

3. Cell Generation—Block 40c1C

In FIG. 13c1, the definition of the word "circumcenter" is provided. The "circumcenter" of each cell of a tetrahedralization (i.e., of a tetrahedral cell in a 3D grid) is the center of a sphere which is drawn through the vertices of each tetrahedrally shaped cell. The "circumcenter" of each cell of a triangulation (i.e., of a triangular cell of a 2D grid) is the center of a circle which is drawn through the vertices of each triangular shaped cell. A triangle shaped cell or a tetrahedron shaped cell or a triangle composite shaped cell or a tetrahedra composite shaped cell or a collection of any one or more of the aforesaid cells are each a K-orthogonal simulation cell provided that the "circumcenter" is used as the simulation cell center. A triangle shaped cell or a tetrahedron shaped cell or a collection of them can each be used as simulation cells of a grid provided that you use the "circumcenters" as the simulation cell centers. When a "collection" of triangle shaped cells or tetrahedron shaped cells of a grid are used as simulation cells, the "combined" circumcenters of that "collection" is used as the simulation cell center.

4. Cell Property Calculation—Block 40c1D

In FIG. 13c1, a new algorithm for calculating the "Transmissibility" between a pair of approximately K-orthogonal cells of a grid, such as between the adjacent cells 15a1 of the grid shown in FIG. 13a, is given by formula (17) reproduced below.

Transmissibility—The transmissibility between a pair of cells i and j, for 2D TET, 2D PEBI, 3D TET and 3D PEBI cells is given by the following formula:

$$T_{ij} = \frac{C_D}{1/t_i + 1/t_j} \tag{17}$$

where $$t_i = \frac{a^T K_i r_i}{\|r_i\|^2} \tag{18}$$

$$K_i = \begin{pmatrix} NTG & 0 & 0 \\ 0 & NTG & 0 \\ 0 & 0 & 1 \end{pmatrix} K_{i(raw)} \tag{19}$$

and where:

$a$ = area vector of the interface $K_i$ = permeability tensor of cell $i$ adjusted by net to gross $r_i$ = vector from centre of cell $i$ to the interface along the line of centres $C_D$ = Darcy constant $NTG$ = net to gross thickness ratio The transmissibility between a pair of radial cells is calculated using radial flow theory between pressure average centres. The transmissibility between a radial cell and a linear cell is also calculated using radial flow between the respective cell centres.

5. Cell Numbering—Block 40c1E

In FIG. 13c1, the linear algebra solver in the Eclipse Simulator software 40c2 functions by using "structured" grids, not un-structured grids. Yet, the grid of FIG. 13a used by the Petragrid software 40c1 is an un-structured grid. As a result, a method is needed to map the unstructured grid into a structured grid for use by the Eclipse simulator software 40c2. Therefore, in accordance with a further aspect of the present invention, a new algorithm associated with the "Cell Numbering" block of code c1E will "re-number" each cell of the un-structured grid and map said each cell of the re-numbered unstructured grid into a structured grid which can be used by the Eclipse simulator software 40c2. As a result, the new algorithm, called the "Cell Renumbering"

block of code 40c1E in FIG. 13c1, will "re-number" each cell of the un-structured grid by assigning an (I, J, K) index to said "each cell" of the un-structured grid. Another block of code called a "Data Exporter", discussed below, will map said "each cell" of the unstructured grid into a corresponding cell of a structured grid, said corresponding cell of the structured grid being assigned an address which consists of the aforesaid (I, J, K) index of said "each cell. In the prior art, the corresponding method included placing a rectangular grid of equal cell size over the whole geometry and numbering cells in the unstructured grid by traversing the rectangular grid in logical cell order. However, in accordance with the further aspect of the present invention, a domain based line sweep method is disclosed for mapping an unstructured grid into a structured grid for use with a conventional reservoir simulator 40c2. The sweep step length is determined dynamically from the centers of neighboring cells. Recalling that an unstructured grid consists of a set of domains, some of which are structured and some of which are unstructured, the new algorithm, associated with "Cell Renumbering" (block 40c1E in FIG. 13c1) of the present invention, will number the structured domains in logical order. The unstructured domains are numbered as a single entity by sweeping a line through the grid in the X and Y directions. The location of the center of each cell is used during the line sweep to assign I, J indices of cells. K indices are assigned using the logical cell number, but where a logical numbering is unavailable, a line sweep in Z may be used. All domains are then slotted into a global structured grid.

In FIG. 13c2, a more complete flowchart of the Petragrid software 40c1 of FIGS. 10 and 13c1 is illustrated. The novel features of the Petragrid software 40c1 of FIG. 13c1 (blocks 40c1A through 40c1E) are included in the flowchart of FIG. 13c2. In FIG. 13c2, the Petragrid software 40c1 includes the following blocks of code: A block of code called an "internal model builder" 40c1F receives the well log output record 25 and the reduced seismic data output record 30d and, responsive thereto, the internal model builder 40c1F generates an "internal model 40c1G data structure". The internal model builder 40c1F will create a "boundary" into which the "points" in the "points" data structure 40c1J (generated by the "Points Distributor" 40c1I) will be distributed. The reduced seismic data output record 30d defines where the horizons 13 of FIG. 1 and the faults are located inside the "boundary", and the well log output record 25 defines where the wellbores 17 of FIG. 1 are located inside the "boundary". However, the operator, at workstation 40 of FIG. 9, will define the "boundary" itself by defining a line in aerial space. The "internal model" 40c1G data structure comprises that "boundary". A block of code called a "Point Distributor according to features and controls" 40c1I will receive the internal model 40c1G data file and will distribute a plurality of "points" inside the "boundary" (e.g., a 3D volume of space for tetrahedrally shaped cells); when the plurality of "points" are distributed inside the "boundary", a "points" data structure 40c1J is generated. However, a block of code called a "Control Parameter Editor" 40c1H will: (1) control the distance between adjacent "points" distributed inside the "boundary" thereby defining a fine grid or a coarse grid, (2) define the number of such "points" in the x-direction and the number of such "points" in the y-direction, and (3) define the number of radial divisions or "rings" around the wellbore. A block of code called an "Automatic Triangulator Tetrahedralizer" 40c1A (see block 40c1A of FIG. 13c1) will receive the "Points" data structure 40c1J which contains a multitude of "points" inside the "boundary" and it will connect together all of the "points" in the "points" data structure 40c1J in such a way as to create a "plurality of triangles" (for 2D space) and a "plurality of tetrahedra" (for 3D space) thereby generating a "triangles tetrahedra" 40c1K data structure. A block of code called a "triangle/tetrahedra aggregator" 40c1B (see block 40c1B of FIG. 13c1) will: (1) receive the "plurality of triangles" and/or the "plurality of tetrahedra" in the "triangles tetrahedra" 40c1K data structure, and (2) produce a list, called an "Aggregation Map" data structure 40c1L, which states which set of triangles of the "plurality of triangles" and which set of tetrahedra of the "plurality of tetrahedra" should be grouped together to form a polygonal shape. A block of code called a "Cell Generator" 40c1C (see block 40c1C of FIG. 13c1) will receive the "Aggregation Map" data structure 40c1L and the "Internal Model" data structure 40c1G, and, responsive thereto, the Cell Generator 40c1C will do the aforementioned grouping; that is, the Cell Generator 40c1C will group together "a first set of triangles" of the "plurality of triangles" and "a first set of tetrahedra" of the "plurality of tetrahedra" in accordance with the list of triangles and tetrahedra set forth in the Aggregation Map data structure 40c1L, the "first set of triangles" and the "first set of tetrahedra" being grouped together inside the "boundary" that is defined by the Internal Model data structure 40c1G thereby defining an "Un-Structured Grid" data structure 40c1M (see the grid of FIG. 13a). A block of code called a "Cell Numberer" 40c1E (see block 40c1E of FIG. 13c1) will assign an (I, J, K) index to each "cell" in the Un-Structured Grid data structure 40c1M in response to the Internal Model 40c1G data structure. A Block of code called a "Data Exporter" 40c1Q will receive both the aforesaid (I, J, K) index for each "cell" of the Unstructured grid and the Un-Structured Grid data structure 40c1M, and, responsive thereto, the Data Exporter 40c1Q will map each cell of the Un-Structured grid 40c1M data structure into a "structured" grid thereby producing a structured grid having a plurality of cells where each cell of the structured grid has an (I, J, K) index address. The structured grid is used by the Eclipse simulator software 40c2 (recall, the Eclipse simulator 40c2 can only operate on "structured" grids). A block of code called a "Cell Property Calculator" 40c1D (see block 40c1D of FIG. 13c1) will also respond to the Internal Model data file 40c1G by calculating the "Transmissibility" and the "Pore Volume" between "each pair" of K-orthogonal cells of the un-structured grid 40c1M. Recall that the "Transmissibility" is calculated by using the following formula:

$$T_{ij} = \frac{C_D}{1/t_i + 1/t_j} \quad (17)$$

Since there are a multitude of pairs of K-orthogonal cells in the Un-Structured grid 40c1M data structure, a corresponding multitude of "transmissibilities (T)" will be calculated by the Cell Property Calculator 40c1D. A "3D Viewer" 40c1N is the workstation display monitor 40d of FIG. 9 which will display the "Un-structured" grid data structure 40c1M. A block of code called a "Well Connection Calculator" 40c1P will respond to the Un-Structured grid 40c1M data structure and the Internal Model 40c1G data structure by generating a "Well Connections" data structure 40c1R. Given that each of the wellbores 17 of FIG. 1 will intersect with a plurality of cells of the Un-Structured grid 40c1M, the Well Connection Calculator 40c1P will calculate the fluid flow (called a "flow coefficient") between each said cell of the Un-Structured grid 40c1M which intersects with a wellbore 17. The Well Connections data structure 40c1R therefore includes, for each wellbore 17 of FIG. 1, a particular list of all cells of the Un-Structured grid 40c1M which are cut through and intersected by the wellbore 17 of FIG. 1, and a corresponding list of flow coefficients (called well connections factors) which are associated, respectively, with that particular list of cells. The Data Exporter 40c1Q will respond to the Un-Structured Grid 40c1M data structure and the Well Connections data file 40c1R by mapping each cell of the Un-Structured grid 40c1M data structure into a "structured" grid thereby producing an "Output Data" structure 40c3 which is comprised of the structured grid having a plurality of cells where each cell of the structured grid has a unique (I, J, K) index address. One very important piece of the "Output Data" structure 40c3 is the "Transmissibility" between each pair of K-orthogonal cells of the structured grid and the Pore Volume. This "Output Data" 40c3 is used by the Eclipse Simulator 40c2. Refer to FIG. 13d1 below for a better understanding of the use of the aforementioned "Output Data".

(3) Summary of the Eclipse Simulator Software 40c2

In FIG. 13d1, a more detailed construction of the Eclipse Simulator software 40c2 of FIG. 13c2 is illustrated.

The Eclipse Simulator software 40c2 of FIG. 13d1 is used in connection with the "Preferred Embodiment" of this specification. It should be understood, however, that other simulators can be used in conjunction with the Petragrid software 40c1 of the present invention. The Eclipse Simulator software 40c2 is available for purchase from "GeoQuest, a division of Schlumberger Technology Corporation", Houston, Tex. or Abingdon, the United Kingdom.

In FIG. 13d1, the Output Data 40c3 (including the Transmissibility discussed above) is input to the "Simulator" 40c2A portion of the Eclipse simulator software 40c2. That Simulator 40c2A portion also receives the output of other programs, such as the PVT Program 40c2B, the VFP Program 40c2C, the Schedule Program 40c2D, and other programs 40c2E, all of which are available from "GeoQuest, a division of Schlumberger Technology Corporation" of Houston, Tex. In response to the Output Data 40c3, the Simulator 40c2A will generate simulation results 40c2F for each cell of the structured grid, such as for each cell 15a1 of the grid of FIG. 13b. Examples of the "simulation results" 40c2F include a "pressure" and a "saturation" in each cell of the structured grid. Those simulation results 40c2F are used by separate programs, such as the GRAF program 50, the RTView program 52, and other programs 54. However, more importantly, those simulation results 40c2F are transmitted back to the 3D Viewer 40c1N which represents the display monitor 40d of the workstation 40 of FIG. 9. Recall, from FIG. 13c2, that the un-structured grid c1M (which comprises a plurality of cells 15a1) is transmitted to and displayed on the 3D Viewer 40c1N. Therefore, the unstructured grid including all its cells 15a1 will be displayed on the 3D Viewer 40c1N (the display monitor 40d of workstation 40 of FIG. 9). In FIG. 13d1, the simulation results 40c2F, for each cell 15a1 of the grid, are also sent to the 3D Viewer 40c1N (display 40d). As a result, the simulation results 40c2F for "each cell" 15a1 are overlayed over and displayed in that particular "each cell" 15a1 of the grid on the 3D Viewer 40c1N (display monitor 40d) of the workstation 40. Depending upon the value of the pressure or the saturation of the simulation results 40c2F, a different color will be assigned to the simulation results 40c2F; and, when the simulation results 40c2F are overlayed over that particular said "each cell" 15a1 on the 3D Viewer 40c1N, the assigned color associated with the particular simulation results 40c2F (e.g., pressure or saturation) will be used to display the actual value of the simulation results 40c2F of said "each cell" 15a1 on the 3D Viewer 40c1N (display 40d).

In FIG. 13d2, a typical "output", which is displayed on the 3D Viewer 40c1N of FIGS. 13c2 and 13d1 (i.e., on the "display" 40d of FIG. 9) by the Eclipse Simulator software 40c2, is illustrated. In FIG. 13d2, when the assigned color associated with the particular simulation results c2F is used to display the simulation results 40c2F of said "each cell" 15a1 on the 3D Viewer 40c1N (display 40d), an "output display", similar to the output display 56 shown in FIG. 13d2, is displayed on the display monitor 40d (3D Viewer 40c1N) of the interpretation workstation 40 of FIG. 9.

A functional description of the operation of the Petragrid software 40c1 of the present invention, in conjunction with the Eclipse Simulator software 40c2, will be set forth in the following paragraphs with reference to FIGS. 1 through 13d2 of the drawings.

The welling logging operations of FIGS. 1 and 2 are conducted and a well log output record 25 is generated. In addition, the seismic operations of FIGS. 4 and 5 are conducted in the earth formation 15 near the wellbores 17 of FIG. 1 and the seismic output record 20a4 of FIG. 6 is generated. The seismic output record 20a4 of FIG. 6 undergoes data reduction in the mainframe computer 30 of FIG. 7 (using the software shown in FIGS. 11 and 12) and a reduced seismic data output record 30d of FIG. 7 is generated. The well log output record 25 and the reduced seismic data output record 30d are input to an interpretation workstation 40 in FIGS. 8 and 9. A storage disc known as a "CD-Rom" would, for example, separately store the Petragrid software 40c1 and/or the Eclipse simulator software 40c2 thereon. In FIG. 9, that CD-Rom would be inserted, by an operator, into the workstation 40 of FIG. 9, and, as a result, the Petragrid software 40c1 and/or the Eclipse simulator software 40c2 would be loaded into the memory 40c of the workstation 40 of FIG. 9. FIG. 10 illustrates the Petragrid software 40c1 and the Eclipse simulator software 40c2 stored in the memory 40c of the workstation 40. In response to an action by the operator at the workstation 40, the workstation processor 40b of FIG. 9 will begin to execute the Petragrid software 40c1 and the Eclipse simulator software 40c2 of FIG. 10, the workstation processor 40b using the well log output record 25 and the reduced seismic data output record 30d which have already been loaded into the workstation 40.

When that execution of the Petragrid software 40c1 and the Eclipse simulator software 40c2 is complete, the earth formation 15 of FIG. 1, including the horizons 13 embedded in the formation 15, will be divided up into a multitude of interconnected and tetrahedrally shaped volumes or "cells" 15a1 which are shown in FIG. 13a, and the "more accurate information" associated with "each cell" 15a1, relating to the "cell properties" of said "each cell" 15a1 (including in particular its "Transmissibility"), will be generated. The "more accurate information" generated by the Petragrid software 40c1 is used by the Eclipse simulator software 40c2 for generating the "more accurate simulation results" 40c2F of FIG. 13d1.

FIG. 13b illustrates an exploded view of one horizon layer of FIG. 13a, illustrating in great detail the multitude of tetrahedrally shaped cells 15a1. Although the cells 15a1 of FIG. 13b are approximately "rectangularly" shaped in cross section, when the execution of the Petragrid software 40c1 is completed, the cells 15a1 will be approximately triangularly shaped in 2D space or be approximately tetrahedrally shaped, in 3D space, as shown in FIG. 13a.

When the workstation processor 40b of FIG. 9 begins to execute the Petragrid software 40c1 and the Eclipse simulator software 40c2 of FIG. 10, the internal model builder cIF of FIG. 13c2 will build an internal model data structure c1G which comprises a "boundary" into which a multitude of "points" will be distributed. The Point Distributor c1I will distribute the multitude of "points" into the "boundary" defined by the internal model data structure c1G, the distance between adjacent ones of the "points" as well as the number of the "points" in the x-direction and the number of the "points" in the y-direction being controlled by the control parameter editor 40c1H. The point distributor 40c1I will generate a "points" data structure c1J which is comprised of the multitude of points distributed in the "boundary". The Automatic triangulator/tetrahedralizer 40c1A will respond to the multitude of points in the points data structure 40c1J by interconnecting those points together to form a multitude of triangularly shaped cells (for 2D space) or a multitude of tetrahedrally shaped cells (for 3D space) thereby generating the triangles/tetrahedra data structure 40c1K. More particularly, the Automatic triangulator/tetrahedralizer 40c1A of FIG. 13c2 will: (1) generate the aforementioned approximately "K-orthogonal" triangular base grid for two dimensional (2D) unstructured grids by "scaling" the physical geometry, and (2) generate the approximately "K-orthogonal" tetrahedral base grid for three dimensional (3D) unstructured grids by "scaling" the physical geometry, and it will generate the aforementioned two types of grids by performing the following functional steps: (1) the physical geometry is mapped into a computational space by using a transformation based on the components of the permeability tensor in each layer of the model, (2) points are distributed in the computational space based on the mapped geometry; (3) a Delaunay triangulation or a tetrahedralization of the points is created, where: (3a) the center of each element (i.e., each "cell") of the triangulation is the center of a circle which is drawn through the vertices of each cell, and (3b) the center of each cell of the tetrahedralization is the center (or circumcenter) of a sphere which is drawn through the vertices of each element or cell, and (4) the vertices of the elements or cells and the centers of the cells are then transformed back into physical space. When these functional steps are completed, the triangle/tetrahedra data structure c1K is created. The triangle/tetrahedra aggregator 40c1B of FIG. 13c2 will receive the "plurality of triangles" and/or the "plurality of tetrahedra" in the "triangles tetrahedra" data structure 40c1K, and produce a list, called an "Aggregation Map" data structure 40c1L, which states which set of triangles of the "plurality of triangles" and which set of tetrahedra of the "plurality of tetrahedra" should be grouped together to form a polygonal shape. The Cell Generator 40c1C of FIG. 13c2 will receive the "Aggregation Map" data structure 40c1L and the "Internal Model" data structure 40c1G, and, responsive thereto, the Cell Generator 40c1C will group together "a first set of triangles" of the "plurality of triangles" and "a first set of tetrahedra" of the "plurality of tetrahedra" in accordance with the list of triangles and tetrahedra set forth in the Aggregation Map data structure 40c1L, the "first set of triangles" and the "first set of tetrahedra" being grouped together inside the "boundary" that is defined by the Internal Model data structure 40c1G thereby defining an "Un-Structured Grid" data structure 40c1M. The Cell Numberer 40c1E will assign an (I, J, K) index to each "cell" in the Un-Structured Grid data structure 40c1M in response to the Internal Model 40c1G data structure. The Data Exporter 40c1Q will receive both the aforesaid (I, J, K) index for each "cell" of the Unstructured grid and the Un-Structured Grid data structure 40c1M, and, responsive thereto, the Data Exporter 40c1Q will map each cell of the Unstructured grid 40c1M data structure into a "structured" grid thereby producing a structured grid having a plurality of cells where each cell of the structured grid has an (I, J, K) index address. The Cell Property Calculator 40c1D will also respond to the Internal Model data file 40c1G by calculating the "Transmissibility" and the "Pore Volume" between "each pair" of K-orthogonal cells of the un-structured grid 40c1M. Recall that "Transmissibility" is calculated by using the following formula:

$$T_{ij} = \frac{C_D}{1/t_i + 1/t_j} \qquad (17)$$

Since there are a multitude of pairs of K-orthogonal cells in the Un-Structured grid c1M data structure, a corresponding multitude of "transmissibilities (T)" will be calculated by the Cell Property Calculator 40c1D. The 3D Viewer 40c1N is the workstation display monitor 40d of FIG. 9 which will display the "Un-structured" grid data structure 40c1M. The Well Connection Calculator 40c1P will respond to the Un-Structured grid 40c1M data structure and the Internal Model 40c1G data structure by generating the Well Connections data structure 40c1R. Given that each of the wellbores 17 of FIG. 1 will intersect with a plurality of cells of the Un-Structured grid 40c1M, the Well Connection Calculator 40c1P will calculate the fluid flow (called a "flow coefficient") between each said cell of the Un-Structured grid c1M which intersects with a wellbore 17. The Well Connections data structure 40c1R therefore includes, for each wellbore 17 of FIG. 1, a particular list of all cells of the Un-Structured grid 40c1M which are cut through and intersected by the wellbore 17 of FIG. 1, and a corresponding list of flow coefficients (called well connections factors) which are associated, respectively, with that particular list of cells. The Data Exporter 40c1Q will respond to the Un-Structured Grid 40c1M data structure and the Well Connections data file 40c1R by mapping each cell of the Un-Structured grid 40c1M data structure into a "structured" grid thereby producing an "Output Data" structure 40c3 which is comprised of the structured grid having a plurality of cells where each cell of the structured grid has a unique (I, J, K) index address. The "Output Data" structure 40c3 includes "Transmissibility" between each pair of K-orthogonal cells of the structured grid and the Pore Volume. The Output Data 40c3 is used by the Eclipse Simulator 40c2.

In FIG. 13d1, the Un-structured grid 40c1M is being displayed on the 3D Viewer 40c1N (display 40d of FIG. 9). The simulator 40c2A will receive the output data 40c3, and in particular, the Transmissibility and Pore Volume figures, and it will then generate a simulation result 40c2F (such as pressure or saturation) for "each cell" of the grid being displayed on the 3D Viewer 40c1N. The simulation results 40c2F for "each cell" are transmitted to the 3D Viewer 40c1N, and the simulation results 40c2F for said "each cell" are overlayed over said "each cell" on the 3D Viewer 40c1N. A different color is assigned to each different value of simulation result 40c2F, and that color is displayed inside said "each cell" on the 3D Viewer 40c1N. For example, for one value of pressure for a particular cell, a first color is assigned, and for a different value of pressure for another cell, a second color is assigned. The first color shows inside the particular cell, and the second color shows inside said another cell.

As a result, the 3D Viewer 40c1N (or display monitor 40d of FIG. 9) will present an output display for viewing by an operator. One example of such an output display from the Eclipse simulator 40c2 is illustrated in FIG. 13d2.

The resultant output data, which are visible and obtainable from any one of the output displays from the Eclipse simulator 40c2, such as the output display of FIG. 13d2, are "more accurate" than was previously the case in the prior art, mainly because the "Output Data" 40c3 of FIGS. 13c2 and 13d1, which is generated by the Petragrid software 40c1 of the present invention, is "more accurate".

Figure 14A:
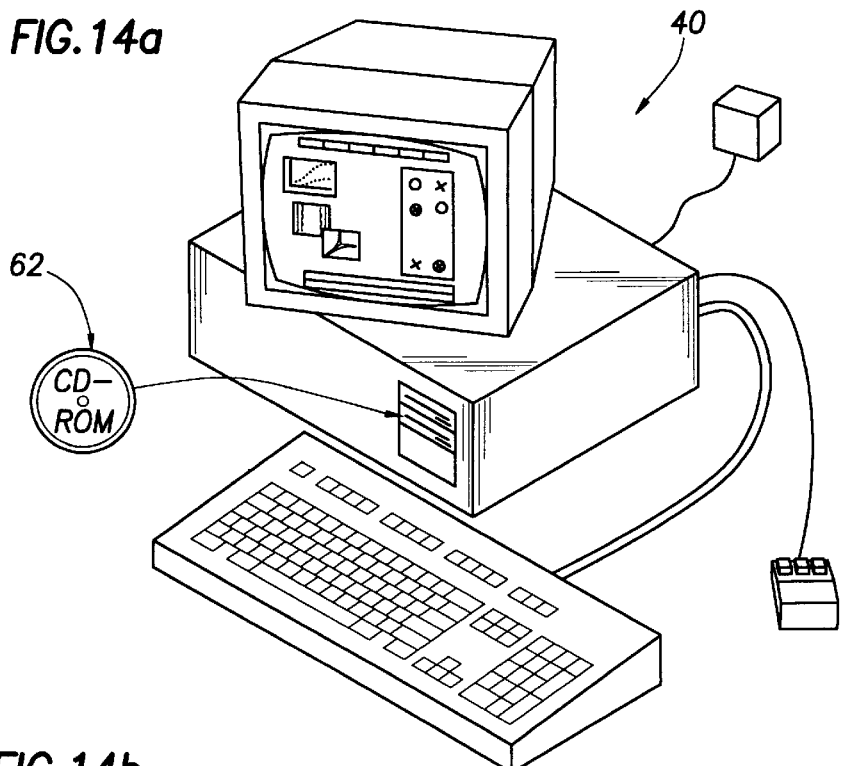
FIGS. 14a through 14c illustrates the workstation of FIG. 9 including the workstation memory 40c, where the workstation memory 40c is adapted to receive and store a set of software stored on a CD-Rom, the software including the "Flogrid" simulation gridding method and apparatus which includes the "structured" gridder of the present invention as well as the Petragrid "unstructured" gridder software, FIG. 14c illustrating the new contents of the workstation memory 40c after the "Flogrid" simulation gridding program stored on a CD-Rom is loaded into the workstation, the new contents of memory 40c including both the Petragrid "unstructured" gridder software 40c1 disclosed in the "Gunasekera specification" and the "structured" gridder software of the present invention.
Figure 14B:
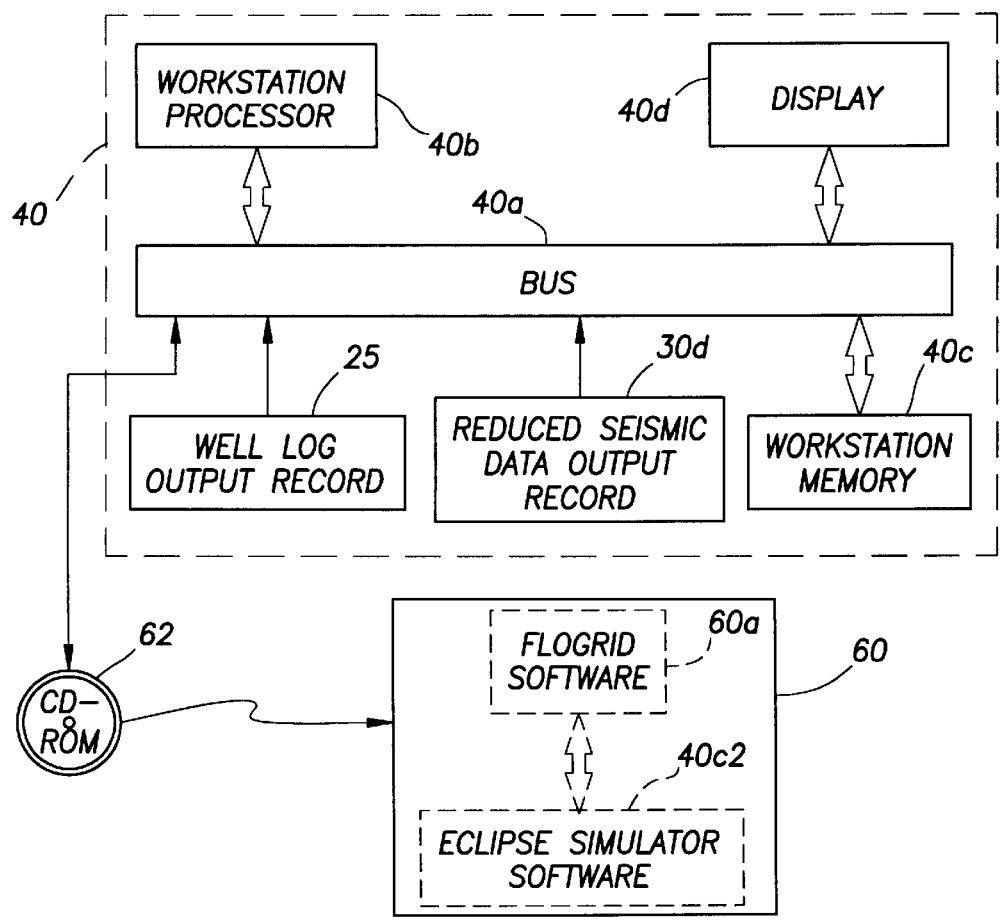
Figure 14C:
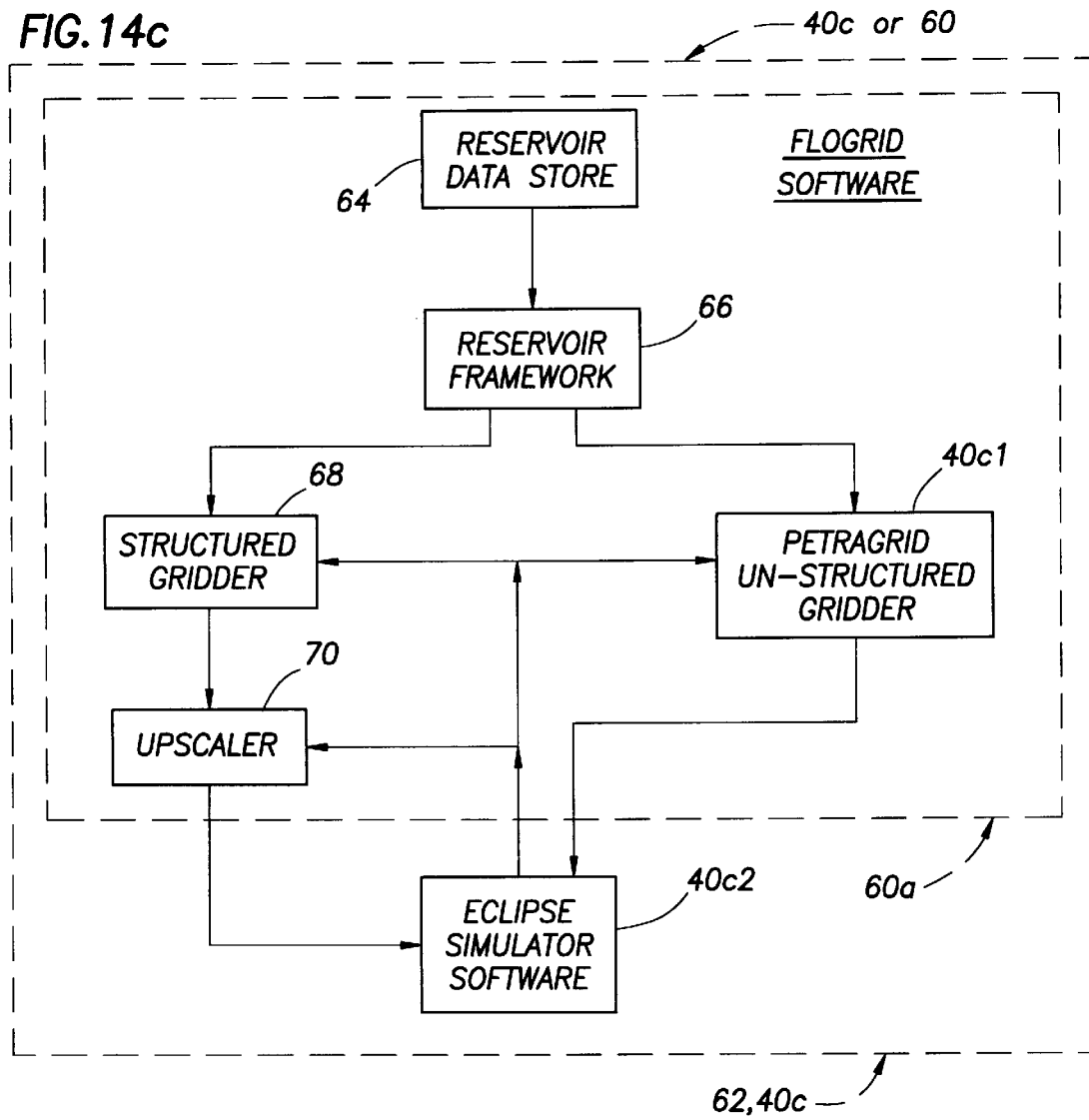

Second Section—General Discussion of the "Flogrid" Simulation Gridding Program Including the "Structured Gridder" Software Which Further Includes the "Structured Areal Gridder" of the Present Invention Referring to FIGS. 14a through 14c, in FIG. 14a, the interpretation workstation 40 of FIG. 9 is again illustrated including the monitor, the processor, the keyboard, and the mouse. In FIG. 14b, the workstation 40 is shown again including the workstation processor 40b connected to the system bus, the display 40d connected to the bus, and the workstation memory 40c connected to the bus. The bus receives the well log output record 25 and the reduced seismic data output record 30d. A storage device 62, adapted for storing software instructions, also known as a CD-Rom 62, can be inserted into the workstation 40. Block 60 in FIG. 14b indicates that the CD-Rom 62 is adapted to store the "Flogrid" simulation gridding program 60a, adapted for generating the 'more accurate earth formation grid cell property information', and the "Eclipse" simulator software 40c2 which receives the 'more accurate earth formation grid cell property information' and, responsive thereto, generates the 'more accurate set of simulation results'. When the CD-Rom 62 is inserted into the workstation 40 of FIG. 14a, the software stored on the CD-Rom 62, including the Flogrid simulation gridding program which further includes the Petragrid "un-structured" gridder and the "structured" areal gridder software of the present invention, will be loaded into the workstation memory 40c. As a result, in FIG. 14c, the workstation memory 40c of FIGS. 9 and 14b will store the following software packages: the "Flogrid" simulation gridding program 60a and the Eclipse simulator software 40c2 disclosed in the Gunasekera specification. However, the "Flogrid" simulation gridding program 60a includes the following software blocks: a reservoir data store 64, a reservoir framework 66, the "structured" gridder software 68 in accordance with the present invention, the Petragrid "un-structured" gridder software 40c1 disclosed in the Gunasekera specification, and an Upscaler 70.

Referring to FIG. 15, a functional description of the operation of the Flogrid simulation gridding program 60a and the Eclipse simulator software 40c2 of FIG. 14c is set forth in the following paragraph with reference to FIG. 15 of the drawings.

In FIG. 15, a set of input data 69, including the well log output record 25 and the reduced seismic data output record 30d of FIG. 14b (in addition to other input data including outcrops and cartoons), are provided as inputs to the "Flogrid" simulation gridding program 60a. More particularly, the input data 69 is input to the Flogrid reservoir framework 66 of FIG. 14c, the reservoir framework 66 including a mapping package 65 and a geo-modeller 67. The reservoir framework 66 produces a structural model 74 (which includes horizon maps, wells, and cells) which is provided as an input to the "Flogrid" gridder 68, 40c1. In response to the structural model 74, the "Flogrid" gridder 68, 40c1 (inclusive of the Petragrid unstructured gridder 40c1 and the structured gridder 68 of the present invention) will function to produce a gridded simulation model 76, the simulation model 76 being a section of a gridded earth formation similar to the gridded section shown in FIG. 13b. The simulation model 76 is comprised of a plurality of approximately rectangularly shaped (in cross section) grid cells, similar to the grid cells 15a1 shown in FIG. 13b. The simulation model 76 is provided as an input to the Eclipse simulator 40c2, along with other engineering data 78. The simulator 40c2 will generate the simulation results 40c2F (see FIG. 13d1) which will be displayed on the 3D Viewer 40c1N. If the simulation results 40c2F do not match certain history data 80, the simulation results 40c2F will be fed back, via line 82, to the reservoir framework 66 for the purpose of manipulating the next, subsequently generated simulation results 40c2F generated by the simulator 40c2. The Flogrid Simulation Gridding Program 60a of FIG. 14c and FIG. 15

Figure 16:
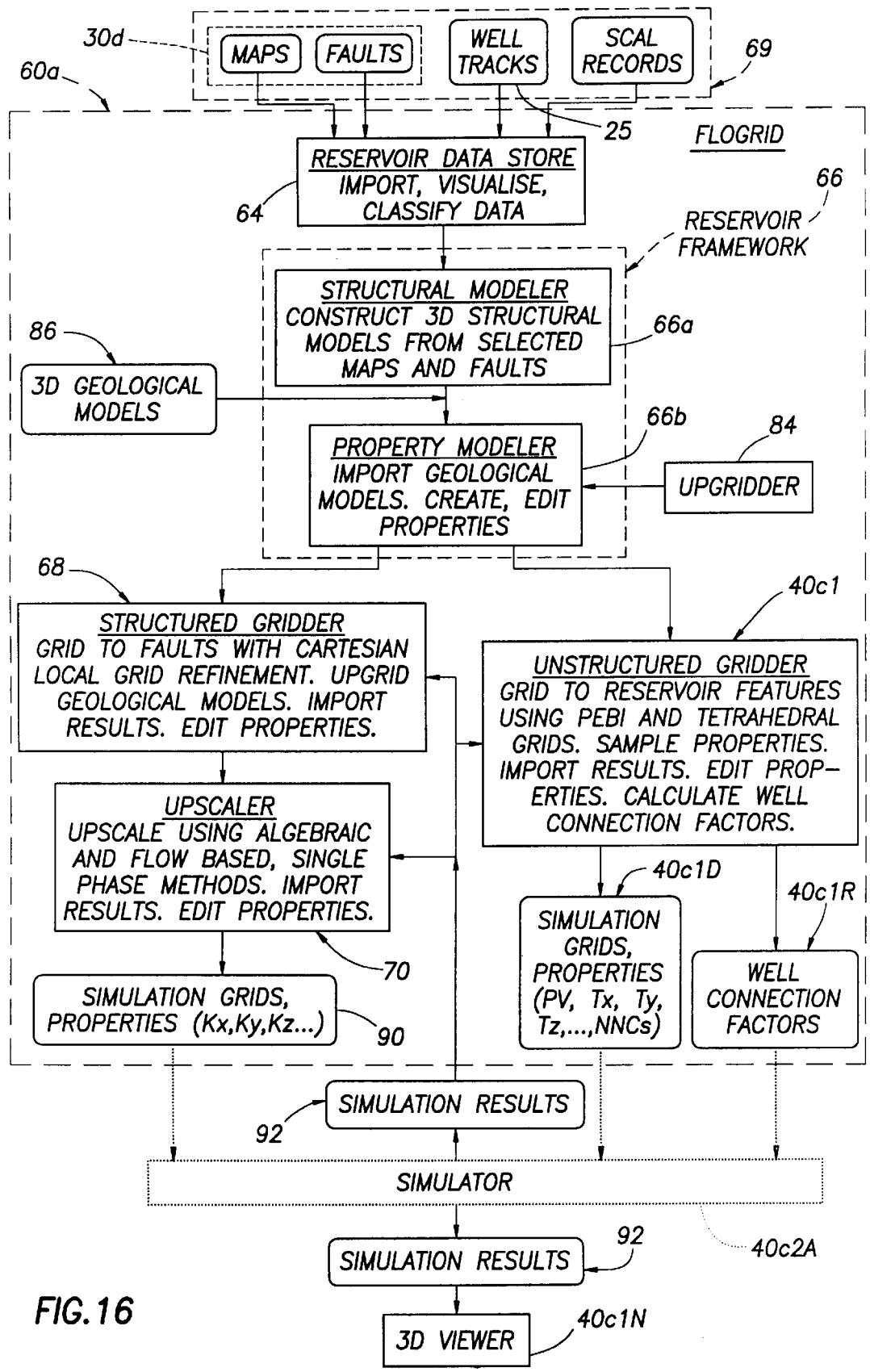

Referring to FIG. 16, a more detailed construction of the Flogrid simulation gridding program 60a of FIG. 14c and 15 is illustrated.

In FIG. 16, the input data 69 of FIG. 15, including the well log output record 25 (well tracks) and the reduced seismic data output record 30d (maps and faults) along with other input data, such as SCAL records, is input to and stored in the Flogrid "reservoir data store" 64.

The Flogrid simulation gridding program 60a in FIG. 16 is available from GeoQuest, a division of Schlumberger Technology Corporation, located in Houston, Tex.

The role of the reservoir data store 64 is to: import, store, visualize, and classify data for subsequent use in downstream modules. Classifications will depend on exactly how much information is provided with the imported data. Options include: (1) assigning maps to be of a specific type (e.g., porosity, permeability, horizon), (2) setting or changing map units and coordinate systems, (3) creating surfaces—surfaces represent top, bottom, and intermediate layers and are ordered depositionally; use of this information is important in the 'automation' of the construction of reservoir units (stratums) and subsequent 3D structural models; (4) assigning maps to a particular surface (e.g., stating which maps represent top, bottom, and intermediate layers), (5) assigning thickness maps to surfaces which they represent, and (6) assigning fault traces to particular surfaces. Limited data editing facilities are also provided in the reservoir data store 64. Options are currently limited to creating and editing fault traces and polygons in the 3D viewer 40c1N.

The data stored in the reservoir data store 64 are provided to the reservoir framework 66.

The reservoir framework 66 in FIG. 16 is comprised of two parts: (1) a structural model 66a, and (2) a property model 66b. The structural model 66a will: construct "3D geological models", from the input data 69, including maps (i.e., horizons) and faults. The property model 66b will: import said "3D geological models" from the structural model 66a, create and edit properties in said 3D geological models, and, responsive thereto, the property model 66b will create and generate the aforementioned "structural model" 74.

The structural modeler 66a in FIG. 16 generates a "3D geological model" 86. The structural modeler 66a is disclosed in the following two pending U.S. patent applications: (1) Prior pending U.S. application Ser. No. 08/823,107 to Abbott (hereinafter, the "Abbott specification"), filed Mar. 24, 1997 and entitled "Method and Apparatus for Determining Geologic Relationships for Intersecting Faults", the disclosure of which is incorporated by reference into this specification—the Abbott specification discloses a workstation and software based method and apparatus which receives information relating to a multitude of faults in an earth formation, determines if each particular pair of faults in the input data 'relate' (i.e., do the pair of faults intersect), determines which fault of the intersecting pair of faults is the 'major' fault and which fault is the 'minor' fault, determines if the minor fault intersects the major fault from above or below the major fault, and, responsive thereto, it generates "fault surfaces and relationships" data; and (2) Prior pending U.S. provisional application serial No. 60/029,524, filed Nov. 31, 1996 entitled "Method for 3D modeling of Faulted Geologic Horizons", and prior pending U.S. application Ser. No. 08/916,841 to Graf et al (hereinafter, the "Graf specification"), filed Aug. 22, 1997, and entitled "Automatic Non-Artificially Extended Fault Surface Based Horizon Modeling System", the disclosure of which is incorporated by reference into this specification—the Graf specification also discloses a workstation and software based method and apparatus which receives the "fault surfaces and relationships" data generated by the above identified "Abbott specification", and, responsive thereto, it generates the "3D geological model" 86, also known as a "final faulted horizon model", which represents a three-dimensional structural model constructed from map data (i.e., horizon data) and fault data. More particularly, the structural modeler 66a receives selected data from the reservoir data store 64 and, responsive thereto, it constructs consistent 3D geological models from which simulation models are built. The construction of a suitable 3D geological model is typically a computationally intensive task, normally requiring large areas of surfaces to be computed and recomputed. Surfaces may need to be computed for a variety of reasons. These include: interpolating or extrapolating areas of nulls, computing new surfaces from thickness data, or recomputing surfaces in the vicinity of faults to correct bad surfaces or to provide extrapolated surfaces for sampling the 'wrong' side of the fault. The construction of a structural model 66a involves 3 main steps: boundary definition, unit creation, and fault block splitting. In boundary definition, this allows irrelevant portions of the maps, such as non-hydrocarbon bearing zones or any large areas of nulls around the perimeter, to be ignored in the subsequent model clean-up and construction steps. In unit creation, this builds reservoir units from selected surfaces and surface representations stored in the reservoir data store 64. Automated mesh map operations compute units based on the given order of surfaces, eroding any overlapping surfaces according to their respective surface types. In fault block splitting, this step completes the model construction process and provides a solution to the complex problem of how to robustly sample surfaces (and subsequent properties) in the vicinity of faults and layer boundaries. Fault block splitting first divides the model into a set of fault blocks, extrapolating faults where necessary. Next, each block is further subdivided into block units, using the units created earlier. Finally, block unit surfaces are repaired and extrapolated to produce a model which supports rigorous sampling, including sampling values from the 'wrong' side of the fault.

As a result, in FIG. 16, the "3D geological model" 86 is provided by the structural modeler 66a and transmitted to the Property Modeler 66b (the "3D geological model" 86 being the final faulted horizon model" generated by the horizon modeling software disclosed in the above identified "Graf specification").

The Property Modeler 66b will receive the 3D geological model 86, construct a structural framework" from the 3D geological model 86 (i.e., from the "final faulted horizon model" disclosed in the Graf specification), and, responsive thereto, the property model 66b will generate a "structural model" from the structural framework. The "structural model" provides the explicit physical connections between horizon/fault surfaces and their geologic relationships, the existence of such physical connections allowing the user to edit previous steps in producing the structural model. More particularly, a proposed volume of interest of a structural framework is provided, the framework being defined by seismic or geologic surfaces. The available surfaces and existing volumes in the volume of interest are analyzed and candidate partitioning surfaces are selected for further analysis. The surfaces can be analyzed and the results validated. The volumes are subdivided into blocks based on user provided criteria. The structural framework can be edited by the user, specifically by undoing at least one previous step. In particular, the property modeler 66b unifies map based and 3D geological modeling approaches to provide a consistent 3D structural and property representation from which to build simulation grids. This property model 66b module has three primary functions: (1) importing 3D geological models 86, (2) assigning maps (horizons) to units created in a structural model—this allows the user who has not designated property maps to apply above or below a given surface in the reservoir data store 64 to directly assign maps to units, (3) creating additional properties on a property model—properties can be defined with simple algebraic expressions, as simple functions of existing properties and with complex user defined functions using the calculator.

The Property Modeler 66b responds to an Upgridder 84. That is, while executing the Property Model 66b, the Upgridder 84 software, in FIG. 16, enables the user/operator to group layers (within a fine scale model) into coarse layers. This is done manually or automatically using methods which limit the total flux through a coarse layer or limits the total variation of some property within a layer.

The results generated by the Property Modeler 66b in FIG. 16 are input to the "Unstructured" gridder 40c1. The unstructured gridder 40c1 of FIG. 16 is the Petragrid un-structured gridder software that is disclosed in the above identified "Gunasekera specification" which has already been incorporated herein by reference and which is set forth above in the first section of the "Description of the Preferred Embodiment" of this specification. The un-structured gridder 40c1 of FIG. 16 will grid to reservoir features using PEBI grids and tetrahedral (nonrectangular) grids, sample properties, import results, edit properties, and calculate well connection factors.

The results generated by the property modeler in FIG. 16 are also provided as an input to the "structured" gridder 68 which includes the "structured areal gridder" of the present invention.

In FIG. 16, the "structured" gridder 68 receives data from the property modeler 66b. The input data 69 of FIG. 15 and 16, including maps and fault traces and well trajectories and SCAL records, are provided as inputs to the reservoir data store 64; and, in response thereto, the property modeler 66b generates a "structural model", the "structural model" being input to the "structured" gridder 68 which includes the "structured areal gridder" of the present invention (also known as a corner point gridder").

In FIG. 16, the "structured" gridder software 68 includes a "structured areal gridder" in accordance with the present invention, the "structured areal gridder" representing the novel feature of the "Flogrid" simulation gridding program 60a. The structured gridder software 68 is set forth in greater detail below, and it is also set forth in greater detail in the "Detailed Description of the Preferred Embodiment" of this specification. However, in general, the structured gridder 68 of the present invention is used to build structured corner point and block centered fluid flow grids that honor selected features of a given property model. Two approaches are supported: gridding and upgridding. In the gridding approach, this allows users to specify a new gridding boundary and control "areal" and vertical grid size and quality. An important feature of the structured gridder 68 is the option to align i-grid (control) lines and j-grid (control) lines with selected faults located inside a boundary, and zig-zagging remaining faults. Grid control parameters include global Nx Ny, and Nz, orthogonality, smoothness, and sub grid Nx and Ny distribution to control the distribution of i and j rows and columns in different areas of the grid. Cartesian local grid refinement is supported. In the upgridding approach (by using the upgridder 84 mentioned above), this approach constructs simulation grids by combining rows, columns and layers of a geological model into coarse simulation cells.

Upridding allows significant geological features, such as high permeability streaks or large contrasts in properties between geological layers, to be captured more accurately in the resulting simulation grid. Algorithmic (flow based and variability) and manual gridding techniques are supported.

In FIG. 16, the structured gridder 68 provides its "structured simulation grid" results to an upscaler 70. The "structured simulation grid" includes a plurality of "grid blocks". The upscaler 70 samples "specified properties" within each "grid block" of the "structured simulation grid" and performs appropriate averaging to assign a representative grid block property to each "grid block" of the "structured simulation grid" that is generated by the structured gridder 68. The upscaler 70 functions to perform a "range of upscaling methods", where each method functions to sample the "specified properties" within each "grid block" of the "structured simulation grid" for purposes of assigning a representative "grid block property" to each "grid block" of the "structured simulation grid" that is generated by the structured gridder 68. The "specified properties" which are sampled, and, as a result, the "grid block property" which is assigned to each "grid block" of the "structured simulation grid" include the following properties: porosity, absolute permeability, relative permeability, and capillary pressure. The upscaler 70 includes facilities for averaging any real valued quantity. The upscaler 70 will upscale using algebraic and flow based single phase methods, import results, and edit properties. More particularly, the upscaler module 70 allows users to generate simulation grid block properties for each "grid block" of the structured grids by sampling and averaging geological properties stored on a property model. The above referenced "range of upscaling methods" include the following methods: (1) Algebraic averaging of porosity, (2) harmonic and geometric averaging of Kx, Ky, Kz, (3) voting on rock types, (4) flow based upscaling of Kx, Ky, Kz, and (5) simple algebraic upscaling of other property types.

As a result, in FIG. 16, a "structured simulation grid and properties associated therewith" 40c1D is generated by the (Petragrid) unstructured gridder 40c1 (recall that Petragrid generates an unstructured grid, but it has facilities for converting the unstructured grid into a structured grid which is used by the simulator 40c2A). Note the cell property calculator 40c1D in FIG. 13c2 which calculates certain properties, such as transmissibility and pore volume, between each pair of cells of an unstructured grid.

In addition, in FIG. 16, a "structured simulation grid and properties associated therewith" 90 are generated by the the upscaler 70. Actually, the structured gridder 68 generates the "structured simulation grid", but the upscaler 70 samples "specified properties" within each "grid block" of that "structured simulation grid" and performs appropriate averaging for the purpose of assigning a representative "grid block property" to each "grid block" of the "structured simulation grid" that is generated by the structured gridder 68.

In FIG. 16, with regard to the well connection factors 40c1R, recall from the above discussion that the Well Connections data structure 40c1R includes, for each wellbore 17 of FIG. 1, a particular list of all cells of the unstructured grid 40c1M which are cut through and intersected by the wellbore 17 of FIG. 1, and a corresponding list of flow coefficients (called well connections factors) which are associated, respectively, with that particular list of cells.

In FIG. 16, the "Eclipse" simulator 40c2A (of FIG. 13d1) will receive the "structured simulation grids" and associated properties for each "grid block" 90 from the upscaler 70, and the simulator 40c2A will also receive the "structured simulation grids" and associated properties for each cell 40c1D and the well connection factors 40c1R from the (Petragrid) unstructured gridder 40c1 disclosed in the Gunasekera specification, and, responsive thereto, the simulator 40c2A will generate a set of "simulation results" 92, the simulation results 92 being provided to the 3D Viewer 40c1N, said simulation results 92 also being provided back to the structured gridder 68 of the present invention, the upscaler 70, and the (Petragrid) unstructured gridder 40c1 of the Gunasekera specification for the purpose of manipulating any subsequently generated sets of simulation results 92.

The 3D Viewer 40c1N provides 3D visualization of all input and generated data. Features include: (1) specialized options for visualizing maps, wells, geological models, grids, simulation input properties, and simulation results, (2) interactive controls to zoom, translate, rotate and apply lighting, (3) a 3D editor for editing faults, boundaries, and simulation grid properties, and (4) a color legend which supports multiple objects in the 3D viewer at the same time, etc.

Structured Gridder 68 Including the Structured Areal Gridder of the Present Invention of FIG. 16

Referring to FIGS. 16a through 23, a detailed description of the Structured Gridder 68, of FIG. 16, is set forth in the following paragraphs.

Simulation models in general are comprised of three types: structured grid models (e.g., the structured gridder 68) which performs "corner point gridding", also called "coordinate line gridding" or "areal gridding", unstructured grid models (e.g. the Petragrid unstructured gridder 40c1) which use PEBI or tetrahedral grids, and structured-unstructured models which uses both corner point and tetrahedral grids.

The "Flogrid" structured gridder software 68 of FIG. 16 of the present invention functions to perform the novel "corner point gridding" also called "coordinate line gridding" or "areal gridding".

The following paragraphs, with reference to FIGS. 17 through 23, will be devoted to the aforementioned "coordinate line" or "areal gridding" function of the present invention which is performed by the "structured gridder" 68. The "areal gridding" or "corner point gridding" function is the core technology embodied within the "structured gridder" 68 of FIG. 16 of the present invention.

Areal Gridding or Corner Point Gridding

It is necessary at this point to define a "corner point grid" and outline the main stages that are performed by the structured gridder 68 when building a corner point grid.

The "corner point grid" includes the following main components: (1) a "coordinate line", (2) a "coordinate tube" which has edges, where each edge of the coordinate tube consists of one of the "coordinate lines", and (3) a "grid block", where a grid block is obtained by slicing a pair of horizons through the coordinate tube.

The "coordinate lines" are defined to be a set of straight lines drawn downwards from the nodes of a "structured areal grid" of quadrilaterals.

Figure 16A:
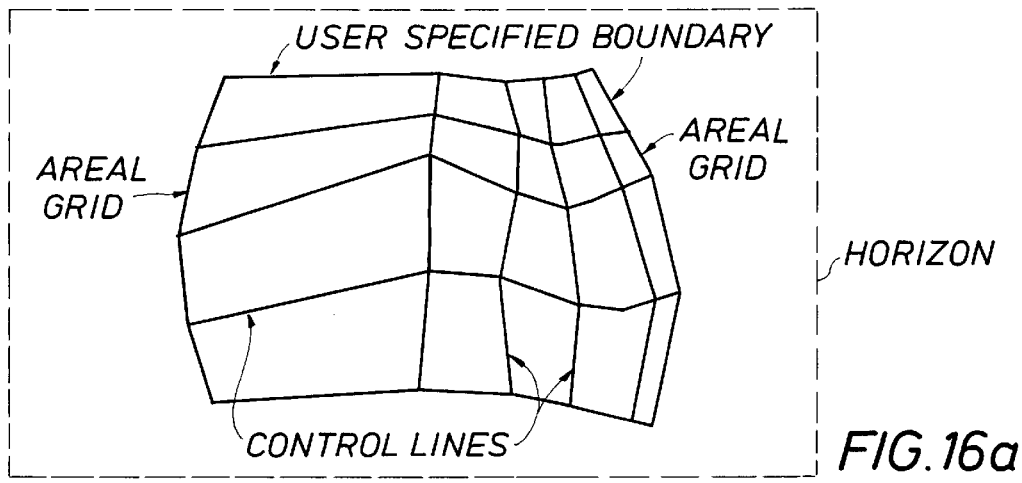
FIGS. 16a through 16c illustrate a structured areal grid having a plurality of nodes, in FIG. 16a, a set of coordinate lines dropped down from the nodes of the structured areal grid, in FIG. 16b, and the formation of a "grid block" by slicing through the set of coordinate lines by a pair of horizons, in FIG. 16c.

In FIG. 16a, an example of a "structured grid" (of quadrilaterals) is illustrated. The "coordinate lines" originate from the nodes of the structured grid of FIG. 16a and these coordinate lines go "into the page" of FIG. 16a. The corners of the quadrilaterals are situated at the tops of the coordinate lines in FIG. 16a.

Figure 16B:
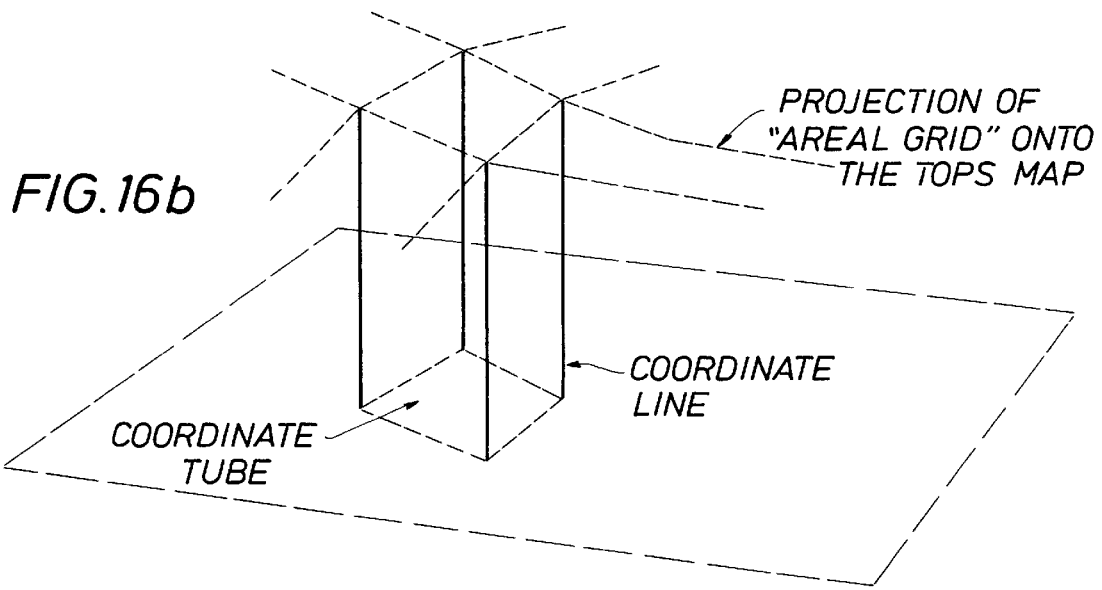

In FIG. 16b, a 3D view of the "coordinate tube" is illustrated. The "coordinate tube" has edges, and the "coordinate lines" are the edges of the coordinate tube, as illustrated in FIG. 16b. In FIG. 16b, these "coordinate tubes" fill the region inside the "user defined boundary" without any holes.

Figure 16C:
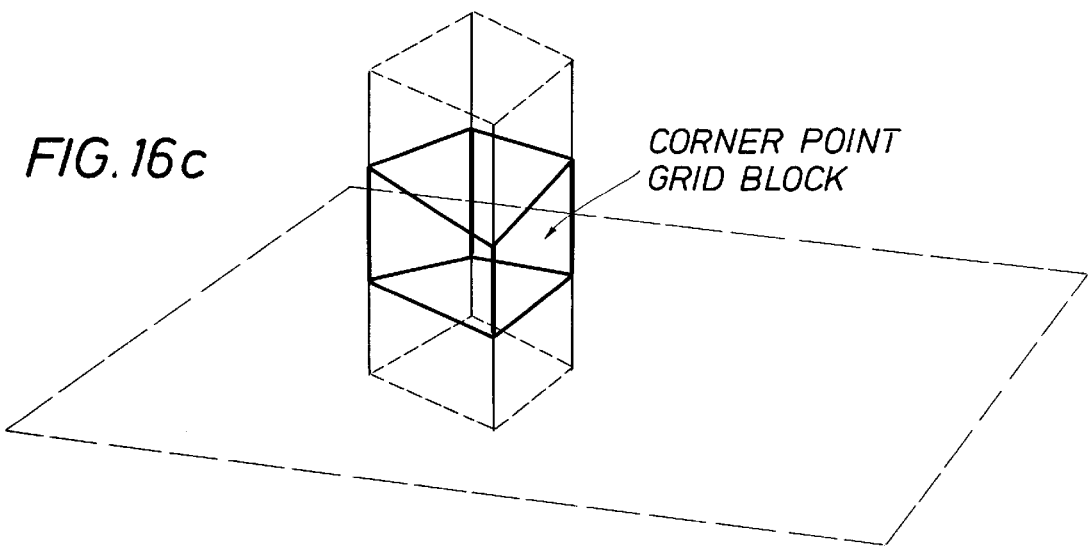

In FIG. 16c, a "grid block" is obtained by slicing at least a pair of horizons through the coordinate tube. The "coordinate tube" is sliced into "grid blocks" by placing points on each coordinate line, the same number of points being placed on each coordinate line. If there are N+1 points on each coordinate line, then there are "n" grid blocks in the coordinate tube. This is illustrated in FIG. 16c for n=1.

The main stages in building a corner point or structured areal grid are discussed in the following paragraphs with reference to FIGS. 17 through 23 of the drawings.

The Flogrid "structured" gridder 68 of FIG. 14c and FIG. 16 includes a "structured areal gridder" otherwise known as a "corner point gridder" in accordance with the present invention. The structured areal gridder/corner point gridder will build a set of control lines which form an Nx by Ny by 1 simulation line grid inside a user defined boundary. The control lines of this simulation grid honors both the "user defined boundary" and the selected i and j faults inside the boundary. Control lines which are not constrained to lie on a boundary or a fault are positioned according to user controlled gridding parameters.

Figure 17:
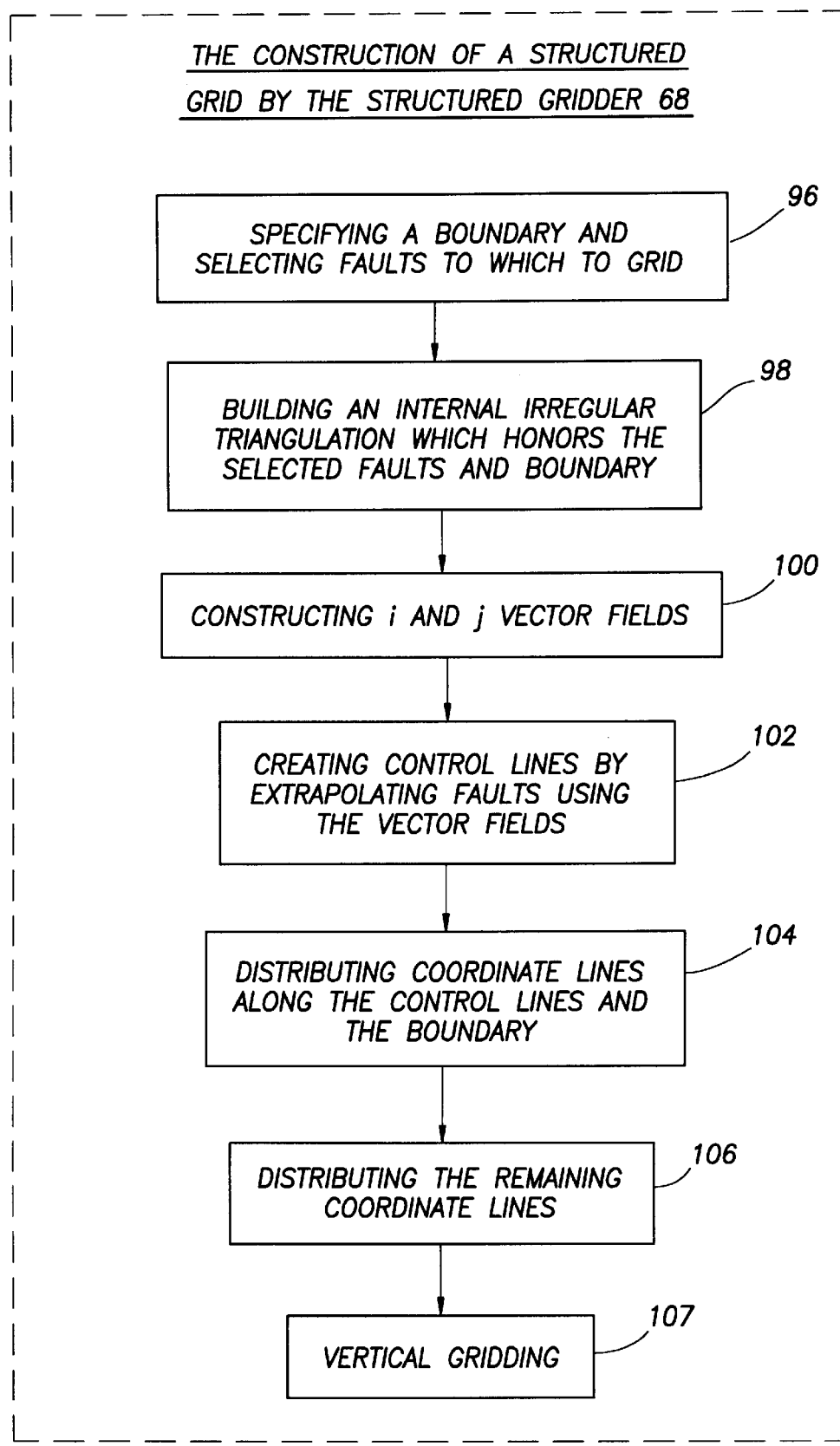

In FIG. 17, the construction, by the "structured gridder" 68 of the present invention, of a "structured areal grid" or a "corner point grid" involves seven (7) steps: (Step 1) specifying a boundary (on a horizon of an earth formation) and selecting faults (which lie on that horizon and lie inside that boundary) to which to grid, block 96 in FIG. 17, (Step 2) building an internal irregular triangulation which honors the selected faults and boundary, block 98, (Step 3) constructing i and j vector fields, block 100, (Step 4) creating control lines by extrapolating faults using the vector fields, block 102, (Step 5) distributing coordinate lines along the control lines and the boundary, block 104, (Step 6) distributing the remaining coordinate lines, block 106, and (Step 7) vertical gridding, block 107.

The user/operator, sitting at the workstation 40 of FIGS. 14a and 14b, will control and perform the following steps from the flowchart of FIG. 17: step 1 (specifying a boundary and selecting faults to which to grid, block 96), step 3 (constructing i and j vector fields, block 100), step 5 (distributing coordinate lines along the control lines and the boundary, block 104), and step 7 (vertical gridding, block 107).

Each of these steps (1) through (7), blocks 96 through 107 in FIG. 17, will be discussed in greater detail below with reference to FIGS. 18 through 23 of the drawings.

Step 1—Specifying a Boundary and Selecting Faults to Which to Grid, Block 96 of FIG. 17

Assume a horizon of an earth formation has three faults passing through the horizon. Assume further that an enclosed, approximately rectangular, boundary is drawn on that horizon, the boundary enclosing the three faults passing through the horizon. Then, assume that the three faults can be classified into two i-faults and one j-fault passing through the horizon.

Figure 18:
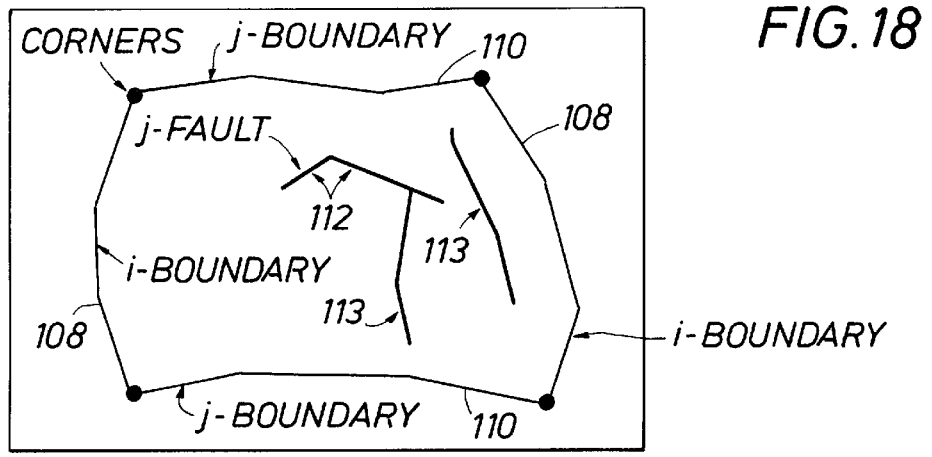

FIG. 18 illustrates that boundary which encloses the two i-faults and the j-fault.

In FIG. 18, the user is required to define that boundary, but the boundary must be either a rectangle or a deformed rectangle (a "structured" gridder requires the boundary to be either a rectangle or a deformed rectangle). Therefore, in FIG. 18, the "boundary" consists of two "i-boundaries" and two "j-boundaries". A good boundary will follow the trend of those particular faults that the user may wish to explicitly honor in the simulation grid.

This is illustrated in FIG. 18. As a result, the i-boundaries are denoted by numeral 108 in FIG. 18, and the j-boundaries are denoted by numeral 110 in FIG. 18. Inside the boundaries 108, 110, three faults exist: a j-fault 112 (a j-fault being directed in an left-right direction), and two i-faults 113 (an i-fault being directed in an up-down direction). The boundary 110 in FIG. 18 follows the trend of the j-fault 112 and the boundary 108 follows the trend of the i-faults 113.

Faults are classified by the user as i-faults, j-faults, or zig-zag faults. The i-faults are those faults which will have a constant i value in the generated simulation grid (for example, an i-fault could lie on the i=3 line). The j-faults will lie on grid lines of constant j. The zig-zag faults are those which do not line up with any boundary, or are too distorted.

Step 2—Building an Internal Irregular Triangulation Which Honors the Selected Faults and Boundary, Block 98

The Flogrid "structured areal gridder" disposed within the structured gridder 68 will build an irregular grid of triangles which honor the boundary and all the selected faults (refer to FIG. 44 and the detailed discussion with reference to FIG. 44 set forth in the Detailed Description of the Preferred Embodiment below). This is done by sequentially modifying a starting triangulation and adding each line segment from the boundary or the faults in turn. This step (block 98 of FIG. 17) is invisible to the user/operator.

Step 3—Constructing i and j Vector Fields, Block 100,

The "structured areal gridder" 68b of the structured gridder 68 of FIG. 16 constructs two vector fields (like velocity or magnetic fields) with vectors calculated on each node of the triangulation (which was built in block 98 of FIG. 17—see FIGS. 45b1, 45b2 and 49 of the "Detailed Description of the Preferred Embodiment"). Nodes lying on the user defined boundary or on a fault have vectors which are forced to honor the tangents to the faults and boundary. Vectors on the remaining nodes are interpolated.

That is, a "plurality of nodes" of the triangulation (built via block 98) actually lie on top of the boundaries 108, 110 or the faults 112, 113 in FIG. 18, and a "vector", hereinafter called a "frozen vector", is connected to each node of the "plurality of nodes". Each of the "frozen vectors" have an established direction (thus, the reason for the adjective "frozen"). The established direction of each frozen vector is a direction which is parallel to the tangents to the faults and/or the boundaries where those faults and boundaries actually intersect each of the "plurality of nodes". Vectors on the remaining nodes (which do not lie on the boundaries 108, 110 or the faults 112, 113) are hereinafter called "non-frozen vectors" because the directions of those vectors are not known; therefore, the directions of the non-frozen vectors must be determined by an interpolation technique, the interpolation being performed relative to the directions of the "frozen vectors". As a result, one set of field lines follows the i-lines and one set of field lines follows the j-lines. The interpolation, to determine the direction of the "non-frozen" vectors from the direction of the "frozen" vectors, can be either an 'isotropic' interpolation or an 'anisotropic' interpolation. There is also an orthogonality control which influences the vector fields such that the vector fields are mutually orthogonal. Isotropic interpolation reduces the influence of sharp bends in the faults or boundary. Anisotropic interpolation causes such discontinuities to propagate further. The effect of this choice will be illustrated later in this specification.

Step 4—Creating Control Lines by Extrapolating Faults Using the Vector Fields, Block 102 of FIG. 17

Figure 19:
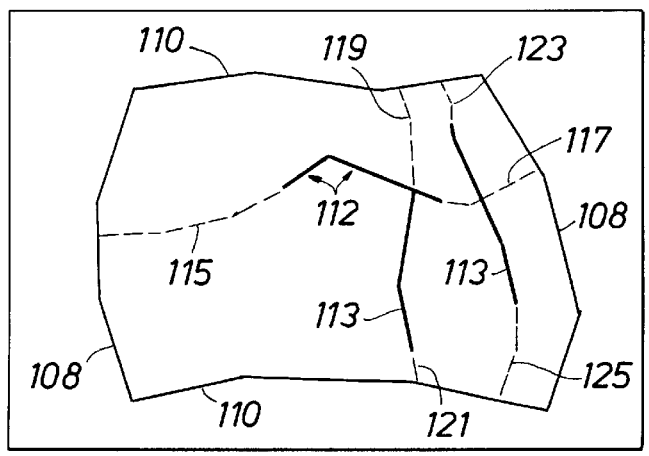

FIG. 19 illustrates smooth extensions of faults to the boundary to build "control lines". For example, a set of extensions (also known as "integral curves") 115, 117 interconnect the j-fault 112 to the boundary 108, thereby creating one "control line" [115, 112, 117]; another set of extensions (integral curves) 119, 121 interconnects an i-fault 113 to the boundary 110, thereby creating another "control line" [119, 113, 121]; and another set of extensions (integral curves) 123, 125 interconnect the i-fault 113 to the boundary 110, thereby creating another "control line" [123, 113, 125]

In FIG. 19, the "integral curves" or "extensions" [115, 117, 119, 121, 123, 125] are constructed away from the two ends of each fault [112, 113]. The integral curves are analogous to streamlines in fluid flow or flux-field lines in electromagnetic systems. These integral curves and associated interconnected faults form "control lines" which (if the user has made a good classification of the faults and if a suitable boundary has been provided) will partition the area inside the user defined boundary into regions (or sub-grids) which can be continuously deformed into a rectangular (structured) grid.

Figure 20:
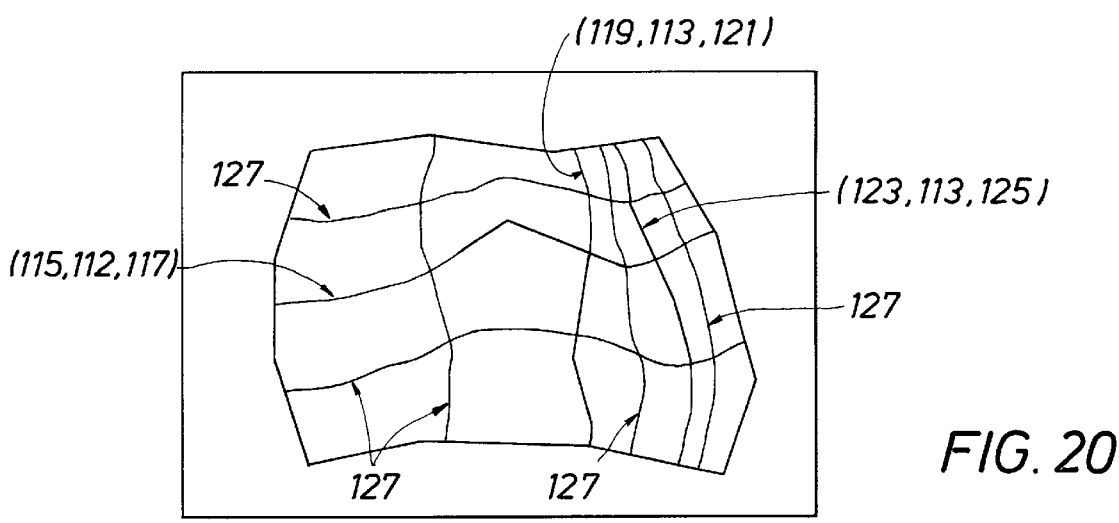
Figure 21:
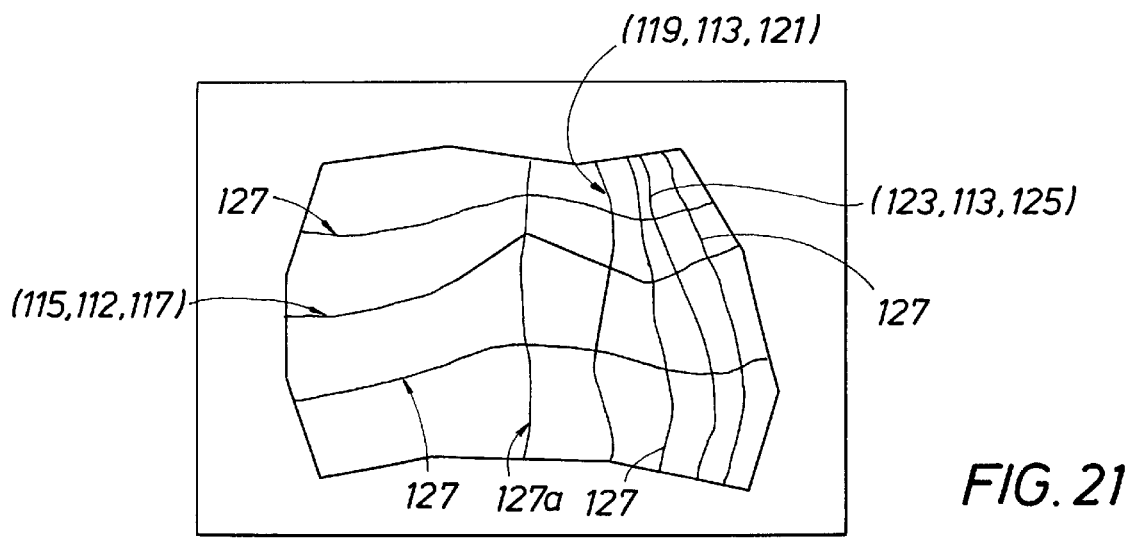

Step 5—Distributing Coordinate Lines Along the Control Lines and the Boundary, Block 104, FIG. 20 illustrates the control lines [115, 112, 117], [119, 113, 121], and [123, 113, 125] with some "additional lines" 127 (but having no "smoothness") disposed adjacent the control lines. FIG. 21 also illustrates the same control lines with those additional lines 127 (but having a finite smoothness).

The penultimate function, performed during the construction of a structured grid, involves the distribution of "points" along the control lines, between the points at which the i-lines intersect the j-lines. The number of the "points" to be distributed is controlled by the user, as follows: (1) Globally, where an overall Nx and Ny is specified, and Flogrid 60a decides the distribution of points, or (2) locally, by specifying the Nx between any pair of i-lines or Ny between any pair of j-lines. The smoothness parameter controls how this is done. When set to zero, the points are placed equidistant between the intersections. If the smoothness is increased to a maximum of one, the points are distributed in a more smooth way so that the distance between successive pairs only changes gradually. This is illustrated in FIGS. 20 and 21 where one of the lines 127a has been moved markedly to the right because the adjacent sub-grid has a higher density of grid lines.

Step 6—Distributing the Remaining Coordinate Lines, Block 106

The final grid of coordinate lines is constructed by interpolating the boundary points of each sub-grid using the transfinite interpolation method. Coordinate lines built by the "structured areal gridder" are straight and vertical. Thus, the coordinate lines are fully specified by a 2D areal grid. The coordinate lines used in the corner point grid are obtained by dropping straight lines, vertically, from the nodes of the areal grid.

Step 7—Vertical Gridding, Block 107 of FIG. 17

In the following discussion, the term "fault block" is used (more correctly, it should be called a "block" since there is a difference between a "block" in the structural framework and a "grid block" in a simulation grid). For each "coordinate tube", the Flogrid 60a structured gridder 68 will assign that "coordinate tube" to a "fault block", provided that the center point of the top of the coordinate tube occupies that particular fault block. At this point, the term "layer" in an earth formation is defined by two (not necessarily adjacent) horizons in an earth formation. During this step 7, the user has the option of specifying how many "simulation layers" are to be placed inside each "layer". The horizons inside the fault block are used to slice the coordinate tube into "grid blocks". This is done by locating the intersections of the "coordinate lines" with each horizon in the formation, thereby producing four intersection points between the four coordinate lines and a single horizon in the earth formation, the four points being used to define four of the corner points of the "grid block". If a geological layer must become a single "simulation layer", then two adjacent horizons in the earth formation, in sequence, will define the eight corner points of a single simulation grid block. If the "layer" must be divided into a "given number of simulation layers", and therefore into a "given number of grid blocks", recalling that a particular coordinate line comprises a "plurality of lines" interposed, respectively, between a "plurality of consecutive points" on that particular coordinate line, when the "plurality of lines" on that particular coordinate line in the "layer" equals the "given number of simulation layers", then the "layer" will include the "given number of simulation layers", and the "given number of simulation layers" in the "layer" will include the "given number of grid blocks".

The following paragraphs will discuss the following user specified parameters and user choices: orthogonality, smoothness, and isotropic and anisotropic gridding.

Orthogonality—orthogonality is a weight between 0 and 1 which influences the vector fields, and therefore the control lines, to be mutually orthogonal. If the weight is zero, the lines just follow the boundaries and their respective faults. If the weight is set to one, the field lines also try to cross at right angles to one another. If the boundary or the faults are not themselves mutually orthogonal, then the vectors will not be exactly orthogonal. The best values of orthogonality are somewhere in between these values. A little experimentation may be necessary so that a grid meeting the user's preferences is formed.

If the boundary or faults contain any very sharp corners, then the application of some orthogonality is essential if inside-out grids are to be avoided. Sometimes, a fault cannot be characterized as an i or j fault and is best treated as a zigzag. Similarly, if the boundary is too complicated, it can lead to inside-out grids. The structured gridder 68 is based on the idea that the grid is a distorted rectangular grid. If the target lines are too far from a rectangular grid, something will break. The software will alert the user to this, who is then responsible for adjusting the boundary or changing the fault classification.

Smoothness—The smoothness of the simulation grid is controlled by the spacing of the user requested points on the control lines. If the smoothness is set to zero, then the distance between each pair of points along the control line between two control lines will be the same. Thus, the distance between pairs of points can show a distinct jump as one moves between pairs of control lines. If the smoothness is set to 1.0, then the distance between points will change smoothly between different pairs of control lines. This control is achieved with a non-linear tension spline algorithm.

Figure 22:
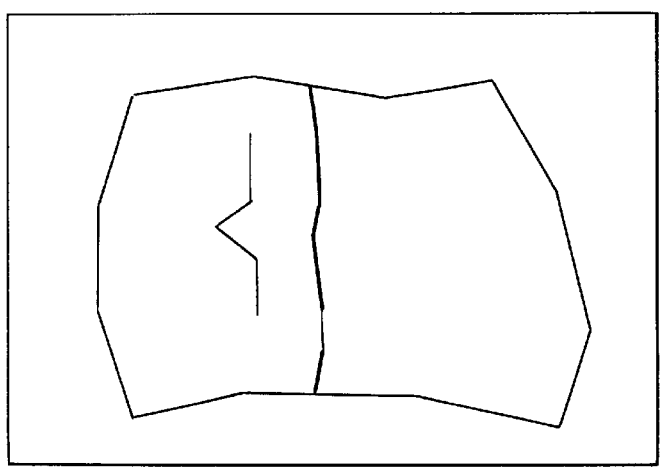
Figure 23:
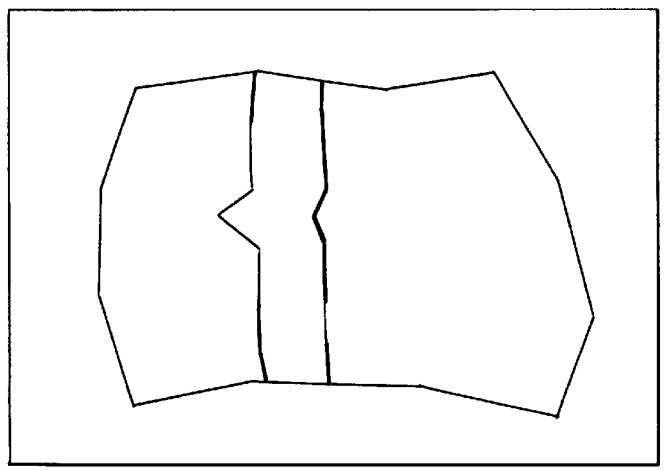

Refer now to FIGS. 22 and 23.

Isotropic and Anisotropic gridding—In FIGS. 22 and 23, an example of isotropic interpolation between two faults is illustrated in FIG. 22 and an example of anisotropic interpolation between two faults is illustrated in FIG. 23. The main options in "areal gridding" are: (1) isotropic interpolation of the vector fields (i.e., "isotropic gridding") and anisotropic interpolation of the vector fields (i.e., "anisotropic gridding").

In "isotropic" interpolation, the structured gridder 68 will set the "non-frozen" i-vector on the corner of a triangle to: (1) the weighted average of the vector orthogonal to the j-vector at that corner, and (2) the arithmetic average of the i-vectors at the corners of any triangles sharing the first corner. This requires an iterative process, and is the main cause for the time required by the gridder to accomplish its task. The j-field is constructed in a similar way.

In "anisotropic" interpolation, the arithmetic average is replaced by a distance weighted average. This takes longer to compute, and so explains the increased waiting time for this type of gridding.

In FIGS. 22 and 23, the difference between the two types of interpolation (isotropic vs. Anisotropic) is best illustrated by the result achieved in response to the performance of isotropic interpolation versus the performance of anisotropic interpolation. In many cases, isotropic and anisotropic interpolation produces very similar results. However, in some circumstances, such as that illustrated in FIGS. 22 and 23, the grids are subtly different.

In FIGS. 22 and 23, the fine lines show the original faults, and the bold lines shown the extensions into control lines.

With regard to performance and quality, the structured gridder 68 of the present invention runs fastest if isotropic interpolation without orthogonality is requested. The structured gridder 68 produces the best quality grid with high orthogonality and smoothness weights. However, quality is a subjective concept, and, thus, some experimentation is suggested.

DETAILED DESCRIPTION OF THE PREFERRED EMBODIMENT

A detailed description of the Flogrid simulation gridding program 60a of FIGS. 14c and 16, including a detailed description of the structured gridder 68 of FIGS. 14c and 16 which includes the "structured areal gridder" (otherwise known as the "corner point gridder") of the present invention and the "Block Gridder", will be set forth in the following paragraphs with reference to FIGS. 24 through 52 of the drawings.

The "Flogrid" Simulation Gridding Program 60a

Figure 24:
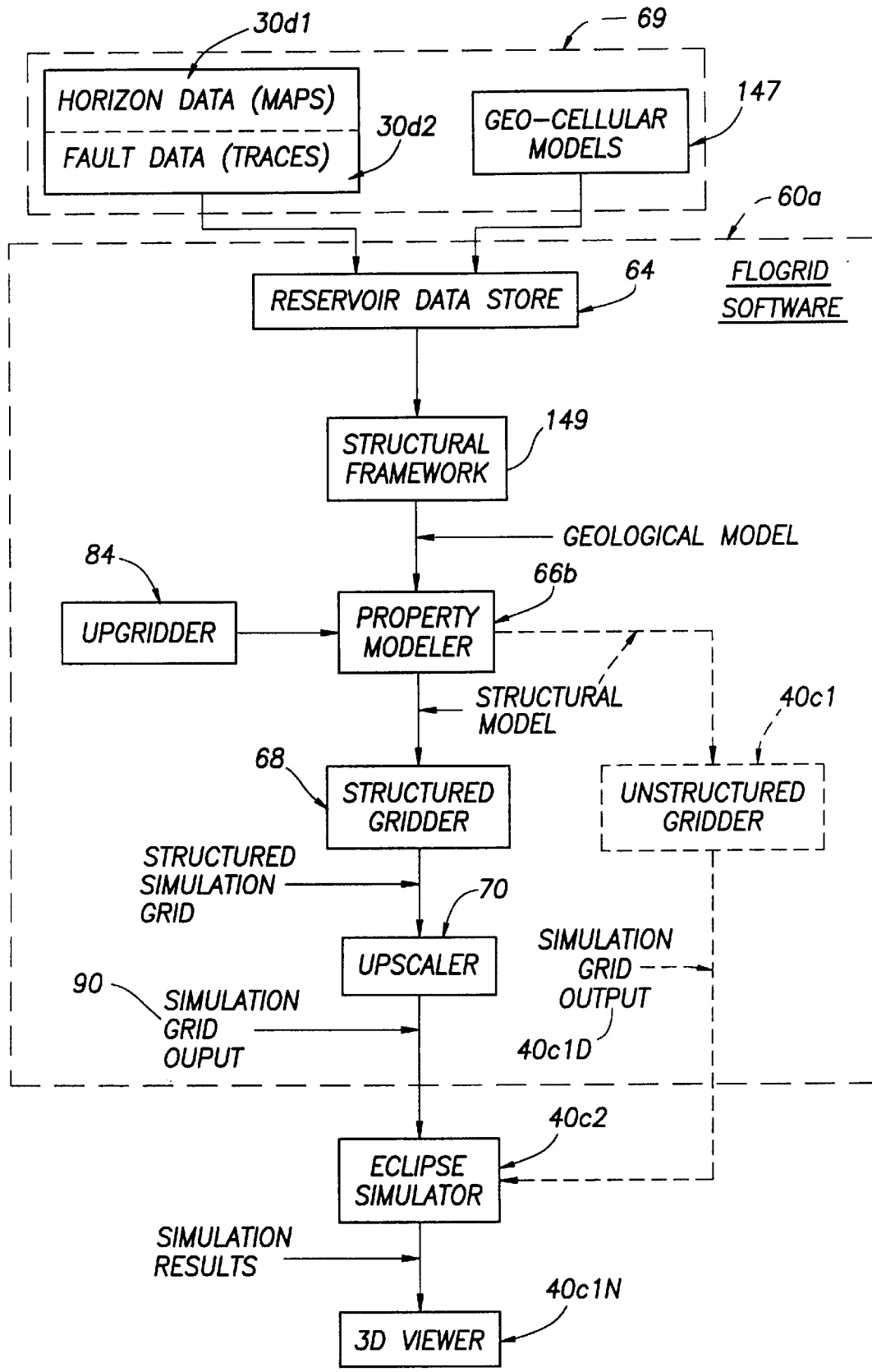

Referring to FIG. 24, a detailed construction of a workstation based software system is illustrated which is adapted to be stored in the workstation memory 40c of FIG. 14b, the workstation based software system of FIG. 24 including the "Flogrid" simulation gridding program 60a which is responsive to the input data 69 of FIGS. 15 and 16 for generating the simulation model 76, a software simulator (called "Eclipse") 40c2 responsive to the simulation model 76 generated by the "Flogrid" simulation gridding program 60a for generating a set of "simulation results", and a 3D Viewer 40c1N adapted for displaying the "simulation results" generated by the "Eclipse" simulator 40c2.

In FIG. 24, the Flogrid simulation gridding program 60a receives the input data 69 of FIGS. 15 and 16, that input data 69 including the following data: horizon data 30d1, representing a plurality of horizons in an earth formation; fault data 30d2, representing one or more faults passing through and intersecting the horizons in the earth formation; and a plurality of geo-cellular models 147.

Figure 24A:
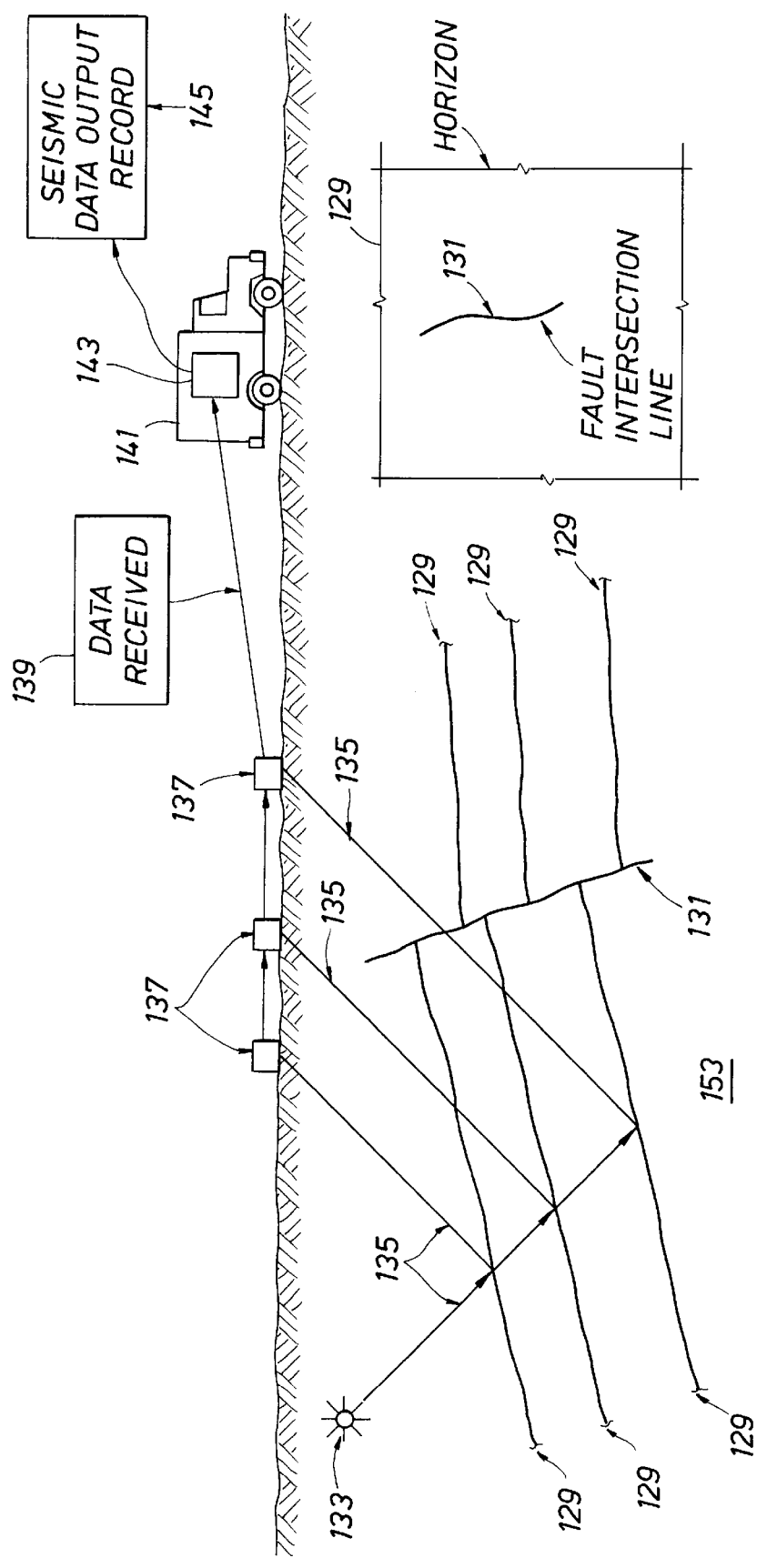
FIG. 24a illustrates a faulted earth formation including a plurality of horizons and a source of sound vibrations which reflect off the horizons for generating the seismic data output record.

The horizon data 30d1 and the fault data 30d2 can best be illustrated in the drawing of FIG. 24a.

In FIG. 24a, a plurality of horizons 129 in an earth formation are intersected by a fault 131 which passes through and intersects each of the horizons 129. The horizon data 30d1 and the fault data 30d2 are collected in the following manner. In FIG. 24a, a source 133 (such as an explosive source) produces sound vibrations 135. Those sound vibrations 135 propagate within an earth formation 153 and reflect off the horizons 129 in the earth formation 153. The sound vibrations 135 propagate upwardly from the horizon layers 129 until the sound vibrations 135 are received in a plurality of geophone receivers 137. The geophone receivers 137 produces an output signal representing "data received" 139, the data received 139 being input to a recording truck 141. A recording truck computer 143 will receive the "data received" 139, and, responsive thereto, it will generate a "seismic data output record" 145 which contains seismic data representative of the horizons 129 and the faults 131 in the earth formation.

The horizon data 30d1 and the fault data 30d2 of FIG. 24 result from the seismic data stored and contained within the "seismic data output record" 145.

In FIG. 24, the "Flogrid" simulation gridding program 60a includes the following structural elements.

A reservoir data store 64 is a storage medium adapted for temporarily storing the horizon data 30d1, the fault data 30d2, and the geo-cellular models 147. A structural framework 149 will receive the data stored in the reservoir data store 64, build a "geological model", and pass that "geological model" to the property model 66b. The property model 66b will receive the "geological model" from the structural framework 149, and generate a "structural model" which will be passed to the structured gridder 68. By using an "upgridder" 84, the user can provide certain inputs to the property model 66b for simplifying the "geological model", which was received in the property model 66b, and grouping certain ones of the layers of the "geological model" for the purpose of generating the "structural model". The structured gridder 68 will receive the "structural model" from the property model 66b and, responsive to the "structural model", it will build a "structured simulation grid" in the earth formation. That is, the structured gridder 68 of the present invention includes a (1) "structured areal gridder" and (2) a "block gridder". The "structured areal gridder" will build a "structured areal grid" on a faulted horizon in the earth formation, and the "block gridder" will drop coordinate lines down from the nodes of the "areal grid" for producing a plurality of "grid blocks" of a "structured grid" in the earth formation. The upscaler 70 of FIG. 24 will assign properties (e.g., porosity, permeability, etc) to each cell of the "structured simulation grid" generated by the structured gridder 68, and it will pass a "simulation grid output" 90, including the structured grid and the properties associated with each cell thereof, to the Eclipse simulator 40c2. In the meantime, the Petragrid unstructured gridder 40c1 (discussed in the first section of the Description of the Preferred Embodiment of this specification) will receive the "structural model" from the property model 66b and, responsive thereto, it will generate its own structured simulation grid output 40c1D which will be passed to the Eclipse simulator 40c2.

The Eclipse simulator 40c2 is not a part of the Flogrid simulation gridding program 60a, but it functions to generate its own set of "simulation results" which are displayed on the 3D Viewer 40c1N. See FIG. 13d2 for an example of the "simulation results" generated by the Eclipse simulator 40c2 and displayed on the 3D Viewer 40c1N.

Figure 25:
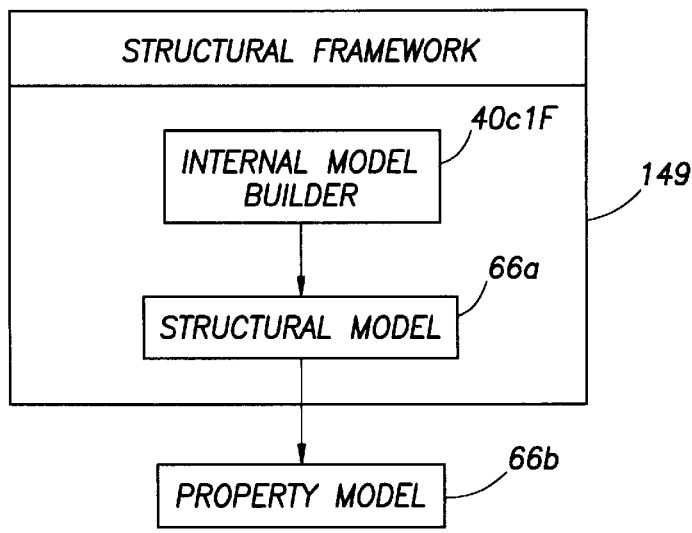

Referring to FIG. 25, a detailed construction of the structural framework 149 of FIG. 24 is illustrated. In FIG. 25, the structural framework comprises the "internal model builder" 40c1F and the "structural model" 66a.

Recall, from the First Section of the Description of the Preferred Embodiment of this specification, where the Petragrid unstructured gridder software 40c1 was discussed, that the "internal model builder" 40c1F receives the well log output record 25 and the reduced seismic data output record 30d and, responsive thereto, the internal model builder 40c1F generates an "internal model 40c1G data structure". The internal model builder 40c1F will create a "boundary" into which the "points" in the "points" data structure 40c1J (generated by the "Points Distributor" 40c1I) will be distributed. The reduced seismic data output record 30d defines where the horizons 13 of FIG. 1 and the faults are located inside the "boundary", and the well log output record 25 defines where the wellbores 17 of FIG. 1 are located inside the "boundary". However, the operator, at workstation 40 of FIG. 9, will define the "boundary" itself by defining a line in aerial space. The "internal model" 40c1G data structure comprises that "boundary".

Recall again, from the Description of the Preferred Embodiment of this specification, that the structural model 66a is disclosed in the following two pending U.S. patent applications: (1) Prior pending U.S. application Ser. No. 08/823,107 to Abbott (hereinafter, the "Abbott specification"), filed Mar. 24, 1997 and entitled "Method and Apparatus for Determining Geologic Relationships for Intersecting Faults", the disclosure of which has already been incorporated by reference into this specification; and (2) Prior pending U.S. provisional application serial No. 60/029,524, filed Nov. 31, 1996, entitled "Method for 3D modeling of Faulted Geologic Horizons", and prior pending U.S. application Ser. No. 08/916,841 to Graf et al (hereinafter, the "Graf specification"), filed August 22, 1997, and entitled "Automatic Non-Artificially Extended Fault Surface Based Horizon Modeling System", corresponding to attorney docket number 94.0008, the disclosure of which has already been incorporated by reference into this specification. The Graf specification will generate, as its end product, a "final faulted horizon model".

Figure 25A:
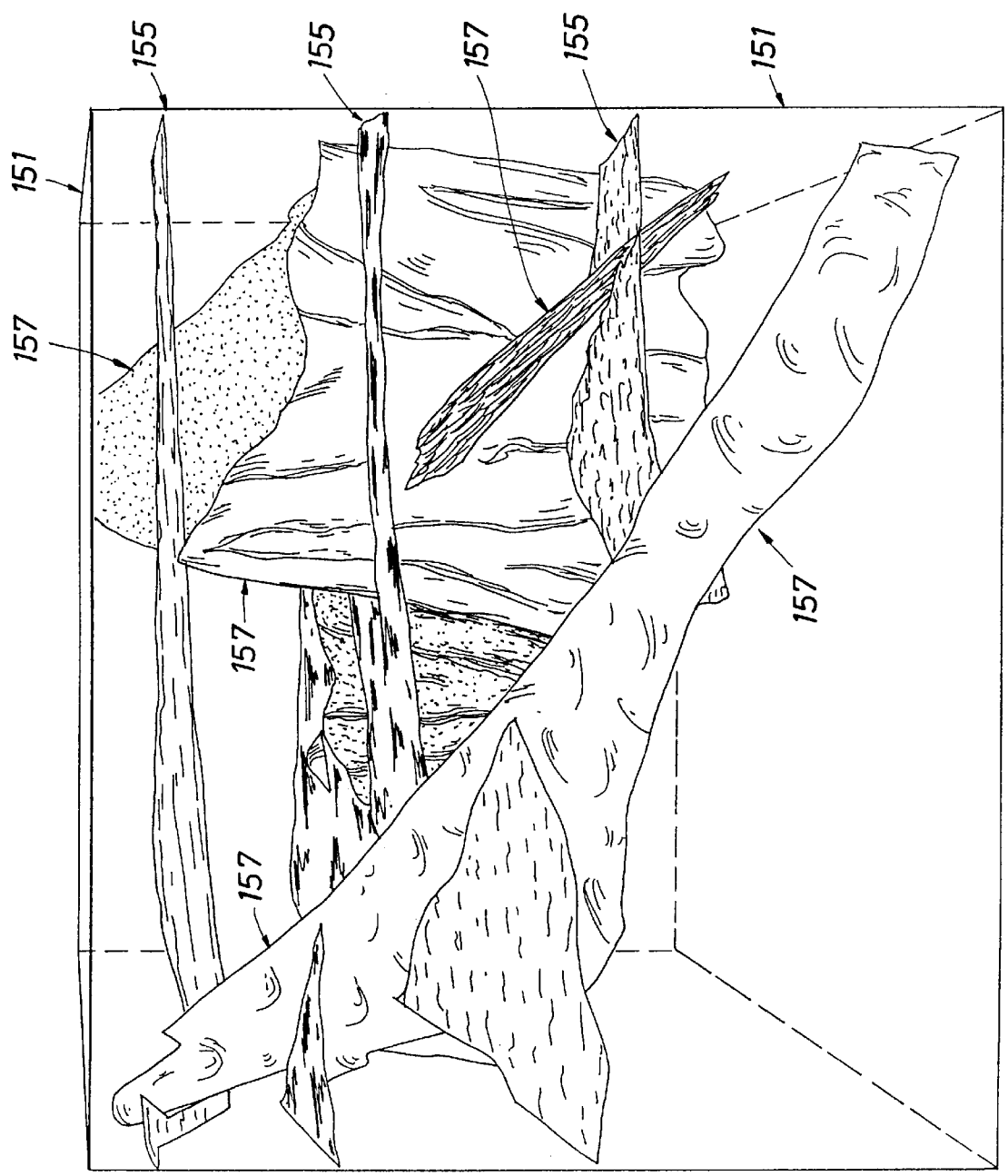
FIG. 25a illustrates a "final faulted horizon model" 151 (i.e., a geological model 151) which is generated by the structural model 66a of FIG. 25.

Therefore, in FIGS. 25 and 25a, the structural model 66a of FIG. 25 will generate the aforementioned "final faulted horizon model" 151. An example of the "final faulted horizon model" 151 generated by the structural model 66a is illustrated in FIG. 25a. In FIG. 25a, the "final faulted horizon model" 151 is a three dimensional representation of the earth formation 153 of FIG. 24a that was subjected to the seismic operation discussed above in connection with FIG. 24a, and it includes a plurality of horizons 155 which are each intersected by a plurality of faults 157.

Figure 26:
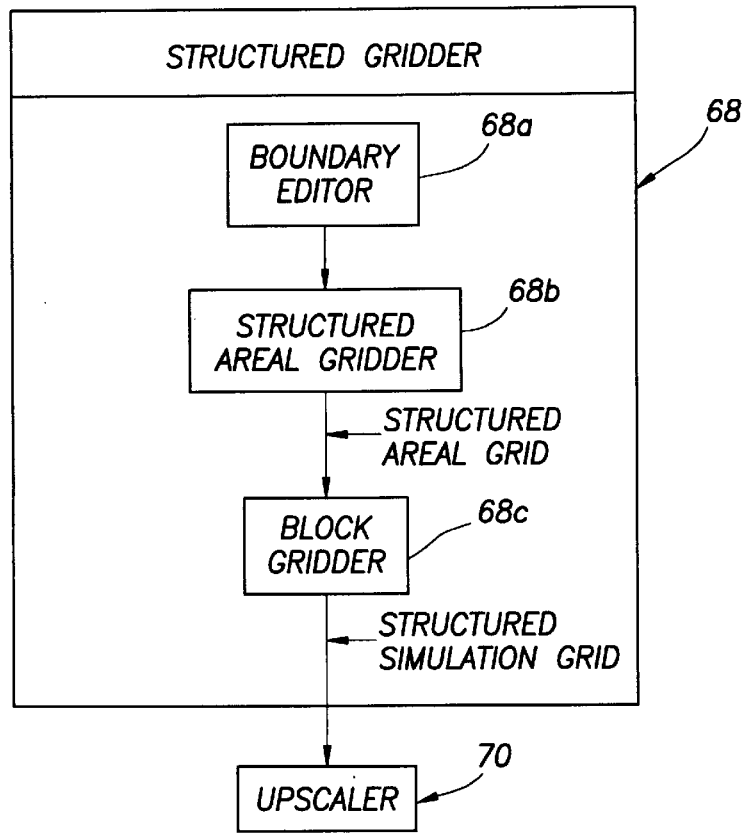

Referring to FIG. 26, the structured gridder 68 of FIG. 24 includes a "boundary editor" 68a; a "structured areal gridder" (or "corner point gridder") 68b which produces the "structured areal grid" over a user specified boundary on a faulted horizon; and a "block gridder" 68c which drops the coordinate lines down from the nodes of the "structured areal grid" produced by the "structured gridder" thereby producing the "structured simulation grid" comprised of a plurality of "grid blocks" (of approximately rectangular cross section) that are input to the upscaler 70. The functions performed by each of these elements will become evident from the following discussion.

Figure 27:
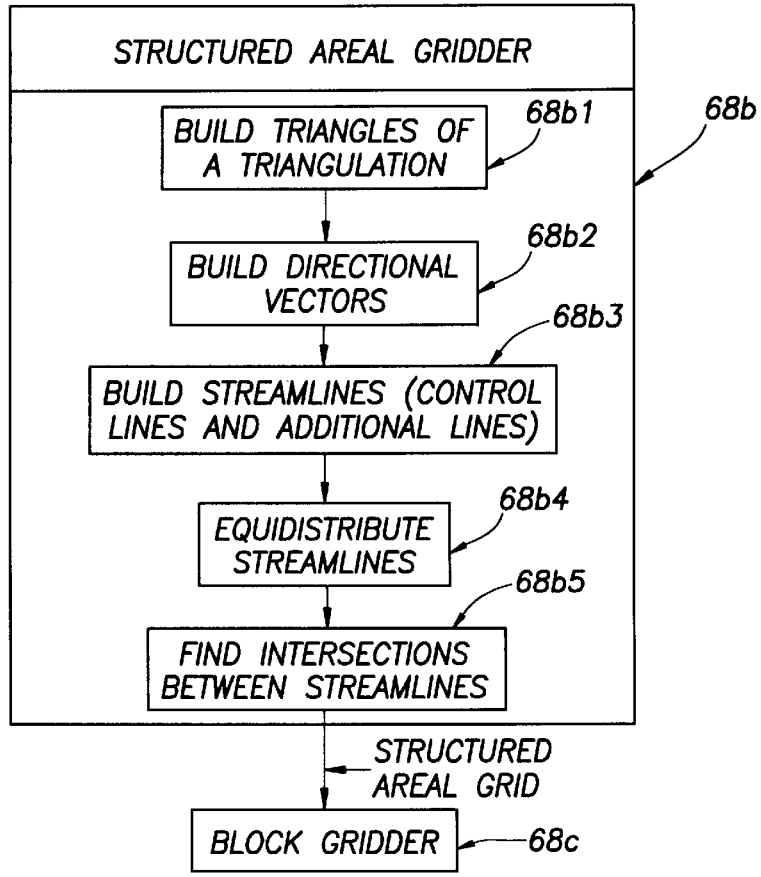

Referring to FIG. 27, the "structured areal gridder" (or "corner point gridder") 68b of FIG. 26 will produce a "structured areal grid" that is disposed across a user specified boundary on the top surface of a faulted horizon in an earth formation. The "structured areal gridder" produces the "structured areal grid" across a boundary on said top surface of the faulted horizon in the earth formation by performing the following functional steps: (1) build triangles of a triangulation, block 68b1, (2) build directional vectors on the nodes of the triangulation, block 68b2, (3) using the directions of the directional vectors, build streamlines (which includes "control lines" and "additional lines") across the user specified boundary, block 68b3, (4) equidistribute the streamlines, block 68b4, thereby producing a "structured areal grid"; and (5) find "intersections between the streamlines", block 68b5. The "structured areal grid", generated by the structured areal gridder 68b, is received by the "Block Gridder" 68c. The Block Gridder 68c will drop coordinate lines down from the "intersections between the streamlines" of the structured areal grid; and, when those coordinate lines intersect the lower-oriented horizons in the earth formation, a multitude of "grid blocks", defined by their coordinate lines and the two (uppermost and lowermost) horizons, are formed, the multitude of "grid blocks" together constituting a "structured grid".

The elements of Flogrid 60a, discussed above with reference to FIGS. 24, 25, 26, and 27, will be discussed in greater detail below with reference to FIGS. 28a through 52.

In FIGS. 28a and 28b, the input data 69 flowing into the "Flogrid" simulation gridding program 60a of FIG. 24 (hereinafter called "Flogrid" 60a) will include two tracks of data: the data included in "track 1" which is illustrated in FIG. 28a, and the data included in "track 2" which is illustrated in FIG. 28b.

In "track 1" of FIG. 28a, two types of the input data 69 will be input to Flogrid 60a: a set of "map data" (i.e., the horizon data 30d1 of FIG. 24), and "fault traces" (i.e., the fault data 30d2 of FIG. 24). For track 1, the user/operator must select the map data and the fault traces 30d1, 30d2 for the purpose of building a "structural model".

However, in "track 2" of FIG. 28b, the input data 69 also includes a set of data called "fine cell geological models" 147 (i.e., the geo-cellular models 147 of FIG. 24). The "fine cell geological models" 147 of FIG. 28b will also be input to Flogrid 60a. Since a "structural model" comprises a "geological model" plus a "property model", the "geological model" is already present in the "fine cell geological model" of track 2. Therefore, for track 2, it is not necessary for the user to select map data and fault traces (as in track 1) for the purpose of building the geological model.

Therefore, the "input data" 69, input to Flogrid 60a, includes the "map (horizon) data" and "fault traces" for track 1, as shown in FIG. 28a, and the "fine cell geological models" for track 2, as shown in FIG. 28b.

The Reservoir Data Store 64 and Building the Structural Model 66a of the Structural Framework 149 of FIG. 25

In FIG. 24, 28a, and 28b, the input data 69 (i.e., the track 1 input data of FIG. 28a and the track 2 input data of FIG. 28b) is loaded into the "reservoir data store" (RDS) 64 of Flogrid 60*a*. The "input data" for track 1 may be comprised of two "maps", where each "map" may be a different version of the same horizon. The user/operator, sitting at the workstation 40 of FIG. 14*b*, will select what data, in the "input data" of FIGS. 28*a* and 28*b*, will be used to build the structural model 66*a* of FIG. 25. If user selects the track 2 "input data" of FIG. 28*b*, the "fine cell geological model" input data of track 2 of FIG. 28*b* already includes the "geological model". Recall that a "structural model" 66*a* really consists of a geological model plus a property model 66*b*. Therefore, in track 2, we already have a geological model included in the "fine cell geological model" of FIG. 28*b*. The structural model 66*a*: defines where the faults are located in an earth formation, how the faults are surfaces, illustrates the horizons, and defines the surfaces of the horizons (i.e., the "geometry" or positions of the surfaces in the formation, the "topology" of the formation, or the pattern and the network in the formation). A good example of a structural model 66*a* is illustrated in FIG. 25*a*. On the other hand, the property model 66*b* applies certain properties to the rock of the earth formation, where such properties include porosity and permeability. However, in track 1, where map data and fault traces are input to Flogrid 60*a*, Flogrid 60*a* will actually build a structural model 66*a* from the map data and the fault traces data. The input data for track 1 (map data and fault trace data) is assumed to be good data. As a result, in track 1, the user will select the "maps" and the "fault traces" of the "input data" of track 1 (stored in the reservoir data store 64), and the "maps" and "fault traces" of track 1 (FIG. 28*a*) will be used to build the structural model 66*a*.

In FIG. 29, for example, the operator sitting at the workstation 40 of FIG. 14*a* will build a structural model 66*a* by selecting a "map 1" 120, a "map 2" 122, and a "map 3" 124, and the user/operator will then select the faults 126 which intersect those maps (or horizons) 120, 122, 124. At this point, the structural model 66*a* for track 1 (FIG. 28*a*) is built and defined by the operator, in response to the map data and fault traces data of FIG. 28*a*. In fact, the structural model 66*a* for track 1 is defined to the same extent as if the "fine cell geological model" for track 2 (FIG. 28*b*) had been selected by the operator to build the structural model 66*a*.

Property Modeler 66*b*

In FIGS. 24 and 30, the property modeler 66*b* of FIG. 24 will apply certain "properties" to an earth formation "layer", such properties including, for example, porosity, permeability, etc.

For track 1 of FIG. 28*a*, the property modeler 66*b* uses "property maps" to assign certain "properties", such as porosity and permeability, to each of the earth formation layers. In FIG. 30, for example, there are three maps (or horizons), a first "map 1" 120 representing a first horizon layer, a second "map 2" 122 representing a second horizon layer, and a third "map 3" 124 representing a third horizon layer. A "property map 1" layer 128 is defined by the "map 1" 120 and the "map 2" 122, and a "property map 2" layer 130 is defined by the "map 2" 122 and the "map 3" 124. The property modeler 66*b* models (or represents) certain properties, such as porosity or permeability, to the "property map 1" layer 128, and the property modeler 66*b* will also apply other properties, such as porosity and permeability, to the "property map 2" layer 130.

For track 2, however, in connection with the "fine cell geological model", properties are already present in each little cell of the "fine cell geological model".

Sometimes, for either track 1 or track 2, the user can apply more properties to the model by setting up simple calculations to derive one property from another.

Now, since a "single geological model" 66*a* has been built by the structural framework 149 in response to either the track 1 or track 2 data, at this point, the two tracks (track 1 and track 2) merge. Prior to this point, there were two main ways to provide the input data 69 to Flogrid 60*a*, and those two main ways required two tracks for building the structural model. The "single geological model" is now generated by the structural framework 149 and input to the property model 66*b*. However, prior to discussing the property model 66*b*, note the function of the upgridder 84 of FIG. 24 which is discussed below.

Upgridder 84 of FIG. 24

At this point, the user might want to simplify the "single geological model" 66*a*, being input by the structural framework 149 to the property model 66*b* of FIG. 24, by using the upgridder 84 of FIG. 24 to group the layers of the "single geological model" (hereinafter called "geological model"). For example, the "geological model" may be comprised of 600 layers, and the user can use the upgridder 84 to group the layers of the "geological model", either by sight (visually) or by "algorithm". When the layers of the "geological model" are grouped by the upgridder 84 using the "algorithm" method, there are two methods used: the "variation grouping" method (where the user can group layers together which are similar), and the "flux based grouping" method (where the user would pump water through the layers and limit the amount of flux any one layer can carry). Consider the following detailed discussion of the Upgridder 84 which is set forth in the following paragraphs.

The Upgridder 84 is used to group layers in a geological model into coarser simulation layers. There are two automatic options for this, in addition to the manual option described in the user guide: (1) A variation based method which groups layers so that the variation in a layer is controlled, and (2) A flow based method which groups layers by controlling the total flux within a layer.

The interfaces to the variation and flow based methods have been designed to be very similar, even though the underlying algorithms are different. There are several options in each approach which have a corresponding option in the other approach.

The algorithms discussed below are described with reference to grouping layers. Rows and columns are grouped in a directly analogous way except for minor differences in the flow based method which are detailed later.

Upgridder 84—Variation Based Upgridding

This method has been developed to improve the efficiency of previously described variance based upgridding methods. These methods adjust the simulation grid block corners so that the variance of some user selected property is equidistributed under the constraint of a specified total number of grid blocks. The technique can work well. However, in full generality (when we group geological cells into simulation cells) it is slow—mainly because of the sampling needed. In the special case that the simulation grid layers correspond to an exact group of geological layers, the algorithm is much faster. However, it still requires the solution of a difficult combinatorial optimisation problem and needs obscure user input. The difficulty arises from the non-additive nature of variance. If we add a high variance layer to a low variance layer, the total variance can decrease.

In the following paragraphs, the notion of variability or variation (which is strictly increasing) is introduced.

Consider a geological model with Ng layers and define the variation of a property, p, between two layers according to the expression:

$$\lambda_0 = 0 \qquad \text{Eq. 1}$$

$$\lambda_k = \frac{1}{nInJ} \sum_{ij} |P_{i,j,k} - P_{i,j,k+1}|$$

$$\lambda_{Ng} = 0.$$

Where $P_{i,j,k}$ is the value of the property in geological cell (i,j,k), nInJ is the total number of cells in the layer, and the summation is over all pairs of cells which both have a non-zero volume. We define $v_0$ and $v_{Ng}$ for convenience in defining the two-way variation. The summation is performed for all values of k from 1 to Ng−1.

The total variation of the whole model is defined by the sum of the variations between the layers.

We define the two-way variation of a layer by the expression:

$$vt_k = 0.5(v_{k-1} + v_k) \qquad \text{Eq. 2}$$

We order the two-way variations of the layers so that the layer with 't-layer-index n' is the layer with the n'th largest two-way variation.

If the geological layers are grouped, consecutively, into simulation layers, we define the variation in any coarse layer according to $$v_s = \sum_{k \in s} \lambda_k. \qquad \text{Eq. 3}$$

where the summation is over all the layer geological layer boundaries inside the simulation layer.

The user now sets the following parameters: (1) An upper bound on the simulation layer variation, expressed as a percentage on the total variation of the model, (2) An upper bound is set on the number of geological layers which can be grouped into a simulation layer, and (3) The number of layers to be retained as single layers. That is, specific geological layers are designated to remain as simulation layers. If the user specifies R layers are to be retained as single layers, these R layers will be those with the R highest t-layer-indices.

The grouping starts at the base of the model, so that the last group of layers, at the top, may have a variation considerably smaller than the user specified maximum.

Upgridder 84—Flow Based Upgridding

In this approach we solve two single phase, incompressible, flow problems on the reservoir, from left to right, and from the back to the front. We will refer to these experiments as the I and the J experiments. In the experiments we impose constant pressure boundary conditions on two opposing vertical faces of the reservoir, and zero flow boundary conditions on the other four. The pressure on one face is set to unity, and on the opposing face is set to zero. Without loss of generality, we set the viscosity to unity.

The flow calculations are performed in a composite manner by setting the transmissibilities transverse to the pressure drop direction to zero. This greatly speeds the calculations.

Once the flow calculations are performed, the layer fluxes are calculated by accumulating the volumetric flux, independently for each layer, through each face between all pairs of grid blocks and all exterior faces of the layer. Note that the layer fluxes include the contributions of both the I and the J experiments.

Once these layer fluxes are found, we order the layer fluxes to obtain the flux index for each layer. The maximum flux is defined to be the flux in the layer with flux index equal to unity—i.e. the flux in the layer with the maximum flux amongst the layers.

The user is then required to set three parameters: (1) An upper bound on the simulation layer total flux, expressed as a percentage of the maximum flux, (2) An upper bound on the number of geological layers which may be grouped into a simulation layer, and (3) The number of layers to be retained as single layers; that is, specific geological layers are designated to remain as simulation layers; if the user specifies R layers are to be retained as single layers, these R layers will be those with the R highest flux-indices.

Again the grouping is started at the base of the reservoir.

Note that when grouping rows or columns, instead of a layer flux we have a row or column flux. These fluxes still use the I and the J experiments, described above. The row flux (grouping rows of cells of constant J) uses only the I experiment fluxes. The column flux (grouping columns of cells of constant I) uses only the I experiment fluxes.

The Structured Gridder 68 of FIG. 24

The Boundary Editor 68a of FIG. 26—Building a Boundary

Figure 31:
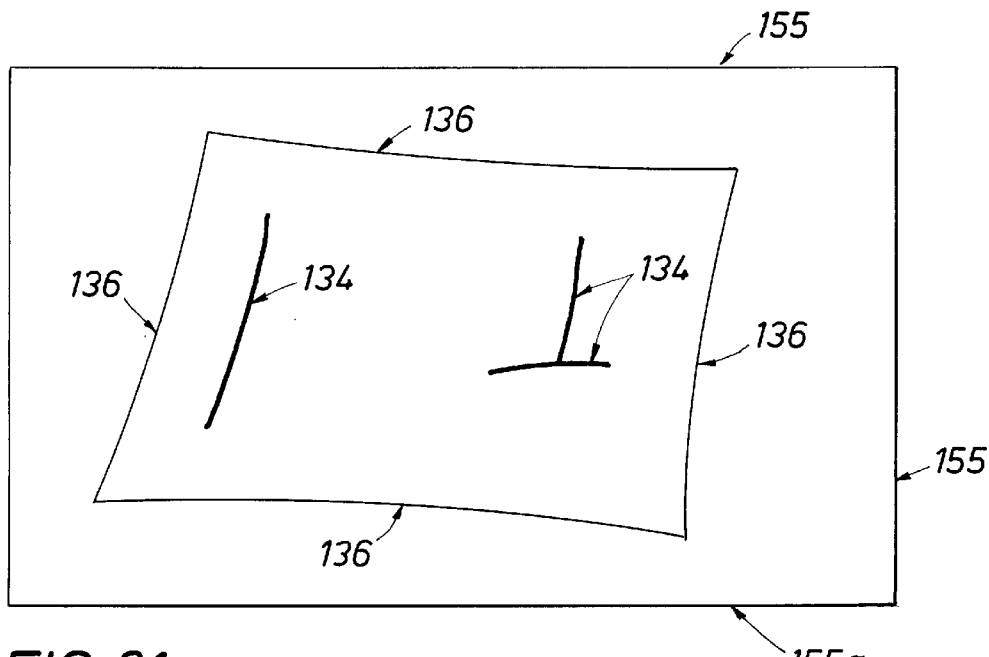
Figure 32:
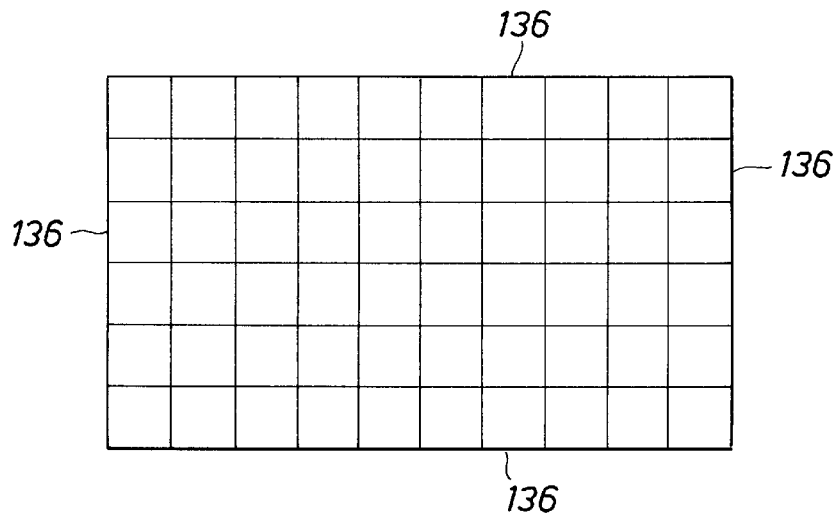
Figure 33:
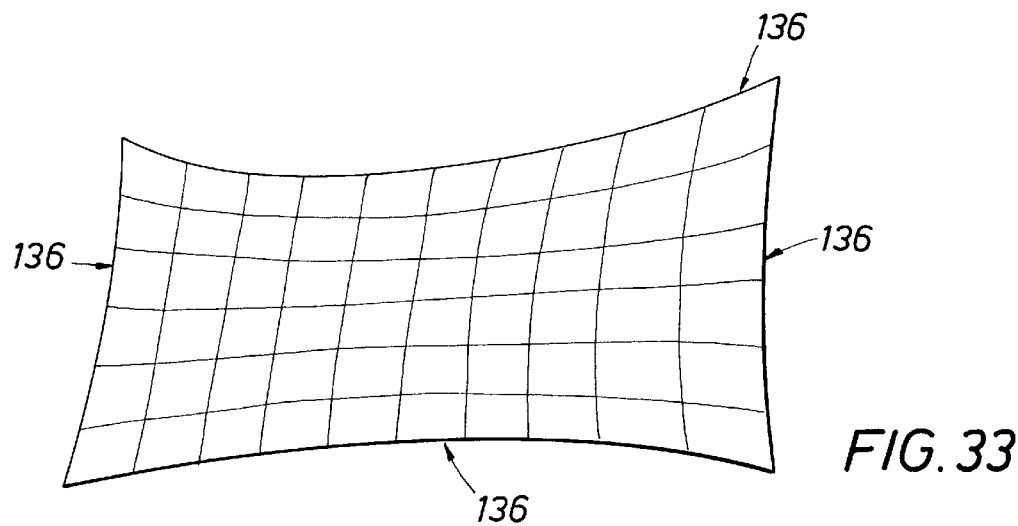

Referring to FIGS. 31, 32, and 33, and referring initially to FIG. 31, assume that FIG. 31 represents a top view of a horizon, such as one of the horizons 155 of FIG. 25a, the top view of the horizon 155 including intersections 134 of the faults 157 passing through the horizon 155. In FIG. 31, assume that a boundary 136 is drawn inside the horizon 155, the boundary 136 enclosing the intersections 134 of the faults 157.

In FIG. 31, therefore, when looking down on the horizon 155 (representing an "areal view"), we see a user specified boundary 136 containing intersection lines 134 representing the intersections of the faults 157 passing through the horizon 155 (see FIG. 25a). The fault intersection lines 134 in FIG. 31 represent the "fault traces" 30d2 of FIG. 28a, and the user digitizes in a "boundary" 136 around the fault traces 134, 30d2 where the user plans to perform the "structured areal gridding" of the present invention.

A "structured" grid needs a boundary 136 with four (4) logical corners, and the shape of the boundary 136 begins to look like a "distorted rectangle". Therefore, a "structured grid" is a distorted version of a rectangular grid.

The Structured Areal Gridder 68b of FIG. 26—Build a "Structured Areal Grid"

In FIG. 32, to build a "structured areal grid" on the horizon 155 of FIG. 31, start by drawing a completely uniform set of rectangles inside the boundary 136, where all of the rectangles have the same shape and size, as illustrated in FIG. 32. Think of the rectangles of FIG. 32 as being comprised of a material having characteristics which lie somewhere between the characteristics of a steel rod and an elastic band; that is, the material of the rectangles of FIG. 32 has more stiffness than the stiffness of an elastic band, but the material has more elasticity than the elasticity of a steel rod. Next, bend the rectangles of FIG. 32 to fit certain features in which you are interested. After the bending, the distorted boundary "136 distorted" is illustrated in FIG. 33. Any distortion of the rectangles of FIG. 32 is valid as long as none of the cells of FIG. 32 are turned "inside-out".

However, during the bending of the rectangles of FIG. 32, a major objective is to distort the rectangles of FIG. 32 for the purpose of capturing as many fault intersection lines 134 located on the horizon 155 as possible.

Figure 34:
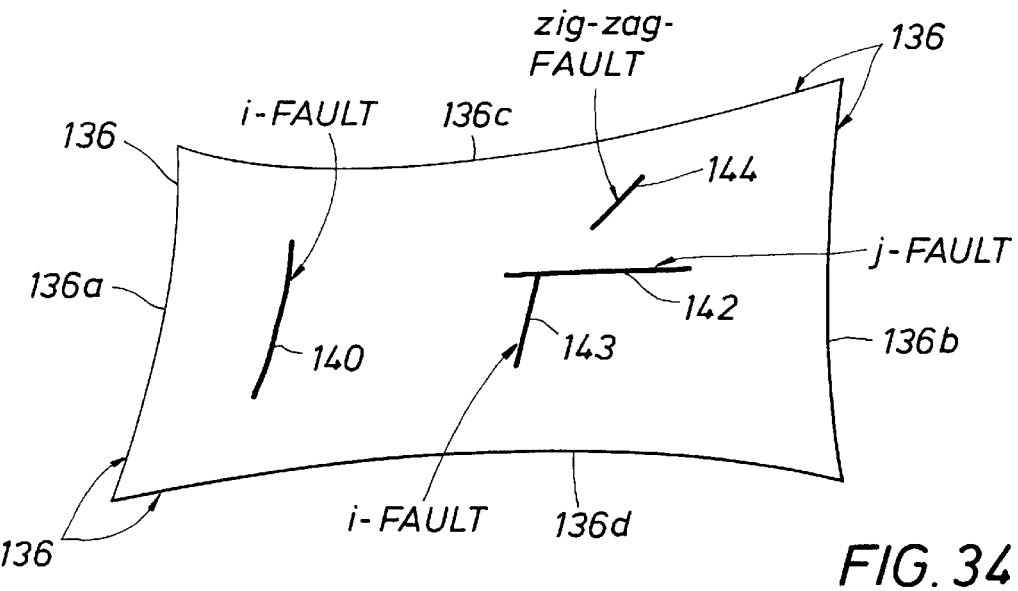

In FIG. 34, the boundary 136 of FIG. 31 consists of two parts: the "i" lines and the "j" lines, where the "i" lines represent the left side and the right side of the boundary 136, and the "j" lines represent the top and the bottom side of the boundary 136. For example, in FIG. 34, the boundary 136 has an "i" line 136a forming the left side of the boundary 136, another "i" line 136b forming the right side of the boundary 136, a "j" line 136c forming the top side of the boundary 136, and another "j" line 136d forming a bottom side of the boundary 136.

Then, in FIG. 34, divide the fault intersection lines 134 of FIG. 31 into three classes: "i" faults, "j" faults, and "zig-zag" faults. Grid to the "i" faults and the "j" faults, but do not grid to the "zig-zag" faults. For example, in FIG. 34, fault intersection line 140 is an "i" fault, fault intersection line 142 is a "j" fault, fault intersection line 143 is another "i" fault, and fault intersection line 144 is a "zig-zag" fault.

Figure 35:
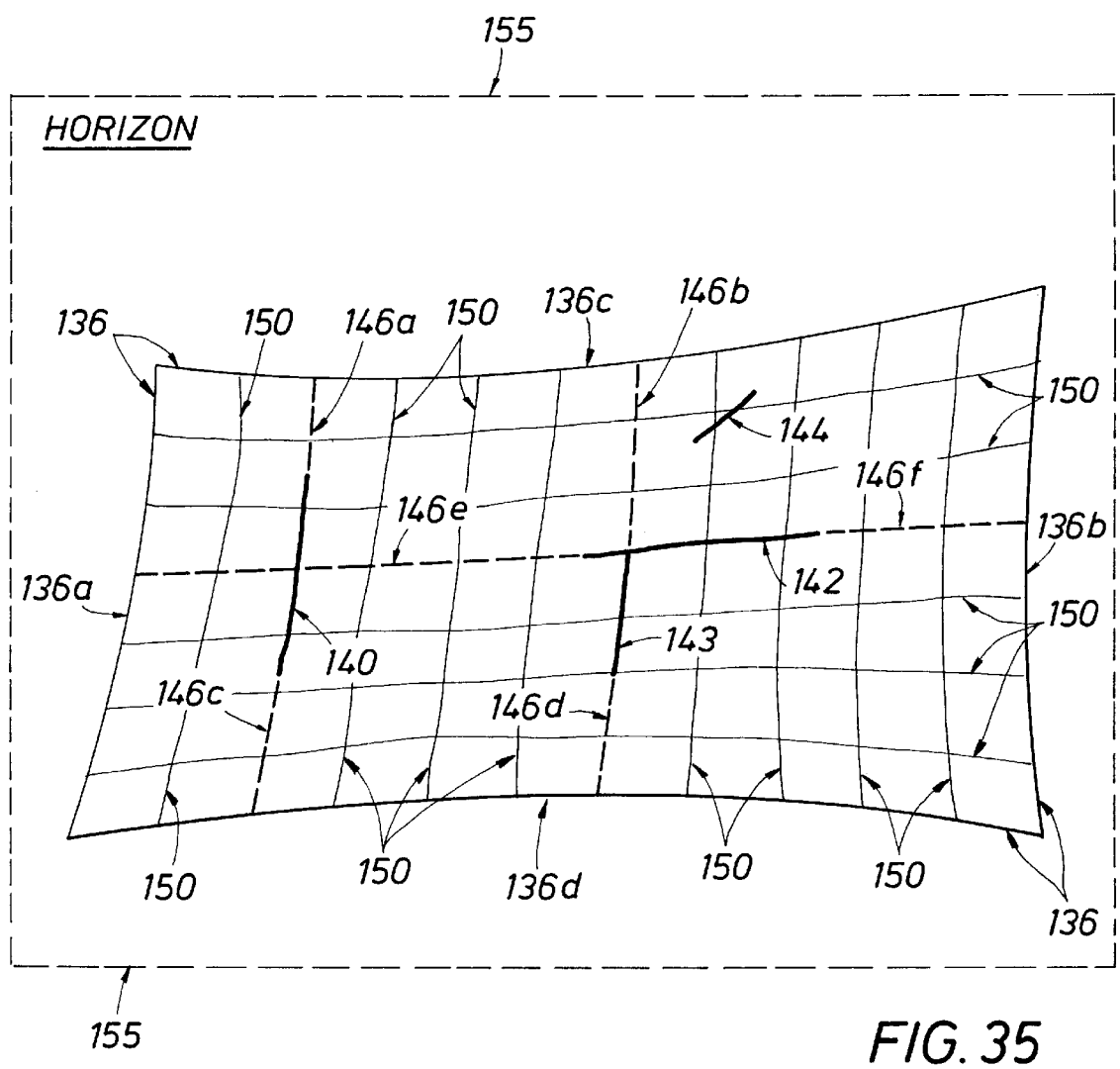

In FIGS. 32, 34, and 35, using the undeformed grid of FIG. 32, bend the undeformed grid of FIG. 32 to fit the deformed boundary 136 (comprised of 136a, 136b, 136c, 136d) of FIG. 34. In FIG. 34, the term "control lines" is defined to be each of the boundary lines 136 and each of the "extended faults". An "extended fault", however, consists of a "fault intersection line" plus one or more "dotted extensions" interconnecting the "fault intersection line" to the boundary 136. In FIG. 35, the "boundary lines" 136 are marked by numerals 136a, 136b, 136c, and 136d, the "fault intersection lines" are marked by numerals 140, 142, and 143, and the "dotted extensions" are marked by numerals 146a, 146b, 146c, 146d, 146e, and 146f. Therefore, a "control line" in FIG. 35 consists of each of the boundary lines 136a, 136b, 136c, and 136d, and a "control line" in FIG. 35 also consists of each of the "i" and "j" fault intersection lines 140, 142, and 143 coupled with the one or more dotted extensions 146a through 146f connected, respectively, to the fault intersection lines 140, 142, 143. For example, a first "control line" would be "i" fault intersection line 140 and the dotted extension 146a connecting the fault intersection line 140 to the upper boundary 136c and the dotted extension 146c connecting the fault intersection line 140 to the lower boundary 136d. A second "control line" would be the "j" fault intersection line 142 and the dotted extension 146e connecting the fault intersection line 142 to the left boundary 136a and the dotted extension 146f connecting the fault intersection line 142 to the right boundary 136b. A third "control line" would be the "i" fault intersection line 143 and the dotted extension 146b connecting the fault intersection line 143 to the top boundary 136c and the dotted extension 146d connecting the fault intersection line 143 to the bottom boundary 136d. A fourth, fifth, sixth, and seventh "control line" would consist of the boundaries 136a, 136b, 136c, and 136d in FIG. 35.

In the prior art, the user would manually digitize and introduce the "control lines". However, the structured areal gridder 68b of Flogrid 60a of the present invention will automatically and carefully build the "extended faults" (faults intersection lines 140, 142, 143 with dotted extensions 146a through 146f connected thereto) so that these extended faults will appear to be smooth. The structured areal gridder 68b will then build a grid inside the boundary 136 of the horizon 155 of FIG. 35 by adding "additional lines" 150 inside the boundary 136, the location of each of the "additional lines" 150 inside the boundary 136 being determined by interpolating between adjacent ones of the "control lines" inside the boundary 136.

Having automatically built the "control lines" in FIG. 35, the user will now specify how many extra "additional lines" 150 he wants to be located adjacent to or in-between the "control lines". For example, in FIG. 35, the user will specify that "additional lines" 150 will exist adjacent or between the "control lines" of FIG. 35. The "control lines" of FIG. 35 are listed as follows: a first control line (140, 146a, 146c), a second control line (143, 146b, 146d), a third control line (142, 146e, 146f), a fourth control line 136a, a fifth control line 136b, a sixth control line 136c, and a seventh control line 136d.

The Block Gridder 68c of FIG. 26—Drop Coordinate Lines

Figure 35A:
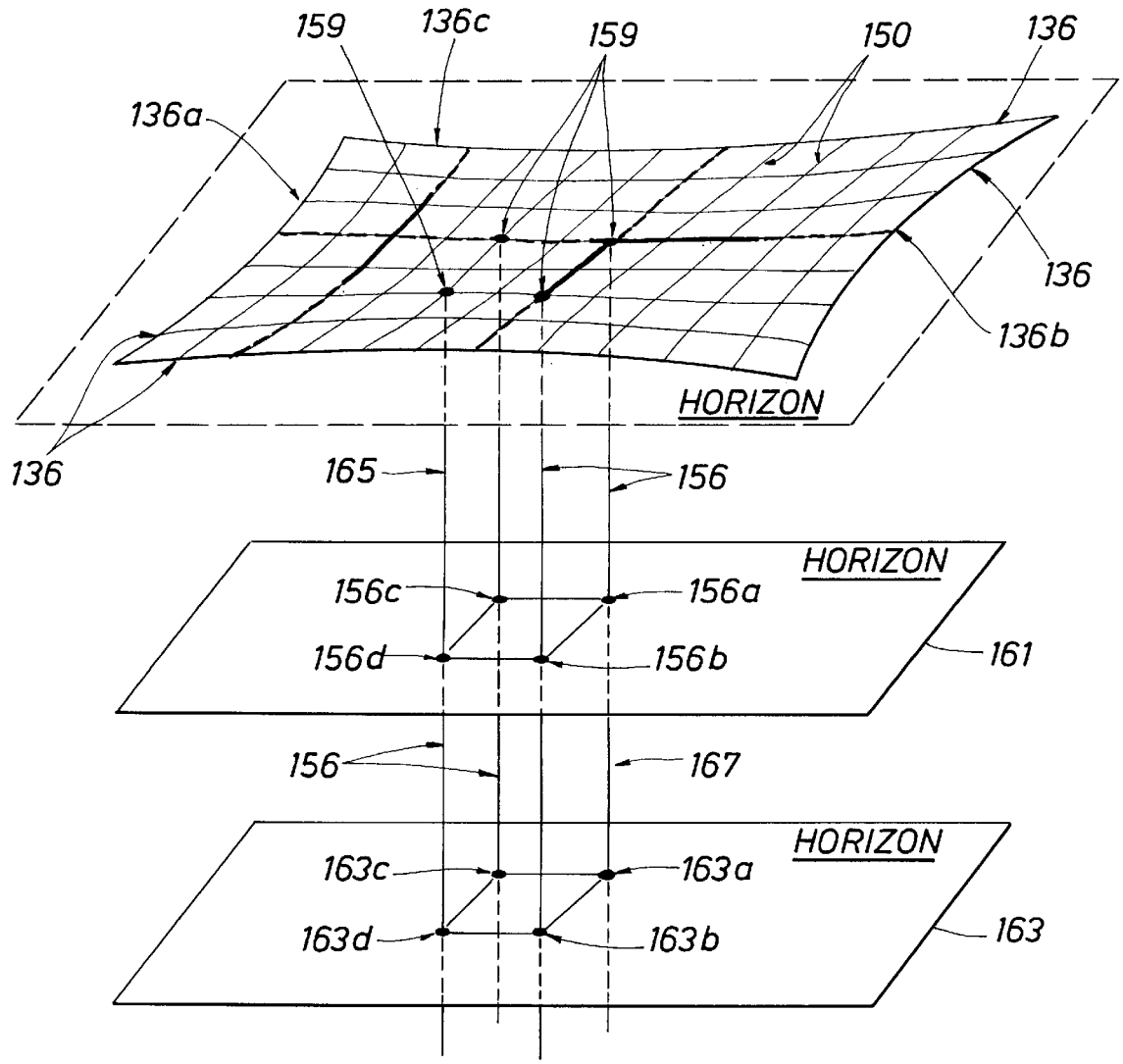

In FIGS. 35 and 35a, after the additional lines 150 are added to the grid of FIG. 35, locate each node (i.e., intersection point or vertices) of the grid of FIG. 35, connect a "coordinate line" to each such node of the grid of FIG. 35, and drop each "coordinate line" down, into the earth formation (i.e., into the page of FIG. 35), allowing the "coordinate lines" to intersect other maps or horizons in the earth formation, and then determine where each "coordinate line" intersects the "maps" or horizons of the earth formation (recall that the term "map" also refers to a "horizon").

A "structured simulation grid", comprised of a plurality of "grid blocks", is obtained by dropping those "coordinate lines" down from the nodes or vertices of the areal grid of FIG. 35 and allowing those coordinate lines to intersect the lowermost maps or horizons in the earth formation, thereby forming a plurality of "grid blocks". A "grid block" is defined by reference to FIG. 35a.

Figure 36:
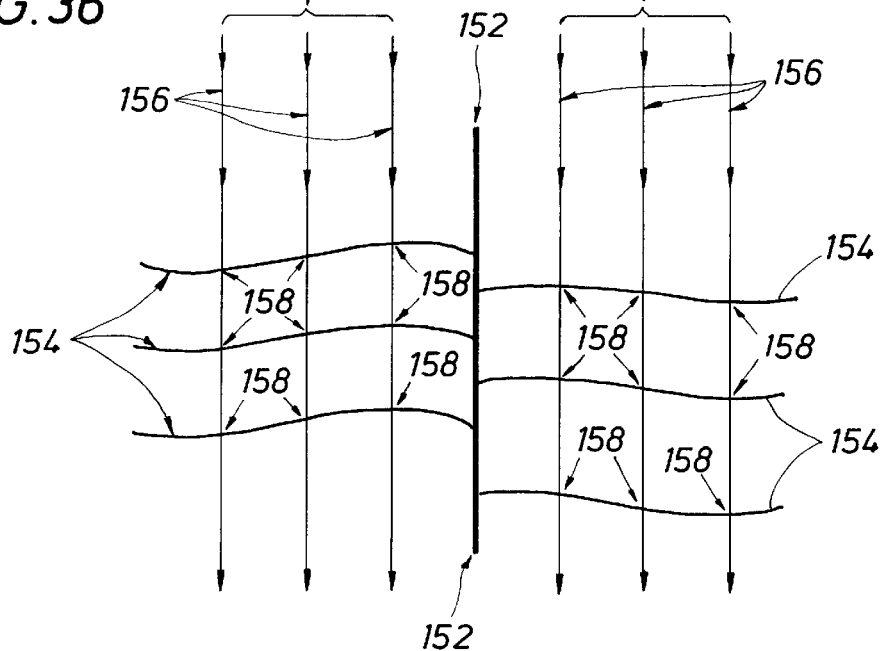

In FIGS. 35a and 36, for example, a cross section of an earth formation, similar to the cross section of the earth formation 153 of FIG. 24a, is illustrated.

In FIGS. 35a and 36, referring initially to FIG. 36, a cross section of an earth formation is shown in FIG. 36, and an actual fault 152 is shown intersecting a plurality of horizons 154. A plurality of coordinate lines 156 are dropped down, from the nodes or vertices of the grid of FIG. 35, through the horizons 154, and the intersections between the coordinate lines 156 and the horizons or maps 154 in FIG. 36 are noted. The term "vertices of the grid of FIG. 35" refers to the intersections, in FIG. 35, between the "control lines" and "additional lines" 150 or the intersections between "control lines" or the intersections between "additional lines" 150. In FIG. 36, intersections 158 are determined to exist between each of the "dropped down" coordinate lines 156 and each of the horizons 154. The intersections 158 in FIG. 36 define four of the eight corners of the "grid blocks" that are going to be used in the simulator 40c2A of FIG. 16.

In FIG. 35a, a three dimensional view of the cross section of the earth formation of FIG. 36 is illustrated. In FIG. 35a, four coordinate lines 156 are connected to four nodes or vertices 159 of the grid of FIG. 35 and 35a, and the four coordinate lines 156 are dropped down, into the earth formation, until the coordinate lines 156 intersect two other lowermost horizons 161 and 163 in the earth formation. At this point, two "grid blocks" 165 and 167 are formed. In FIG. 35a, the first "grid block" 165 is bounded by the coordinate lines 156 and nodes 159 on the "structured areal grid" and intersection points 156a, 156b, 156c, and 156d on the horizon 161; the second "grid block" 167 is bounded by the coordinate lines 156 and the intersections 156a through 156d on the first horizon 161 and the intersections 163a through 163d on the second horizon 163. Using the above technique discussed above with reference to FIG. 35a, a multitude of such "grid blocks" could be developed by dropping coordinate lines down from each of the nodes or vertices of the grid of FIG. 35 and intersecting those coordinate lines with the lowermost horizons in the earth formation.

Figure 37:
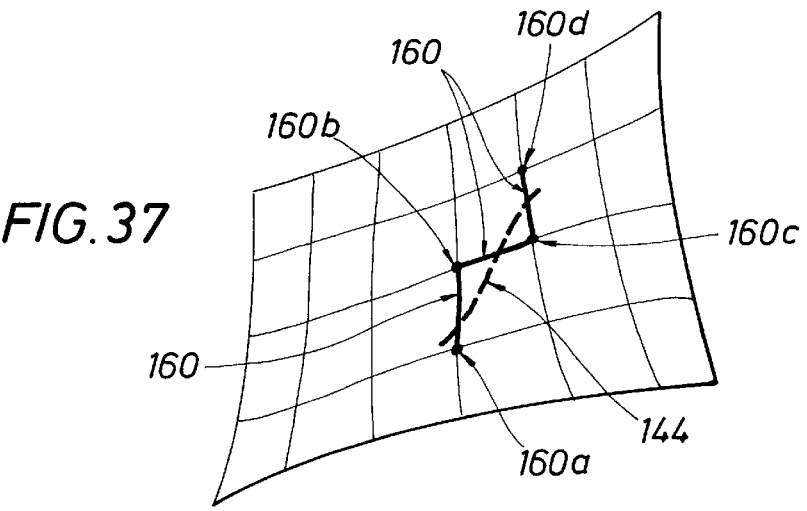

In FIG. 37, with regard to the "zigzag" fault intersection lines 144 of FIG. 34, in order to grid to these zigzag faults 144, we "snap them" to the nearest grid node. In FIG. 37, the "zigzag" fault 144 is "snapped to the nearest grid node", thereby producing the faults 160 in FIG. 37. As a result, we have changed the shape of the zigzag fault 144 in FIG. 37 to correspond to the vertices 160a through 160d of the grid of FIG. 37.

Figure 38:
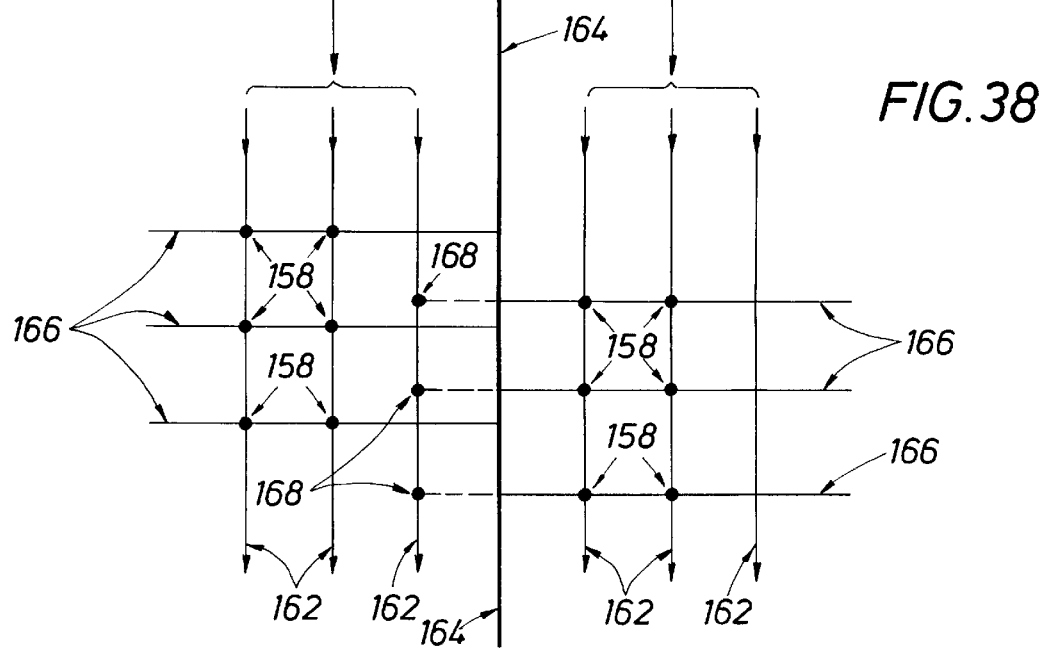

In FIG. 38, coordinate lines 162 are shown adjacent a zigzag fault 164 intersecting horizons 166. The structured areal gridder 68b of FIG. 26 will extend out the horizons 166 to intersect the coordinate line 162 thereby producing the intersections 168. The areal gridder 68b then uses the intersections 168 between the extended horizon 166 and the coordinate lines 162 to form the corners of the "grid blocks" of the structured grid.

The Upscaler 70

The gridding has been accomplished, and now we must do the upscaling. By using the Upscaler 70 of FIG. 24 to perform the upscaling function, Flogrid 60a will assign certain properties to each of the "grid blocks" of the simulation model. The upscaler 70 only functions with the structured gridder 68, not with the unstructured gridder 40c1 of FIG. 16, since the unstructured gridder 40c1 has its own facility for assigning properties to the simulation model.

In FIG. 39, traditionally, the upscaler 70 will assign properties to each of the "grid blocks" of the simulation model by sampling the property at the center of each of the "grid blocks". For example, the upscaler 70 may sample the "porosity" or the "permeability" at the center of the "grid block".

However, in practice, the maps (horizons) vary at the center of the "grid block". Therefore, the traditional approach may not function properly.

In FIG. 40, therefore, in actual practice, the upscaler 70 will fine grid" the "grid block". If, for example, there is a pressure drop across the "grid block", the upscaler 70 will estimate the actual flow through the grid block, then, taking into account all the variability, the upscaler 70 will define the average or the effective value of the flow rate in the "grid block" to be that value of flow rate, in a uniform pressure grid block, that would give the same flow rate for that pressure drop.

Consider the following detailed discussion of the Upscaler 70 which is set forth in the following paragraphs.

The Upscaler 70 performs upscaling methods in FloGrid 60a based on the concept that upscaled properties are like laboratory measured values. Thus, 'measurements' are devised for calculating some upscaled properties independently of the others. It is assumed that porosity will be upscaled independently of any other property. In addition, the properties of one "grid block" are calculated at a time, which is analogous to cutting a "grid block" from an earth formation reservoir and performing experiments on that "grid block" in a laboratory.

Upscaler 70—Constructing the Fine Grid

Each grid block 165, 167 is assumed to be defined by its eight corner points. In FIG. 40, in order to fine grid the "grid block", an "Nx" by "Ny" by "Nz" grid is constructed inside the "grid block" using a simple interpolation formula (refer to the following paragraphs for a description of that interpolation formula).

Upscaler 70—Sampling the Properties

Once we have constructed a fine grid" within the "grid block" (where the fine grid inside the grid block is comprised of a plurality of cells), we can sample the various properties we need to upscale at the center of each fine grid cell. We assume that the properties are piecewise constant on the fine grid. FloGrid 60a will choose the numbers of cells within each "fine gridded grid block" so that the size of each "fine cell" is about that of the smallest geological model cell within the coarse grid block. Let us denote the volume of the b-th grid block of a "fine grid cell" by $V_b$. For reasons of efficiency, FloGrid 60a uses an approximation for these block volumes. The estimate of the total volume of the coarse cell obtained by summing these fine grid values will tend to be the exact value as the fine grid is refined.

Upscaler 70—Upscaling Non-Dimensional Real Properties

Unknown properties, whose dimensions (in the sense of Darcies, meters etc.) are not that of permeability, are assumed to be arrays of dimensionless real numbers. The coarse scale average in each coarse grid block is defined to be the volume weighted average over the fine cells:

$$P_B = \frac{\sum_b v_b P_b}{\sum_b v_b} \qquad \text{Eq. 1}$$

where $p_b$ is the property in the b-th fine block and $P_B$ the upscaled value in the coarse block.

Upscaler 70—Upscaling Porosity

Porosity is averaged using the fine cell volume as a weighting. Thus:

$$\varphi_B = \frac{\sum_b v_b \varphi_b}{\sum_b v_b} \qquad \text{Eq. 2}$$

Upscaler 70—Upscaling Absolute Permeability

In "simple averaging" methods, we do not justify the averaging formula by reference to an approximate flow solution. In the case of arithmetic and harmonic averaging, we weight the permeabilities with geometric factors, so that in the 1-D cases where the method is similar to a flow based method, we arrive at the same answers. This amounts to taking into consideration the cross-sectional area and length of each fine scale grid block. This is equivalent to using the volume and squared length. In the geometric and power averaging cases, we do not include the geometric factors because they cancel out. We only present the formula for upscaling the I-direction permeability. The other directions have the same form. In the following paragraphs, the single phase flow equations in a general trilinear coordinate system are presented. Study of these equations may help readers who wish to derive the harmonic-arithmetic and arithmetic-harmonic methods. The following formula are available, where KI is the upscaled absolute permeability in the I-direction, $V_{ijk}$ is an estimate of the volume of the cell, $dI_{ijk}$ is an estimate of the length of the grid block in the I-direction and $kI_{ijk}$ is the absolute permeability in the i-th grid block in the I-direction, for cell (i,j,k):

Arithmetic averaging $$KI \sum \frac{V_{ijk}}{dI_{ijk}^2} = \sum \frac{V_{ijk} kI_{ijk}}{dI_{ijk}^2} \qquad \text{Eq. 3}$$

where the summation is over all fine grid blocks.

Harmonic averaging $$\frac{1}{KI} \sum \frac{dI_{ijk}^2}{V_{ijk}} = \sum \frac{dI_{ijk}^2}{V_{ijk} kI_{ijk}} \qquad \text{Eq. 4}$$

where the summation is over all fine grid blocks.

Geometric averaging $$N \ln KI = \Sigma 1N \, kI_{ijk} \qquad \text{Eq. 5}$$

where the summation is over all fine grid blocks.

Power averaging $$KI^\omega = \frac{1}{N}\sum kI_{ijk}^\omega \qquad \text{Eq. 6}$$

where the summation is over all fine grid blocks.

Upscaler 70—Composite 1-D Solutions

In these methods, we carve the fine grid into an array of tubes and ignore cross-flow between the tubes, or we carve the fine grid into a linear array of slabs and ignoring cross-flow within each slab. In the following, we assume that the viscosity is unity; this simplifies the equations with no loss of generality without affecting the upscaled values of permeability.

Upscaler 70—Harmonic-Arithmetic Averaging

In the first case we calculate the flux, $uI_{jk}$, through each tube (j,k) separately. This gives:

$$uI_{jk} \sum \frac{dl_{ijk}^2}{V_{ijk} kI_{ijk}} = \Delta p \qquad \text{Eq. 7}$$

The total flux through the grid block is then obtained by summing $uI_{jk}$, the flux through fine tube (j,k), over j and k. We then calculate the effective, upscaled, permeability, from:

$$\sum_{j,k}\frac{1}{\sum_i\frac{dl_{ijk}^2}{V_{ijk}kI_{ijk}}} = KI \sum_{j,k}\frac{1}{\sum_i\frac{dl_{ijk}^2}{V_{ijk}}} \qquad \text{Eq. 8}$$

Upscaler 70—Arithmetic-Harmonic Averaging

In this case, we assume a pressure drop of dpi across the i-th slab. Noting that by incompressibility the flux through each slab must be the same, the flux is given by the formula:

$$u = \delta p_i \sum_{j,k} \frac{V_{ijk}}{dl_{ijk}^2} kI_{ijk} \qquad \text{Eq. 9}$$

Now summing the pressure drops over the slabs, we obtain:

$$\sum_i \delta p_i = p_0 - p_L = u \sum_i \frac{1}{\sum_{j,k}\frac{V_{ijk}kI_{ijk}}{dl_{ijk}^2}} \qquad \text{Eq. 10}$$

where $p_0$ is the inlet pressure and $p_L$ the outlet pressure. Equating the pressure drop to the similar expression with constant KI, the upscaled permeability, we obtain the final expression:

$$KI = \frac{\sum_i \frac{1}{\sum_{j,k}\frac{V_{ijk}}{dl_{ijk}^2}}}{\sum_i \frac{1}{\sum_{j,k}\frac{V_{ijk}kI_{ijk}}{dl_{ijk}^2}}} \qquad \text{Eq. 11}$$

Upscaler 70—Full 3-D Solutions

The full, flow based, 3D numerical solution, is the most computationally intensive single-phase upscaling option. This is implemented using no-flow boundary conditions. In this option, we compute the total flux through the system in the direction of the pressure drop. The effective permeability is then estimated by solving the same problem with constant permeabilities chosen to give the same flux. This is done using the harmonic-arithmetic averaging method. An error is introduced by this, unless the grid blocks are rectangular. The use of the linear boundary conditions will remove the need for this approximation.

Upscaler 70—Building the Fine Grid in a Grid Block

In FIGS. 41 and 42, having selected our grid block, we divide the block into a set of Nx by Ny by Nz fine blocks. We do this using tri-linear interpolation from the corner values. One way of thinking about this is to imagine that the grid block is a deformed version of a unit cube. On a unit cube, we can introduce a coordinate system ($\xi$, $\theta$, $\zeta$), where each of the variables lies between 0 and 1. We then define the deformation of the unit cube to the actual grid block by the trilinear interpolation formula (see FIG. 42):

$$x(\xi,\theta,\zeta) = \{[x_1(1-\xi)+x_2\xi](1-\theta)+[x_3(1-\xi)+x_4\xi]\theta\}(1-\zeta)+\{[x_5(1-\xi)+x_6\xi](1-\theta)+[x_7(1-\xi)+x_8\xi]\theta\}\zeta$$

In FIG. 41, point labels on the reference cube and the grid block are illustrated. In FIG. 41, points 1–4 are on the top, and points 4–8 on the base, as shown in FIG. 41. We define a fine grid of rectangular grid blocks, all of the same shape and size, inside the reference block. The transformation then deforms all these fine reference cells into deformed fine grid blocks. In FIG. 42, the step of interpolating a 2×1×3 fine grid in a grid block is illustrated.

Upscaler 70—Single Phase Flow Equations in Curvilinear Coordinates

The derivation of the flow equations in general coordinates is most easily done using the machinery of tensor analysis. We assume, in the normal way, that the trilinear coordinate system is orthogonal, even when this is manifestly not the case.

In the following, the summation convention regarding repeated indices is in operation. For incompressible flow the mass balance law is:

$$\frac{\partial}{\partial \xi^i}\sqrt{g}u^i = 0$$

where $\xi^i$ is the i-th curvilinear coordinate ($\xi,\theta,\zeta$), for i=1,2,3 respectively. $\sqrt{g}$ is the square root of the determinant of the metric tensor and is the volume of physical space per unit volume of computational space at ($\xi,\theta,\zeta$)

Darcy's law reads:

$$u^i = -\frac{k^i}{\mu g_{ii}} \frac{\partial p}{\partial \xi^i}$$

where $k^i$ is the physical component of the permeability tensor in the i-th direction. The orthogonality approximation occurs when we ignore the off-diagonal terms of the transformed permeability tensor in the tri-linear coordinates. $g_{ji}$ is the i-th component of the metric tensor, and is the squared length of physical space per unit squared length of computational space at ($\xi$, $\theta$, $\zeta$) in the i-th direction. In our calculations we approximate the metric tensor as a constant in each grid block equal to the value at the block centre given by ($\xi$, $\theta$, $\zeta$)=(0.5, 0.5, 0.5). In this way the equations in the curvilinear system are of the same form as an equivalent system in rectangular coordinates but with differently varying permeabilities.

Detailed Description of the Structured Areal Gridder 68b of FIG. 26

The above discussion represents a detailed description of the "Flogrid" simulation gridding program 60a in FIG. 24, including a detailed description of the structured gridder 68 of the present invention which includes the "structured areal gridder" 68b of the present invention. The following paragraphs will discuss, in much greater detail, the structure and the functional operation of the "structured areal gridder" 68b of FIG. 26 of the present invention which is disposed within and forms a part of the structured gridder 68 of the "Flogrid" simulation gridding program 60a of FIG. 24.

Figure 43:
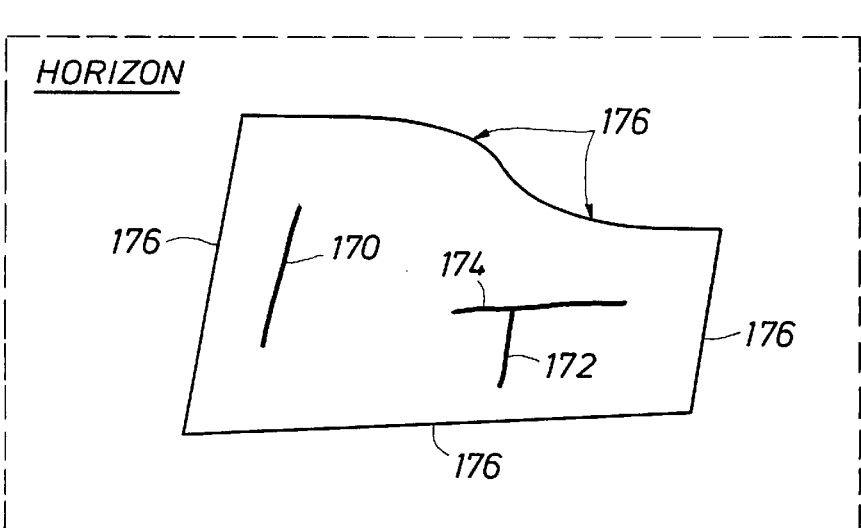

In FIG. 43, by using the Boundary Editor 68a in FIG. 26, the user has already digitized or specified a boundary 176 on a horizon 155, which boundary 176 will enclose all the fault intersection lines on that horizon.

A "boundary" 176 is, in fact, an enclosure on a horizon of an earth formation through which a plurality of faults have passed. For example, in FIG. 43, a boundary 176 encloses a plurality of fault intersection lines 170, 172, 174, the fault intersection lines 170, 172, 174 possibly existing on one or more of the horizons 155 of the earth formation shown in FIG. 25a.

In addition, the user has already made a selection of "i" and "j" faults (fault intersection lines) which are disposed inside that boundary 176. As indicated in FIG. 43, after specifying the boundary 176 on horizon 155, the user made a selection of a pair of "i" faults 170 and 172, and the user made a selection of a "j" fault 174.

Structured Areal Gridder 68b—Building a Structured Areal Grid

The structured areal gridder 68b in the structured gridder 68 of FIG. 26 will build a structured areal grid by performing the following functional steps:

Step 1: Construct a "Regular Triangular Grid" Whose Boundary is 'Well Outside' the User's Boundary 176 of FIG. 43

Figure 44:
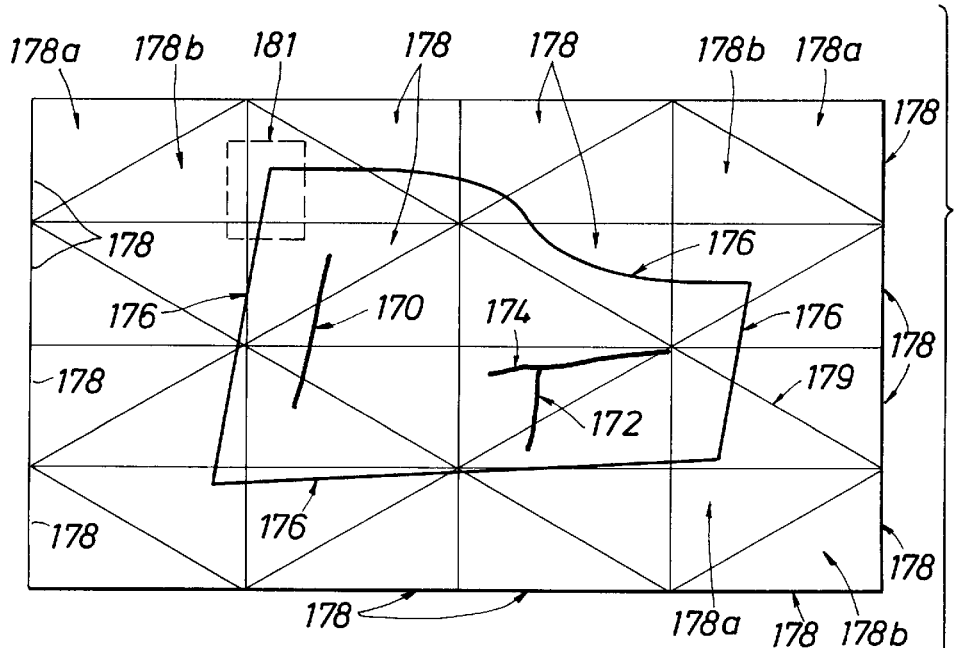

In FIG. 44, for example, a grid of rectangles 178 is drawn over the user's boundary 176 without any reference to the boundary 176 other than the general size of the boundary 176. Then, divide each of the rectangles 178 into "triangles" 178a, 178b, each rectangle 178 being divided up into two triangles, a first triangle 178a and a second triangle 178b. The result of this step is that we have produced a "regular triangular grid", since each triangle 178a, 178b in the interior has three neighbors. In FIG. 44, this "regular triangular grid", consisting of a plurality of triangles 178a, 178b overlaying the user's boundary 176, will be hereinafter called a "triangulation".

Step 2: Build a Boundary and a Fault Honoring an Unstructured Grid (Also Called the "isosurface cutting technique")

In FIG. 44, consider each of the straight lines, or straight line segments of FIG. 44 in turn (i.e., consider each of the "i" and "j" faults 170, 172, 174 in FIG. 44 and the boundary 176 in FIG. 44) that lie within the "regular triangular grid" of FIG. 44. In FIG. 44, by way of example, locate the corner 181 of the boundary 176. The following discussion will discuss exactly how the structured areal gridder 68b will grid to this corner 181.

In order to grid to the corner 181 in FIG. 44, the structured areal gridder 68b of FIG. 26 will perform the following steps (1) through (4):

(1) Determine the "affected triangles" [i.e., determine or identify the specific triangles of the 'regular triangular grid' of FIG. 44 within which the line segment (i.e., the corner 181 in FIG. 44) will be disposed]; (2) mark each node on the existing triangulation with a vertical distance from the node to the line segment, "+" on one side of the line segment, and "−" on the other side of the line segment; as a result, the line segment will include a "zero value contour", which is defined to be that part of the line segment where the distance between the node of the triangulation and the line segment is "zero", (3) if the node lies at almost a zero distance to the line segment, snap it to "zero" (zero distance from node to the line segment), and then (4) cut the triangles along the "zero value contour". The ends of the faults lie in the triangulation, and the corners of the grid lie in the triangulation.

The major objective of the above referenced functional steps (1) through (4) is as follows: to choose the original triangulation to be sufficiently fine so that triangles do not get cut more than 2 or 3 times at the most.

Step 3—Where One of the Boundary Lines or Faults Having a Direction is Passing Through a Node of a Triangle on the Triangulation of FIG. 44, Assign a "Directional Vector" of Unit Length (Also Known as a "Frozen" Directional Vector) Having That Direction to That Node, and Connect That Directional Vector to That Node of the Triangle on the Triangulation Recalling from FIG. 43 that the line segments include a boundary line 176, an "i" fault line 170, 172 and a "j" fault line 174, the "directional vectors" will include: a boundary directional vector, an "i" directional vector, and a "j" directional vector. The "i" directional vectors are set to line up with the "i" fault intersection lines, the "j" directional vectors are set to line up with the "j" fault intersection lines, and the boundary directional vectors are set to line up with the boundary lines.

For example, in FIG. 45a, the "i" directional vectors in FIG. 45a point upwardly and the "j" directional vectors point to the right.

In FIG. 45b1, recall the general rule about directional vectors: a "directional vector" is connected to that part of each of the line segments (170, 172, 174, 176) of FIG. 45b1 where that part of the line segment passes through a node of one of the triangles 178a, 178b in FIG. 45b1.

The direction of some directional vectors is known; and we call those vectors "frozen" vectors. However, the direction of some other directional vectors is not known; and we call those vectors "non-frozen" vectors. The directional vector that is connected to the node of a triangle of the triangulation through which a fault or boundary passes is called a "frozen" vector because the direction of that directional vector is known to be the same as the direction of the intersecting boundary or fault. However, the directional vector that is connected to another, second node of a triangle through which a fault or boundary does not pass is a "non-frozen" directional vector because the direction of that vector is not known since no fault or boundary passes through that second node.

In FIG. 45b2, an example is illustrated which will demonstrate the definitions of "frozen" directional vectors, and "non-frozen" directional vectors. A triangulation 183, in FIG. 45b2, includes a plurality of "nodes" 185, a node or vertices being defined as a point where two boundaries of the triangulation cross and intersect one another. For example, in FIG. 45b2, a first boundary of the triangulation 187 crosses and intersects a second boundary of the triangulation 189, and a "node" or "vertices" 191 is defined by that intersection between the first boundary of the triangulation 187 and the second boundary of the triangulation 189. A "frozen" directional vector appears at a first particular node of the triangulation when a fault line or a boundary line intersects that first particular node. However, a "non-frozen" direction vector appears at a second particular node of the triangulation when a fault line or a boundary line does not intersect that second particular node.

For example, in FIG. 45b2, directional vectors 193, 195, 197, and 199 are "frozen" directional vectors because those directional vectors are connected to, and originate from, "certain particular nodes" 201, 203, 205, and 207 in FIG. 45b2, said "certain particular nodes" intersecting with fault intersection lines 170, 172 (top end), 174, and 172 (bottom end), respectively.

However, directional vectors 209 and 211 are "non-frozen" directional vectors because these vectors 209, 211 are connected to two (2) nodes of the triangulation 183 which do not intersect with any fault intersection lines 170, 172, 174 or any boundary line 176.

Isotropic and Anisotropic Interpolation

FIG. 45b3 illustrates how to determine "frozen" directional vectors, and how to determine "non-frozen" directional vectors. To determine "frozen" directional vectors, when a boundary line or fault passes through a particular node on the triangulation, assign a unit length vector to that particular node having a direction equal to the direction of the boundary line or fault at that particular node. To determine "non-frozen" directional vectors, interpolate the fields of frozen vectors (having a known direction) onto the nodes of other triangles to determine the direction of the "non-frozen" vectors.

Since we know the direction of the "frozen" directional vectors, we can utilize an "isotropic" or "anisotropic" interpolation technique (discussed below) to determine the direction of the other "non-frozen" directional vectors.

In the following paragraphs, the two methods for performing the aforementioned interpolation, isotropic and anisotropic, will be discussed.

Figure 46:
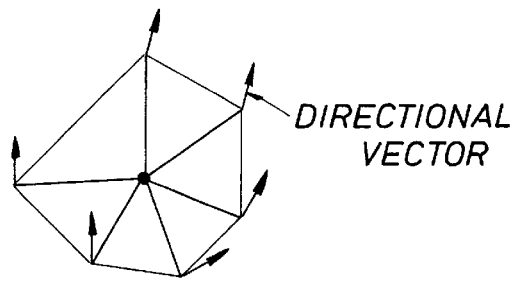

In FIG. 46, a set of triangles are illustrated as being drawn around a node for the purpose of illustrating "isotropic interpolation".

In "isotropic interpolation" (no orthogonality), visit each node of the triangle, in turn. The directional vectors of FIG. 46 may be "frozen" or "non frozen". The directional vector is "frozen" when its direction is established and set. However, the directional vector is "not frozen" (i.e., molten) when its direction is not known or not established or set. If the vector is "not frozen", then, using the isotropic interpolation method, set the "non-frozen" vector to be equal to the arithmetic average value of its neighbors. That is, take the arithmetic average of the six neighboring vectors, and set that arithmetic average to be equal to the value of the non-frozen vector. The "isotropic" interpolation method is not a distance weighted average interpolation method (like the anisotropic interpolation method discussed below). When performing isotropic interpolation, a bump in one or more faults will be smoothed out.

Figure 47:
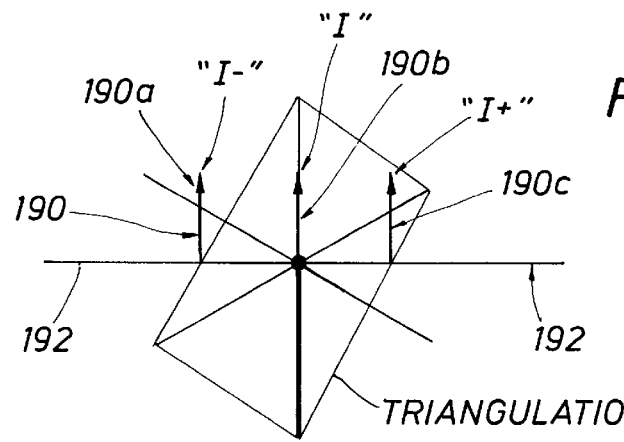

In FIG. 47, in "anisotropic" interpolation, this interpolation method utilizes a "distance weighted average" technique. Using the "anisotropic" method, look along the "j" vectors, determine where the "j" vectors intersect the bounding polygons on the triangles, determine the "i" vectors at the locations where the "j" vectors intersect the bounding polygons on the triangles, and place a distance weighted average at the node in the center. The effect of this technique is to pick up the "bumps" which are smoothed when using the isotropic gridding approach. More particularly, in FIG. 47, a set of triangles surround a point or node of a triangulation, and a field of directional vectors are connected the nodes of those triangles. First, look at the "j" vector 192 in FIG. 47 and determine where it cuts or intersects the neighboring triangles. In FIG. 47, note that the "j" vector 192 intersects the neighboring triangles at certain "intersection points". At those intersection points, determine the "i" vector 190 which exists at the aforesaid intersection points. Take a distance weighted average of the two "i" vectors 190, in FIG. 47. Given, in FIG. 47, that "i" vector 190a is "I−", "i" vector 190b is "I", and "i" vector 190c is "I+", then a "distance weighted average" is defined as follows:

$$I=[(W+)(I-)+(W-)(I+)]/[(W+)+(W-)],$$

where "W+" is the distance from the center ("i" vector 190b) in FIG. 47 to the "I+" vector, and "W−" is the distance from the center ("i" vector 190b) in FIG. 47 to the "I−" vector.

The above discussion discloses how to interpolate the vector fields, using either isotropic or anisotropic interpolation, for the purpose of determining the direction of the "non-frozen" directional vectors given the known direction of the "frozen" directional vectors.

The aforementioned discussion discloses how to build the vector field. The following discussion will disclose how to build the "control lines".

Step 4—Building the Control Lines

Figure 48:
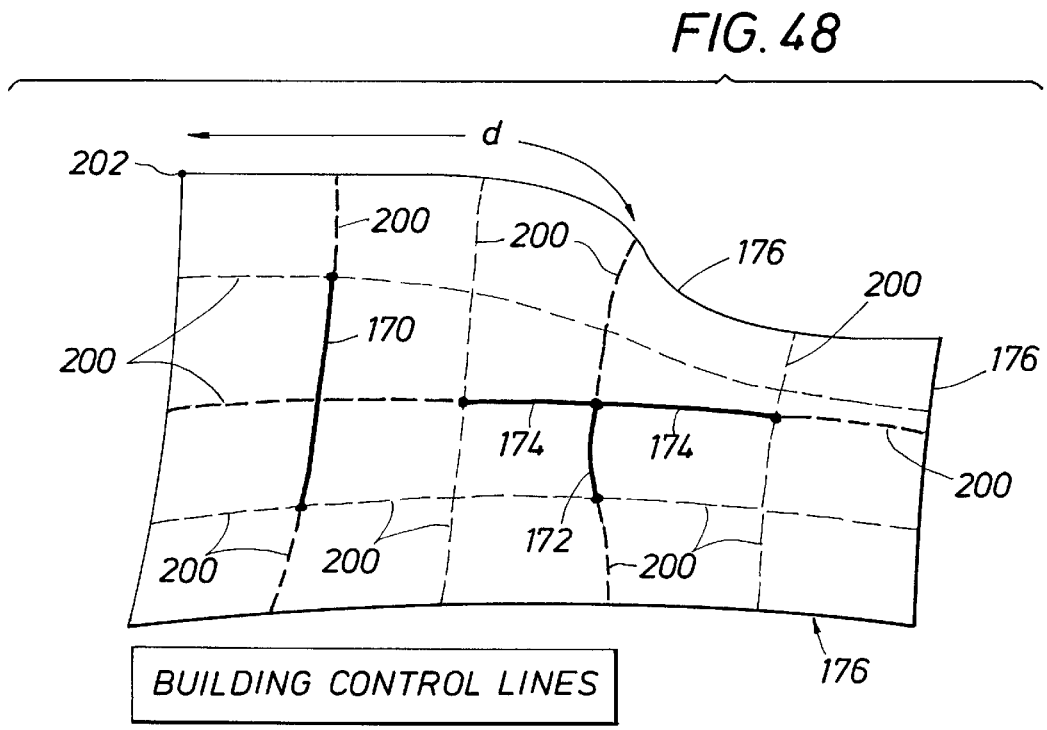

In FIGS. 48 and 49, the boundary 176 and the "i" and "j" fault intersection lines 170, 172, 174 have already been established from the above discussion with reference to FIG. 43. Now, assume by way of analogy that a fluid stream is flowing at a "velocity" and in a "direction" along the ends of the faults 170, 172, 174. A "directional vector" is connected to the end of the fault intersection lines 170, 172, 174, that "directional vector" having a "direction" which is analogously equal to the aforesaid "direction" of the fluid stream flowing at the end of the fault (that "directional vector" having a unit of length).

To build the "control lines", using our analogy, go to the ends of the faults 170, 172, 174 in FIG. 48, and "jump off" from said ends, into the fluid stream that is analogously flowing with a velocity in a direction along the faults, and drift off toward the boundary 176. That is, step off from the end of each of the faults 170, 172, 174, and into the fluid stream, and move with that fluid for a time toward the boundary 176. Using our analogy, the "control lines" would have a particular path which is traversed after jumping off from the ends of the faults 170, 172, 174 and moving with the fluid stream toward the boundary 176. Actually, the "control lines" really have a particular path or direction which is a direct result of the directions of the "directional vectors" of the vector field that are connected to the nodes of the triangulation.

In FIG. 49, for example, in order to build a "control line" identified by element numeral "200-1", assume that a fault

196 has an end 194, and the fault is located adjacent a series of triangles 198 of the triangulation. At the fault end 194, a first directional vector 194a is connected to a first node of the triangulation, the first directional vector 194a pointing in the direction of the fault, the length of the first directional vector 194a connoting a "fluid velocity". A second directional vector 194b is connected to a second node of the triangulation in FIG. 49. Step off the end 194 of fault 196, in the direction of the first directional vector 194a of the vector field in FIG. 49 which is connected to the first node of the triangulation, then stop, determine the fluid velocity at that point (using our analogy). Move along in the direction of the first directional vector 194a with that velocity for awhile. Next, determine the direction of the second directional vector 194b of the vector field in FIG. 49 which is connected to the second node of the triangulation and determine the next fluid velocity of the second directional vector 194b at that point. Move along in the direction of the second directional vector 194b with that next fluid velocity for awhile, etc. Continue drifting upstream until the boundary is reached. As a result, the control line "200-1" of FIG. 49 has been built.

In FIG. 50, the "control lines" 200 are built using this technique. In fact, this technique is utilized in connection with the "i" fault intersection lines 170, 172 and the "j" fault intersection lines 174.

Therefore, in FIGS. 48 and 49, when the function described above with reference to FIG. 49 is complete, the "control lines" 200 (defined to be the "dotted lines" 200 and the attached fault lines 170, 172, 174 in FIG. 48) connect both sides of the fault intersection line 170 to the boundary 176, and said "control lines" 200 also connect both sides of fault intersection line 172 to the boundary 176, and said "control lines" 200 also connect both sides of fault intersection line 174 to the boundary 176. Bear in mind that a "control line" in FIG. 48 is defined to be: the dotted line 200 and the fault intersection line 170 (using the fault intersection line 170 as an example).

However, in FIG. 48, a control line 200 must split a region into two pieces; that is, an "i" fault control line 200 cannot terminate on a "j" fault boundary. This means that a coordinate system can be set up inside the region. If we take an arbitrary point (x, y) in a region, we can determine where that an arbitrary point is located with respect to an origin 202 in FIG. 48. That is, given a point (x, y), we can find out where that point came from when convected from the boundary by the "i" vectors, or where it came from when convected from the boundary by the "j" vectors (by theorem, we know that any point must have been convected from the top of a boundary by the "i" lines, or from the left by the "j" lines). Then, when we know exactly where that arbitrary point is located with respect to the origin 202 in FIG. 48, we can determine the identity of the specific triangle of the triangulation in which the arbitrary point is disposed. Then, when we know the identity of the specific triangle in which the arbitrary point is disposed, we can determine the neighboring directional vectors that are located adjacent the arbitrary point in the identified triangle. Then, by interpolation, we can determine the directional vector at the arbitrary point.

Step 5—Add a Fine Grid of "Additional Lines" Defined by the Users Requirements

We ask the user how many cells or "grid blocks" they wish to use in their simulation grid. If they say a "50 by 50" grid (50 grid blocks on one side and 50 grid blocks on another side), we would build a "50 by 50" grid, with an underlying control grid. If they then request a finer grid, like "80 by 80", we add a fine grid of "additional lines" defined by equi-spaced launch points of the underlying control lines. These numbers, for example "50 by 50", are distributed to the closed regions enclosed by the boundary and the control lines. This decision is made on the basis of the lengths of the sides of the sub-regions.

In FIG. 50, inside the boundary 176, which contains the "i" faults 170, 172 and the "j" fault 174, and the control lines 200, add some further "additional lines" 204.

Step 6—Equi-Space the Control Lines and the Additional Lines

In FIG. 51, the user specifies an "Nx" and an "Ny" between control lines (that is, the user specifies how many "additional lines" the user wants between the control lines). This number of points is then distributed, equally spaced in arc-length along the control lines between the intersections with the other control lines or with the boundary. Once this has been done, then the remaining grid points, in the interior of each subregion enclosed by control lines, are placed using a standard boundary fitted gridding method (e.g., the transfinite-interpolation method, the Winslow method, or the area-orthogonality method of Knupp). As a result, we end up with equi-spaced strips or spaces between adjacent control lines 200 and between adjacent additional lines 204.

Step 7—With Smoothness

In FIG. 52, if the user asks for smoothness, we do not try to equi-space the control lines 200 and additional lines 204 as noted above in step 6 with reference to FIG. 51. That is, we do not divide up the area between two control lines 200 and the additional lines 204 with equal width strips; rather, we adjust the widths between control lines and additional lines so that, as we move across the grid, said widths are changing smoothly.

In summary, the structured areal gridder 68b of FIG. 26 of the structured gridder 68 of FIGS. 14c, 16, and 24 of the present invention functions to build a "structured areal grid" (also known as a "corner point grid") by performing the following functional steps:

(1) Build a triangulation that absorbs a boundary and a set of fault intersection lines which are disposed on a horizon of an earth formation;

(2) Build a vector field on the nodes of the triangulation, the vector field including a first vector field further including directional vectors and a second vector field further including directional vectors, the first vector field having a first vector field direction that corresponds to the directions of the boundaries and the fault intersection lines which intersect with such nodes of the triangulation, the second vector field having a second vector field direction which is interpolated relative to the first vector field direction and which intersect with other such nodes of the triangulation;

(3) Build a web of control lines having a direction which corresponds to the directions of the directional vectors in the first and second vector field, the control lines including one or more fault intersection lines and dotted extensions which interconnect the ends of each of the fault intersection lines to the boundary;

(4) Build a web of additional lines in addition to the web of control lines, thereby producing a "naive areal grid"; and (5) Then, when the naive areal grid has been built, post process the naive areal grid so that the control lines and the additional lines are equally spaced or smoothly distributed.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. In a simulation gridding apparatus including a structured gridder, a horizon in an earth formation including one or more fault intersection lines, said structured gridder comprising:

boundary enclosing means for enclosing a boundary around said fault intersection lines on said horizon, and a structured areal gridder adapted for building a structured areal grid over said boundary when said fault intersection lines are enclosed by said boundary by said boundary enclosing means, said structured areal grid including intersecting streamlines, said intersecting streamlines including a plurality of nodes, at least some of said streamlines including control lines, said control lines including said fault intersection lines.

2. The simulation gridding apparatus of claim 1, wherein said structured gridder further comprises:

a block gridder adapted for connecting a plurality of coordinate lines to the plurality of nodes of said intersecting streamlines and dropping said plurality of coordinate lines into said earth formation until said coordinate lines intersect other horizons in said earth formation thereby producing a plurality of grid blocks of a structured simulation grid.

3. The simulation gridding apparatus of claims 2, wherein said structured areal gridder further comprises:

means for building a triangulation and overlaying said triangulation over said boundary and the fault intersection lines enclosed by said boundary, the triangulation having nodes.

4. The simulation gridding apparatus of claim 3, wherein said structured areal gridder further comprises:

means for building a vector field including a plurality of directional vectors on the nodes of said triangulation, thereby producing a vectored triangulation, each of the directional vectors of the vector field being assigned to one of the nodes of the triangulation, each of the directional vectors having a direction; and means responsive to the directions of said plurality of directional vectors on said nodes of the triangulation for building a web of control lines which interconnect opposing sides of said boundary thereby producing a preliminary grid, each of said control lines being formed when the ends of one of the fault intersection lines enclosed by said boundary are connected to said opposing sides of said boundary.

5. The simulation gridding apparatus of claim 4, wherein said structured areal gridder further comprises:

means for adding additional lines to said preliminary grid by interconnecting said additional lines to the opposing sides of said boundary intermediate said control lines thereby producing said structured areal grid having a plurality of nodes which overlays said boundary; and means for either equi-spacing said control lines and said additional lines or smoothly distributing said control lines and said additional lines of said structured areal grid.

6. The simulation gridding apparatus of claims 2, wherein said simulation gridding apparatus further comprises:

an upscaler adapted for receiving said plurality of grid blocks of said structured simulation grid from said block gridder and assigning a plurality of more accurate structured grid block property information to the respective plurality of grid blocks of said structured simulation grid, whereby a simulator receives said plurality of more accurate structured grid block property information associated with said plurality of grid blocks of the structured simulation grid and generates a plurality of more accurate simulation results associated, respectively, with the plurality of grid blocks.

7. A method of constructing a structured simulation grid adapted to be imposed on an earth formation and displaying said structured simulation grid, a horizon in said earth formation including a plurality of fault intersection lines, comprising the steps of:

(a) enclosing a boundary around the fault intersection lines on the horizon;

(b) building a triangulation and overlaying the triangulation over said boundary, said triangulation enclosing said boundary and said fault intersection lines within said boundary, the triangulation having nodes;

(c) building a vector field having a plurality of directional vectors on the nodes of the triangulation, thereby producing a vectored triangulation, by assigning one of the directional vectors of the vector field to each node of the triangulation, each of the directional vectors having a direction; and (d) in response to the building step (c), producing said structured simulation grid and displaying said structured simulation grid.

8. The method of claim 7, wherein the producing and displaying step (d) comprises the steps of:

(d1) in response to the directions of the plurality of directional vectors on the nodes of the triangulation, building a web of control lines which interconnect opposing sides of the boundary by interconnecting the ends of each of the fault intersection lines within the boundary to the opposing sides of the boundary thereby producing an areal grid which overlays the boundary, (d2) adding additional lines to the areal grid by interconnecting the additional lines to the opposing sides of the boundary thereby producing a structured areal grid having a plurality of nodes across said boundary, and (d3) either equi-spacing the control lines and additional lines of the structured areal grid or smoothly distributing the control lines and the additional lines of the structured areal grid.

9. The method of claim 8, wherein the producing and displaying step (d) further comprises the steps of:

(d4) connecting a plurality of coordinate lines to the plurality of nodes of the structured areal grid of step (d2), (d5) dropping the plurality of coordinate lines from the nodes of the structured areal grid and intersecting said coordinate lines with one or more other lower-oriented horizons in the earth formation thereby producing said structured simulation grid, said structured simulation grid including a plurality of grid blocks, each of said grid blocks being disposed between adjacent horizons of the earth formation; and (d6) displaying said structured simulation grid produced during step (d5).

10. A simulation gridding apparatus adapted for generating a set of more accurate grid block property information adapted for use by a simulator, a horizon in an earth formation including one or more fault intersection lines, comprising:

a structured gridder adapted for generating a structured simulation grid, said structured gridder including,
    boundary enclosing means for enclosing a boundary around said fault intersection lines on said horizon,
    a structured areal gridder adapted for building a structured areal grid over said boundary after said fault intersection lines are enclosed by said boundary by said boundary enclosing means, said structured areal grid including intersecting streamlines, at least some of said streamlines including control lines, said control lines including said fault intersection lines, said intersecting streamlines including a plurality of nodes; and
    a block gridder adapted for connecting a plurality of coordinate lines to the plurality of nodes of said intersecting streamlines and dropping said plurality of coordinate lines into said earth formation until said coordinate lines intersect other horizons in said earth formation thereby producing a plurality of grid blocks of said structured simulation grid.

11. The simulation gridding apparatus of claim 10, wherein said simulation gridding apparatus further comprises:
    an upscaler adapted for receiving said plurality of grid blocks of said structured simulation grid from said block gridder and assigning a plurality of more accurate structured grid block property information to the respective plurality of grid blocks of said structured simulation grid,
    whereby a simulator receives said plurality of more accurate structured grid block property information associated with said plurality of grid blocks of the structured simulation grid and generates a plurality of more accurate simulation results associated, respectively, with the plurality of grid blocks.

12. The simulation gridding apparatus of claims 10, wherein said structured areal gridder further comprises:
    means for building a triangulation and overlaying said triangulation over said boundary and the fault intersection lines enclosed by said boundary, the triangulation having nodes.

13. The simulation gridding apparatus of claim 12, wherein said structured areal gridder further comprises:
    means for building a vector field including a plurality of directional vectors on the nodes of said triangulation, thereby producing a vectored triangulation, each of the directional vectors of the vector field being assigned to one of the nodes of the triangulation, each of the directional vectors having a direction; and
    means responsive to the directions of said plurality of directional vectors on said nodes of the triangulation for building a web of control lines which interconnect opposing sides of said boundary thereby producing a preliminary grid, each of said control lines being formed when the ends of one of the fault intersection lines enclosed by said boundary are connected to said opposing sides of said boundary.

14. The simulation gridding apparatus of claim 13, wherein said structured areal gridder further comprises:
    means for adding additional lines to said preliminary grid by interconnecting said additional lines to the opposing sides of said boundary intermediate said control lines thereby producing said structured areal grid having a plurality of nodes which overlays said boundary; and
    means for either equi-spacing said control lines and said additional lines or smoothly distributing said control lines and said additional lines of said structured areal grid.

15. The simulation gridding apparatus of claim 14, wherein said simulation gridding apparatus further comprises:
    an upscaler adapted for receiving said plurality of grid blocks of said structured simulation grid from said block gridder and assigning a plurality of more accurate structured grid block property information to the respective plurality of grid blocks of said structured simulation grid,
    whereby a simulator receives said plurality of more accurate structured grid block property information associated with said plurality of grid blocks of the structured simulation grid and generates a plurality of more accurate simulation results associated, respectively, with the plurality of grid blocks.

16. A program storage device readable by a machine, tangibly embodying a program of instructions executable by the machine to perform method steps for constructing a structured areal grid on a horizon in an earth formation, said method steps comprising:
    constructing said structured areal grid on said horizon in said earth formation, said horizon including a plurality of fault intersection lines, the step of constructing said structured areal grid on said horizon in said earth formation comprising the steps of,
        (a) enclosing a boundary around said plurality of fault intersection lines disposed on said horizon in said earth formation;
        (b) building a triangulation and overlaying said triangulation over said boundary, said triangulation enclosing said boundary and said fault intersection lines within said boundary, said triangulation having a plurality nodes; and
        (c) building a vector field including a plurality of directional vectors on the nodes of the triangulation by assigning the plurality of directional vectors, respectively, to the plurality of nodes of the triangulation, each of the directional vectors being assigned to a different node of the triangulation and having a direction.

17. The program storage device of claim 16, wherein the step of constructing said structured areal grid on said horizon in said earth formation comprises the further step of:
    (d) in response to the directions of the plurality of directional vectors on the nodes of the triangulation, building a web of control lines which interconnect opposing sides of the boundary by interconnecting the ends of each of the fault intersection lines within the boundary to the opposing sides of the boundary thereby producing an areal grid which overlays the boundary.

18. The program storage device of claim 17, wherein the step of constructing said structured areal grid on said horizon in said earth formation comprises the further steps of:
    (e) adding additional lines to the areal grid by interconnecting the additional lines to the opposing sides of the boundary thereby producing a structured areal grid having a plurality of nodes across said boundary; and
    (f) either equi-space the control lines and additional lines of the structured areal grid or smoothly distributing the control lines and the additional lines of the structured areal grid.

19. A simulation gridding apparatus adapted for generating a structured simulation grid, comprising:
    a structured gridder, said structured gridder including,
        a structured areal gridder adapted for building a structured areal grid, and a block gridder adapted for connecting a plurality of coordinate lines to a plurality of nodes of said structured areal grid thereby generating said structured simulation grid.

20. The simulation gridding apparatus of claim 19, wherein said structured areal gridder of said structured gridder comprises:

a triangulation building apparatus adapted for building a triangulation that absorbs a boundary and a set of fault intersection lines which are disposed on a horizon of an earth formation;

a vector field building apparatus adapted for building a vector field on a set of nodes of said triangulation, said vector field including a first vector field further including directional vectors and a second vector field further including directional vectors, the first vector field having a first vector field direction that corresponds to the directions of a set of boundaries and a set of fault intersection lines which intersect with certain ones of said nodes of said triangulation, the second vector field having a second vector field direction which is interpolated relative to the first vector field direction and which intersect with certain additional nodes of said triangulation.

21. The simulation gridding apparatus of claim 20, wherein said structured areal gridder of said structured gridder further comprises:

a web of control lines building apparatus adapted for building a web of control lines having a direction which corresponds to the directions of the directional vectors in the first and second vector field, the control lines including one or more fault intersection lines and dotted extensions which interconnect the ends of each of the fault intersection lines to a boundary.

22. The simulation gridding apparatus of claim 21, wherein said structured areal gridder of said structured gridder further comprises:

a web of additional lines building apparatus adapted for building a web of additional lines in addition to the web of control lines thereby producing a first areal grid; and apparatus adapted for equally spacing or smoothly distributing the control lines and the additional lines of said first areal grid thereby building said structured areal grid.

23. A method of constructing a structured simulation grid which is adapted for recordation or display on a recordation or display apparatus, comprising the steps of:

(a) building a structured areal grid, and (b) connecting a plurality of coordinate lines to a plurality of nodes of said structured areal grid thereby generating said structured simulation grid, said structured simulation grid adapted to be recorded or displayed on said recordation or display apparatus.

24. The method of claim 23, wherein the building step (a) for building said structured areal grid comprises the steps of:

(a1) building a triangulation that absorbs a boundary and a set of fault intersection lines which are disposed on a horizon of an earth formation; and (a2) building a vector field on a set of nodes of said triangulation, said vector field including a first vector field further including directional vectors and a second vector field further including directional vectors, the first vector field having a first vector field direction that corresponds to the directions of a set of boundaries and a set of fault intersection lines which intersect with certain ones of said nodes of said triangulation, the second vector field having a second vector field direction which is interpolated relative to the first vector field direction and which intersect with certain additional nodes of said triangulation.

25. The method of claim 24, wherein the building step (a) for building said structured areal grid further comprises the steps of:

(a3) building a web of control lines having a direction which corresponds to the directions of the directional vectors in the first and second vector field, the control lines including one or more fault intersection lines and dotted extensions which interconnect the ends of each of the fault intersection lines to a boundary.

26. The method of claim 25, wherein the building step (a) for building said structured areal grid further comprises the steps of:

(a4) building a web of additional lines in addition to the web of control lines thereby producing a first areal grid; and (a5) equally spacing or smoothly distributing the control lines and the additional lines of said first areal grid thereby building said structured areal grid.

27. A program storage device readable by a machine and tangibly embodying a program of instructions executable by the machine to perform method steps for constructing a structured simulation grid, said method steps comprising:

(a) building a structured areal grid, and (b) connecting a plurality of coordinate lines to a plurality of nodes of said structured areal grid thereby constructing and generating said structured simulation grid.

28. The program storage device of claim 27, wherein the building step (a) for building said structured areal grid comprises the steps of:

(a1) building a triangulation that absorbs a boundary and a set of fault intersection lines which are disposed on a horizon of an earth formation; and (a2) building a vector field on a set of nodes of said triangulation, said vector field including a first vector field further including directional vectors and a second vector field further including directional vectors, the first vector field having a first vector field direction that corresponds to the directions of a set of boundaries and a set of fault intersection lines which intersect with certain ones of said nodes of said triangulation, the second vector field having a second vector field direction which is interpolated relative to the first vector field direction and which intersect with certain additional nodes of said triangulation.

29. The program storage device of claim 28, wherein the building step (a) for building said structured areal grid further comprises the steps of:

(a3) building a web of control lines having a direction which corresponds to the directions of the directional vectors in the first and second vector field, the control lines including one or more fault intersection lines and dotted extensions which interconnect the ends of each of the fault intersection lines to a boundary.

30. The program storage device of claim 29, wherein the building step (a) for building said structured areal grid further comprises the steps of:

(a4) building a web of additional lines in addition to the web of control lines thereby producing a first areal grid; and (a5) equally spacing or smoothly distributing the control lines and the additional lines of said first areal grid thereby building said structured areal grid.

31. A method of generating a set of simulation results which are adapted to be recorded or displayed on a recordation or display apparatus, comprising the steps of:
  (a) placing a boundary around a set of fault intersection lines on a horizon of an earth formation;
  (b) generating a structured areal grid which is imposed over said boundary, said structured areal grid having intersections, the generating step (b) for generating a structured areal grid including the step of building triangles of a triangulation over said boundary;
  (c) connecting coordinate lines to the intersections of said structured areal grid and performing vertical gridding wherein, after said vertical gridding, said coordinate lines intersect with another horizon of said earth formation thereby generating a structured simulation grid, said structured simulation grid including a plurality of grid blocks;
  (d) assigning properties to each grid block of said structured simulation grid thereby generating a simulation grid output wherein each of the plurality of grid blocks of said structured simulation grid have a property associated therewith; and
  (e) in response to the simulation grid output, assigning a simulation result to each grid block of said structured simulation grid thereby generating a plurality of simulation results wherein each of the plurality of grid blocks of said structured simulation grid have a simulation result associated therewith, said plurality of simulation results adapted to be recorded or displayed on said recordation or display apparatus.

32. The method of claim 31, wherein the generating step (b) for generating a structured areal grid comprises the steps of:
  (b1) building triangles of a triangulation over said boundary, said triangulation having nodes;
  (b2) building directional vectors on the nodes of said triangulation, said directional vectors each having a direction;
  (b3) building streamlines comprising control lines and additional lines which intersect with said boundary, said streamlines having a direction which corresponds to the direction of said directional vectors;
  (b4) equi-distributing said streamlines within said boundary; and
  (b5) finding intersections between said streamlines, said coordinate lines of the connecting step (c) being connected to said intersections between said streamlines found during the finding step (b5).

33. A program storage device readable by a machine and tangibly embodying a program of instructions executable by the machine to perform method steps for generating a set of simulation results, said method steps comprising:
  (a) placing a boundary around a set of fault intersection lines on a horizon of an earth formation;
  (b) generating a structured areal grid and imposing said structured areal grid over said boundary, said structured areal grid having intersections, the generating step (b) for generating a structured areal grid including the step of building triangles of a triangulation over said boundary;
  (c) connecting coordinate lines to the intersections of said structured areal grid and performing vertical gridding wherein, after said vertical gridding, said coordinate lines intersect with another horizon of said earth formation thereby generating a structured simulation grid, said structured simulation grid including a plurality of grid blocks;
  (d) assigning properties to each grid block of said structured simulation grid thereby generating a simulation grid output wherein each of the plurality of grid blocks of said structured simulation grid have a property associated therewith; and
  (e) in response to the simulation grid output, assigning a simulation result to each grid block of said structured simulation grid thereby generating a plurality of simulation results wherein each of the plurality of grid blocks of said structured simulation grid have a simulation result associated therewith.

34. The program storage device of claim 33, wherein the generating step (b) for generating a structured areal grid comprises the steps of:
  (b1) building triangles of a triangulation over said boundary, said triangulation having nodes;
  (b2) building directional vectors on the nodes of said triangulation, said directional vectors each having a direction;
  (b3) building streamlines comprising control lines and additional lines which intersect with said boundary, said streamlines having a direction which corresponds to the direction of said directional vectors;
  (b4) equi-distributing said streamlines within said boundary; and
  (b5) finding intersections between said streamlines, said coordinate lines of the connecting step (c) being connected to said intersections between said streamlines found during the finding step (b5).

* * * * *